United States Patent
Klier et al.

(10) Patent No.: US 12,116,077 B2
(45) Date of Patent: Oct. 15, 2024

(54) SCOOTER WITH AUTOMATIC TILT OF THE STEERING POST

(71) Applicant: TROLLYPACK LTD., Savyon (IL)

(72) Inventors: Niri Klier, Savyon (IL); Orel Serfaty, Elkana (IL)

(73) Assignee: TROLLYPACK LTD., Savyon (IL)

( * ) Notice: Subject to any disclaimer, the term of this patent is extended or adjusted under 35 U.S.C. 154(b) by 0 days.

(21) Appl. No.: 18/025,756

(22) PCT Filed: Oct. 27, 2021

(86) PCT No.: PCT/IL2021/051276
§ 371 (c)(1),
(2) Date: Mar. 10, 2023

(87) PCT Pub. No.: WO2022/091095
PCT Pub. Date: May 5, 2022

(65) Prior Publication Data
US 2023/0348010 A1   Nov. 2, 2023

(30) Foreign Application Priority Data

Oct. 28, 2020 (IL) .......................................... 278369

(51) Int. Cl.
*B62K 3/00* (2006.01)
*B62K 5/027* (2013.01)
(Continued)

(52) U.S. Cl.
CPC .............. *B62K 3/002* (2013.01); *B62K 5/027* (2013.01); *B62K 5/08* (2013.01); *B62K 5/10* (2013.01);
(Continued)

(58) Field of Classification Search
CPC ............ B62K 5/027; B62K 5/05; B62K 5/08; B62K 5/10; B62K 3/002; B62K 2202/00; B62K 15/00; B62K 15/008
See application file for complete search history.

(56) References Cited

U.S. PATENT DOCUMENTS

| | | | | |
|---|---|---|---|---|
| 3,746,118 | A * | 7/1973 | Altorfer ............... | B62D 61/065 280/267 |
| 4,351,410 | A * | 9/1982 | Townsend ............ | B62D 61/065 280/5.509 |
| 4,903,857 | A * | 2/1990 | Klopfenstein ........... | B62K 5/10 280/267 |
| 6,817,617 | B2 * | 11/2004 | Hayashi ................... | B62K 5/05 280/5.509 |

(Continued)

FOREIGN PATENT DOCUMENTS

| | | |
|---|---|---|
| CN | 110497990 A | 11/2019 |
| CN | 210793462 U * | 6/2020 |

OTHER PUBLICATIONS

International Search Report and Written Opinion dated Jan. 23, 2022 in PCT International Patent Application No. PCT/IL2021/051276, 8 pages.

*Primary Examiner* — Laura Freedman
(74) *Attorney, Agent, or Firm* — Snell & Wilmer L.L.P.

(57) ABSTRACT

A scooter apparatus including a steering assembly having a pivotable steering member having a pivotal axis; a handlebar securely attached to the steering member; a pair of front wheels; a steering mechanism configured to steer the front wheels; a wheel s-pivoting-mechanism configured to pivot the pair of front wheels; and a steering-tilt assembly configured to tilts the steering member towards the inside periphery of the turning curve, when pivoting the steering member. The rate of the tilt of the steering member, towards the inside periphery of the turning curve, is proportionally related to the pivoting rate of the steering member, and (Continued)

configured to vary depending on speed. The scooter further includes a deck assembly having a standing board and a rear wheel assembly. An interface assembly interconnecting the deck assembly with the steering assembly. The scooter is foldable and may include a detachable bag.

20 Claims, 58 Drawing Sheets

(51) Int. Cl.
  *B62K 5/08* (2006.01)
  *B62K 5/10* (2013.01)
  *B62K 15/00* (2006.01)
(52) U.S. Cl.
  CPC ........ B62K 15/008 (2013.01); *B62K 2202/00* (2013.01)

(56) References Cited

U.S. PATENT DOCUMENTS

| | | | |
|---|---|---|---|
| 7,460,936 B2* | 12/2008 | Fulks | B60G 21/007 |
| | | | 60/600 |
| 7,487,985 B1* | 2/2009 | Mighell | B62K 5/027 |
| | | | 280/124.126 |
| 8,696,000 B1* | 4/2014 | Chen | B62K 3/002 |
| | | | 280/87.041 |
| 9,272,739 B2 | 3/2016 | Zaid et al. | |
| 9,610,998 B1 | 4/2017 | LaBonty | |
| 10,322,767 B2 | 6/2019 | Dragomir | |
| 10,501,119 B2* | 12/2019 | Doerksen | B60G 17/018 |
| 10,787,217 B2* | 9/2020 | Mogensen | B60G 3/20 |
| 11,383,785 B2* | 7/2022 | Choi | B62K 5/10 |
| 11,691,689 B2* | 7/2023 | Kurakake | B62K 5/06 |
| | | | 280/124.103 |

* cited by examiner

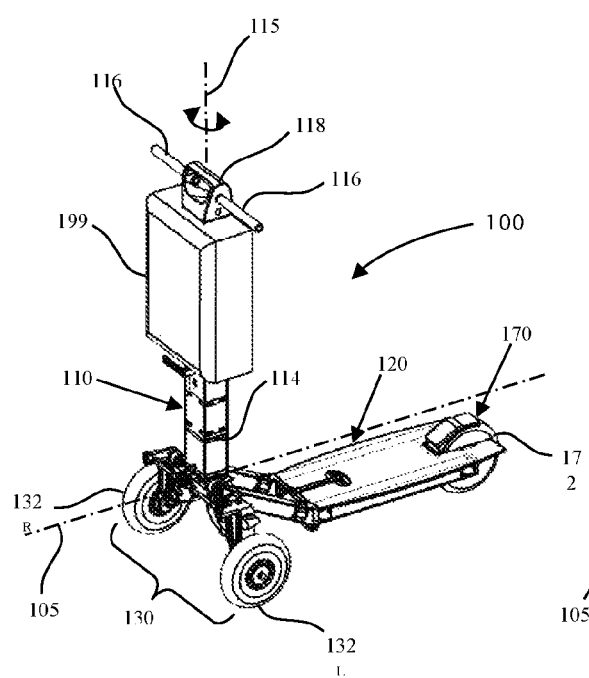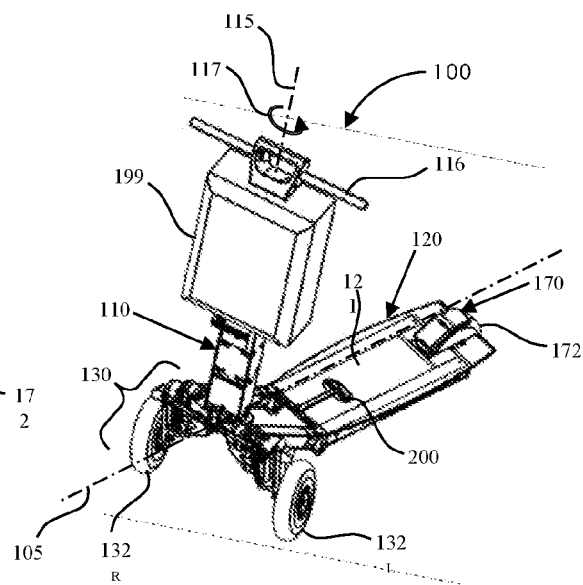
Fig. 1
Fig. 2

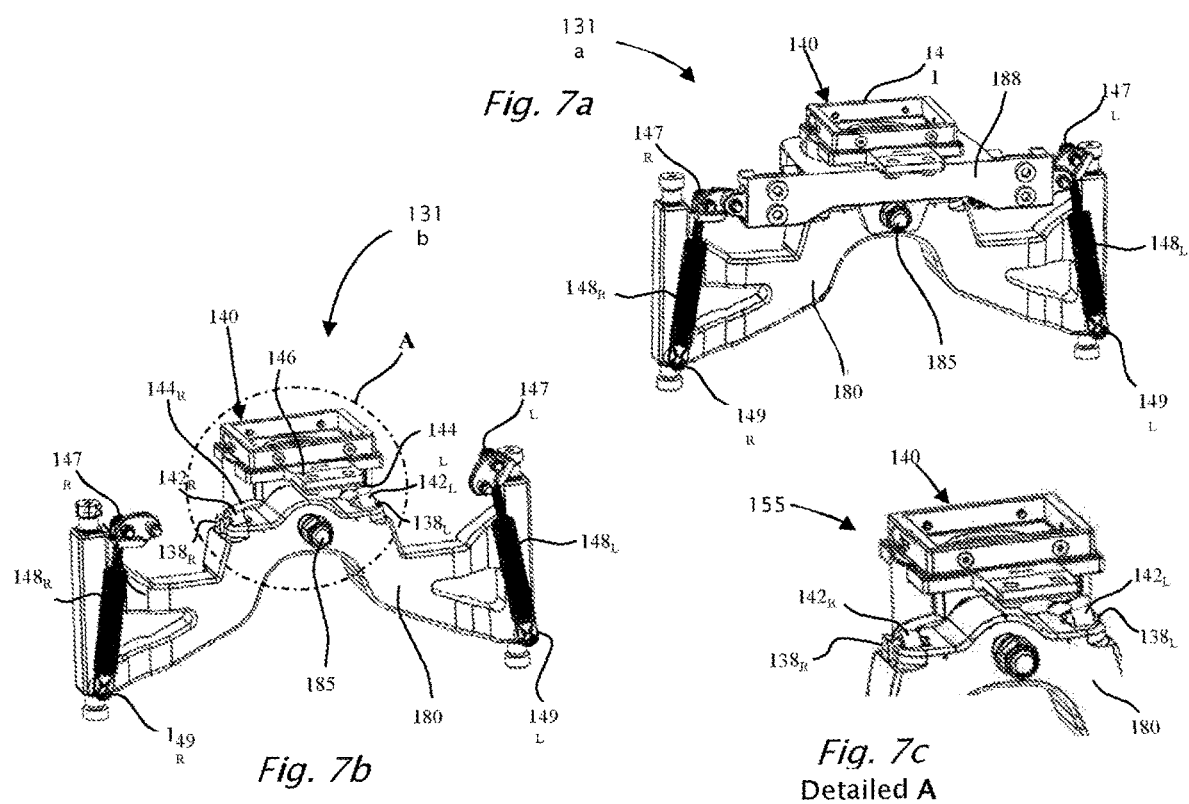

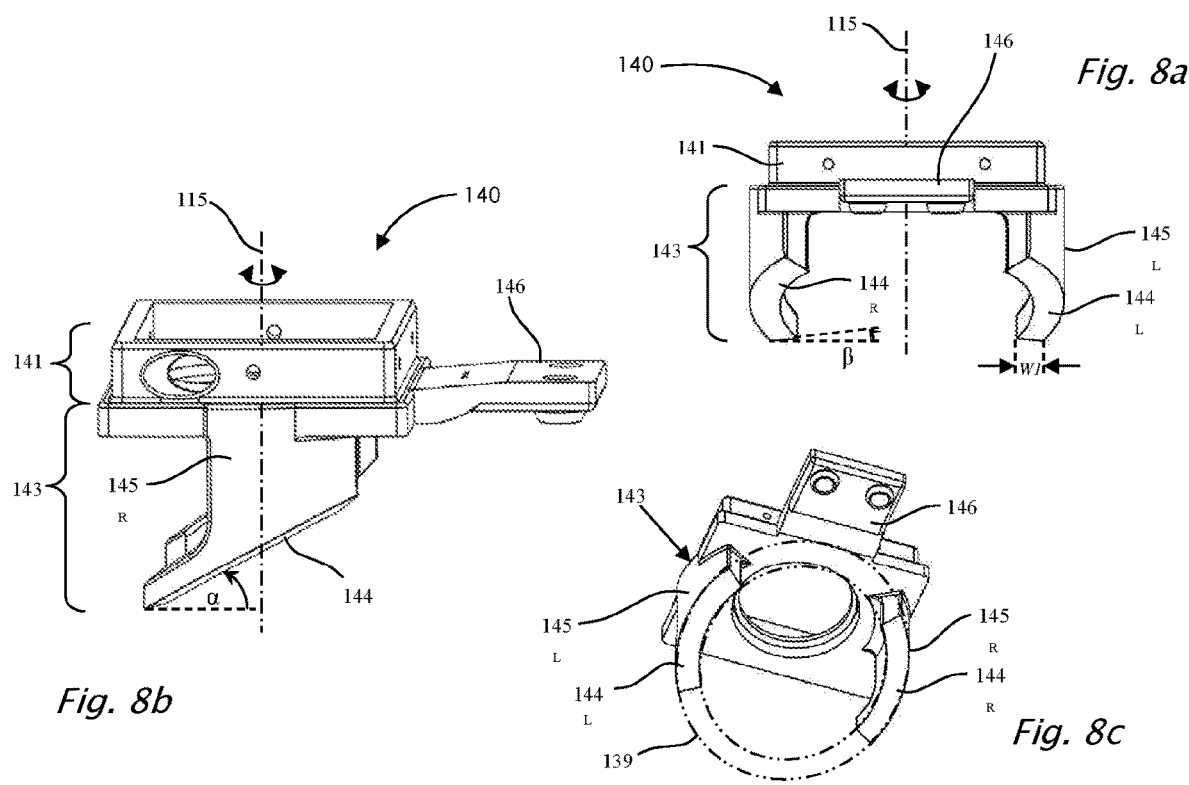

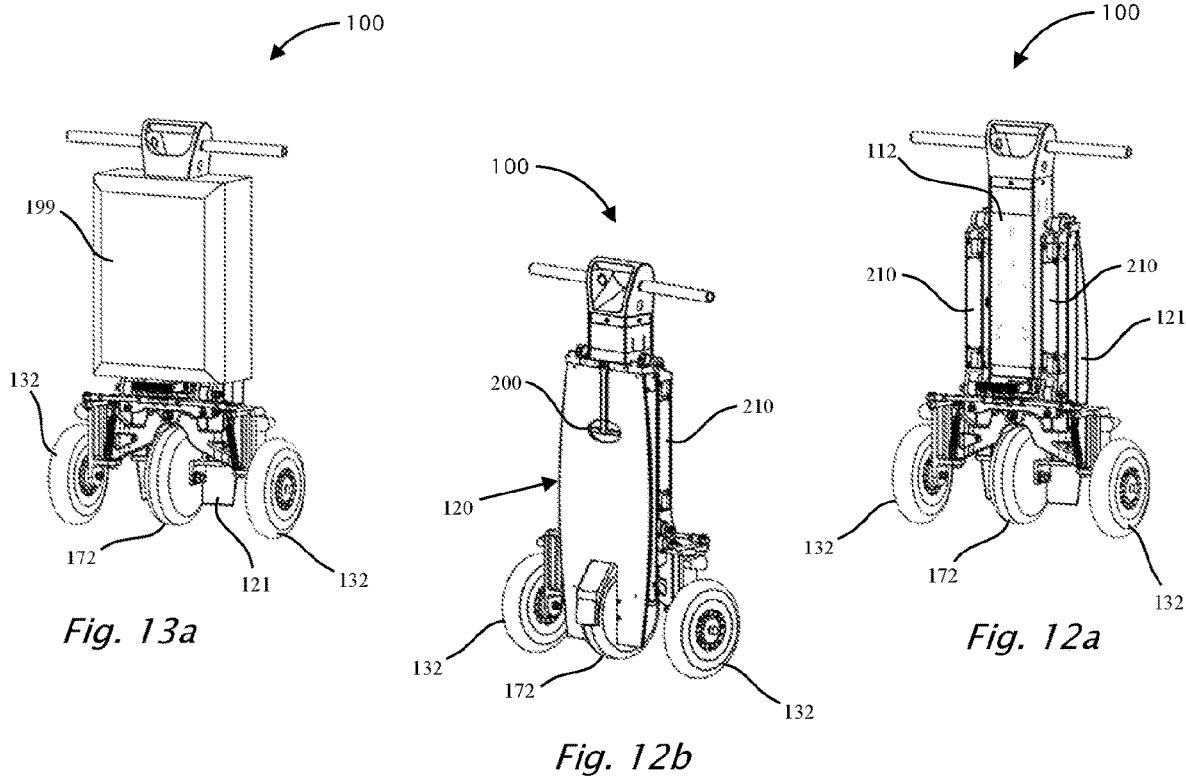

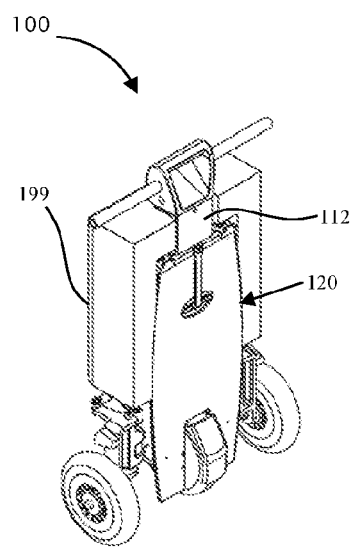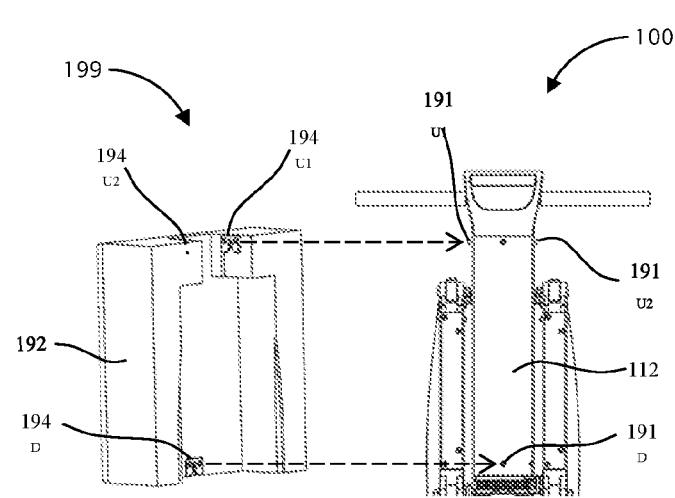
*Fig. 17a*  *Fig. 17b*  *Fig. 17c*

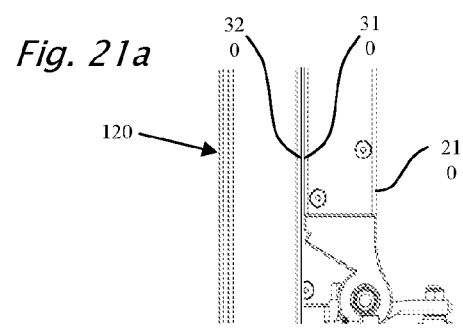
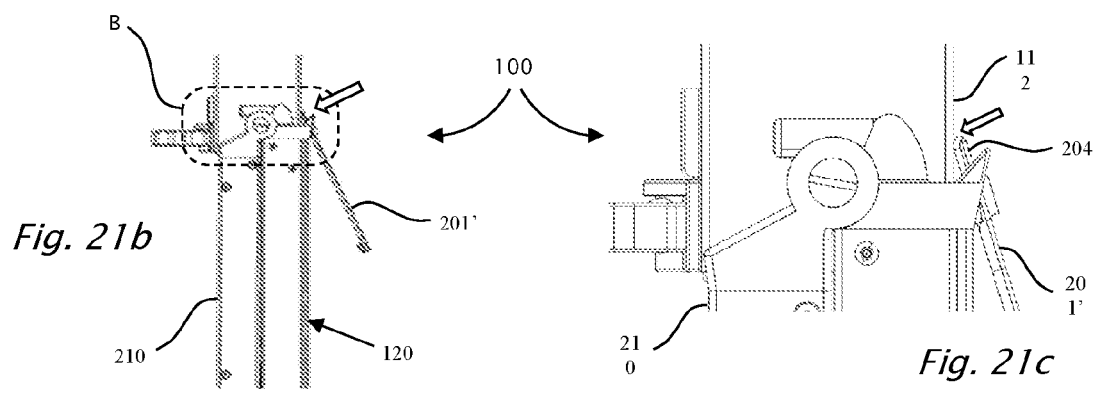
Fig. 21a
Fig. 21b
Fig. 21c
Detailed B

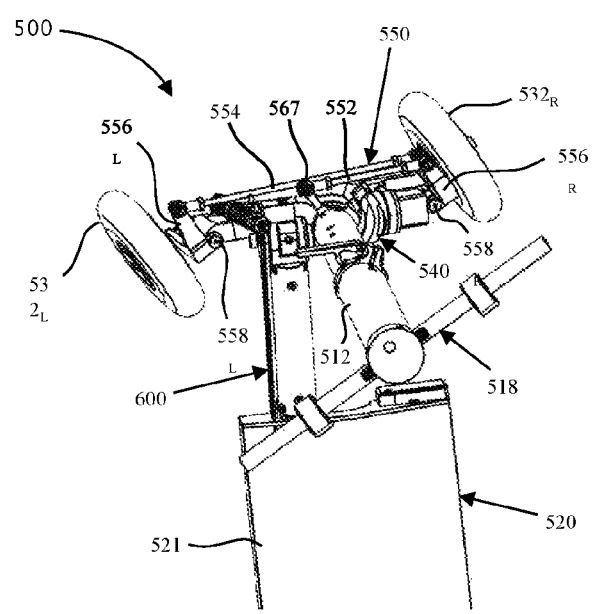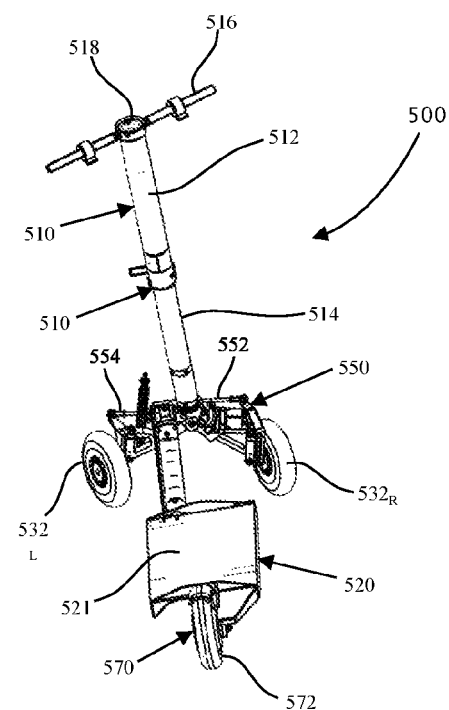
Fig. 25
Fig. 24 rear vertical cross-section view front, vertical
cross section
view top, lateral
cross section
view front, lateral
cross section
view

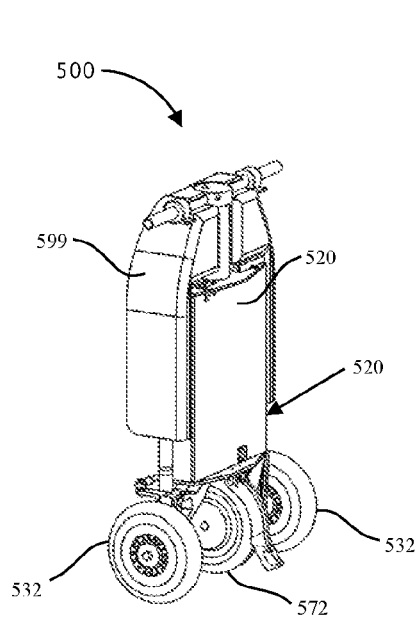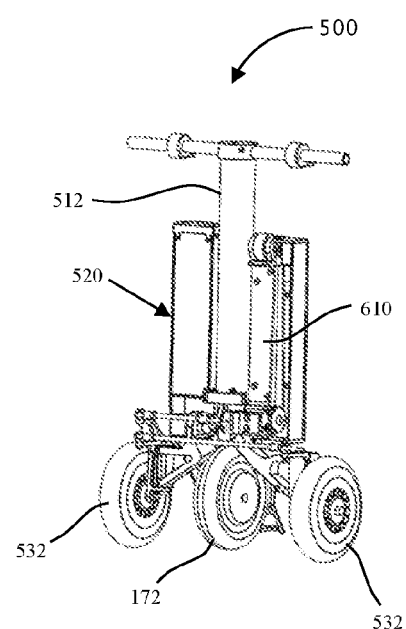
Fig. 33b
Fig. 33a cross section1
of
detailed *C* vertical
cross
section view cross section2
of
detailed *C* vertical cross section view

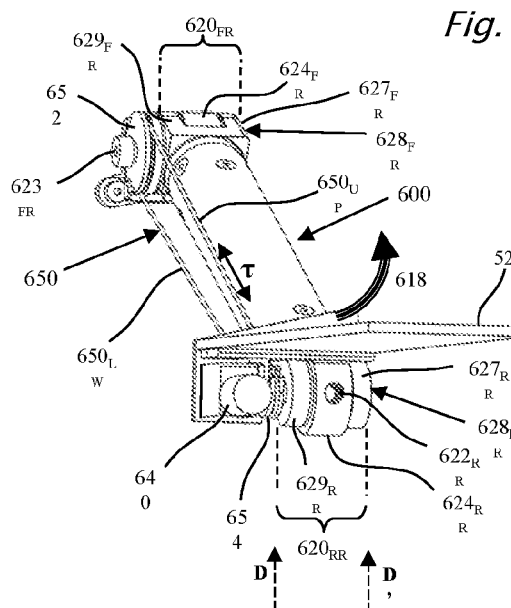
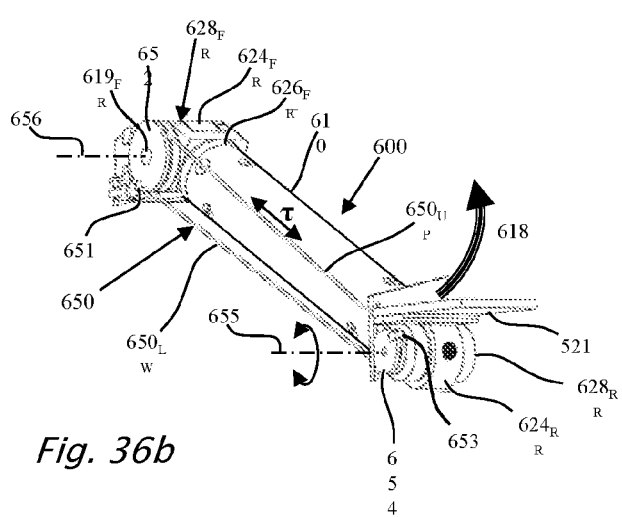
Fig. 36a
Fig. 36b cross section
DD' cross-section
view cross-section view

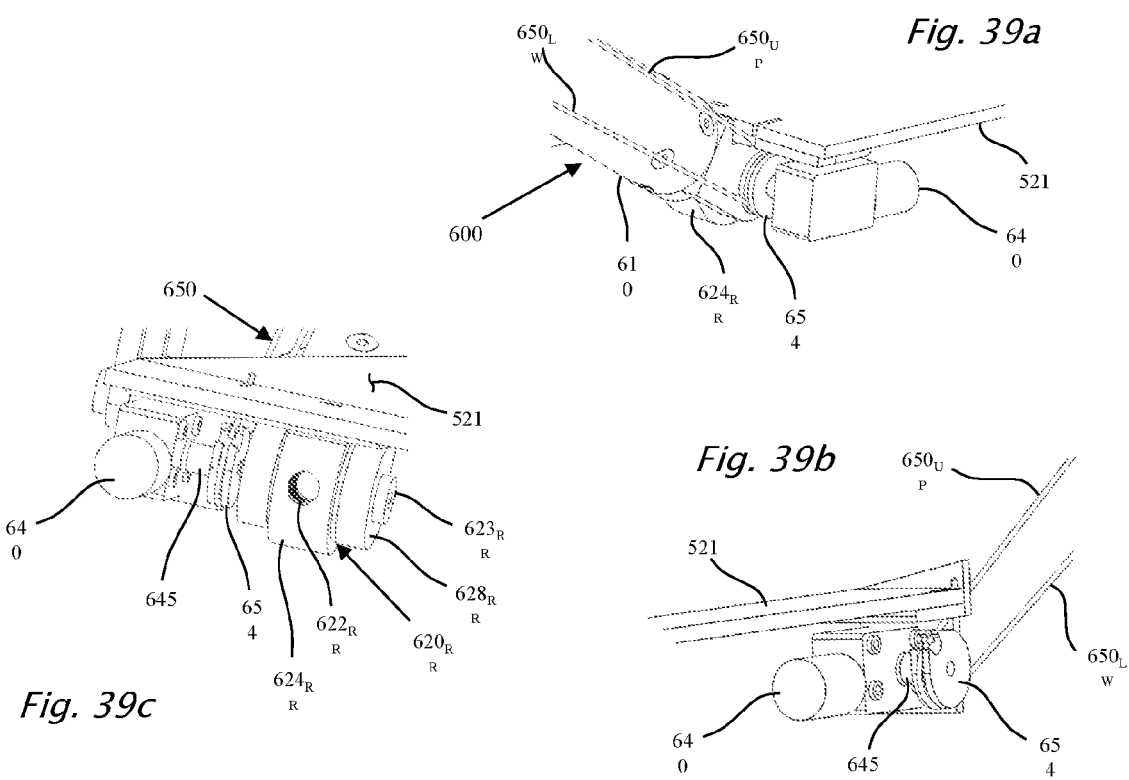

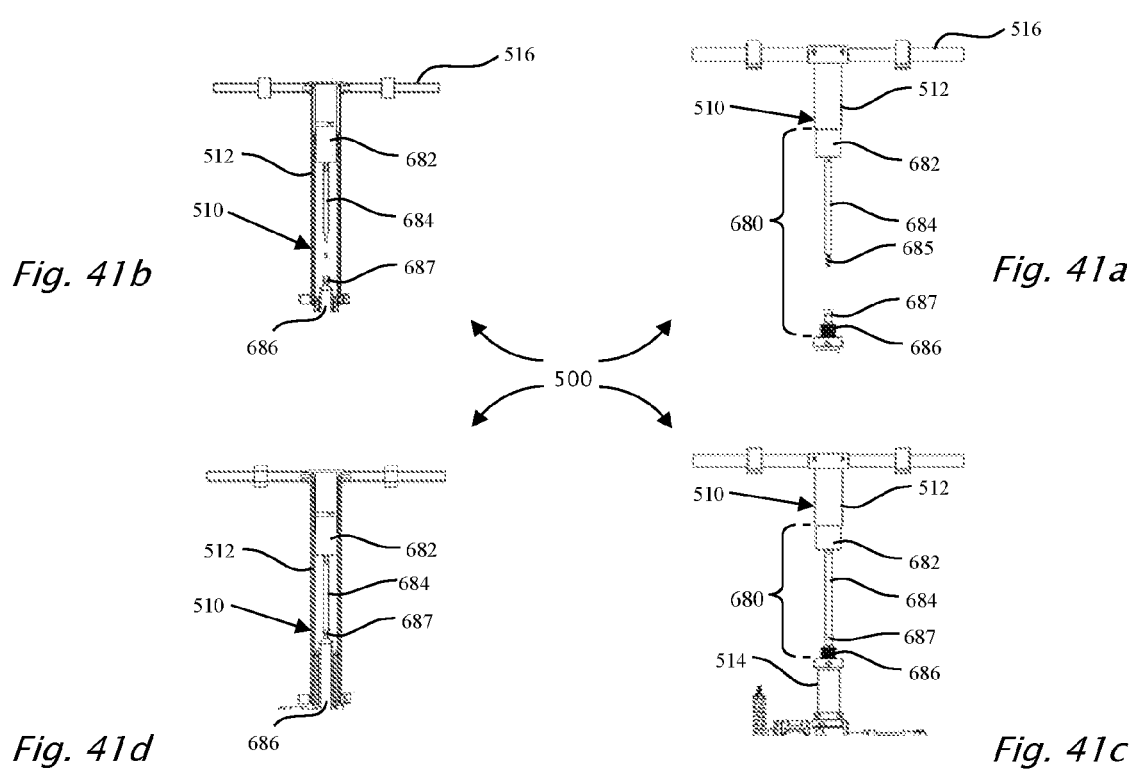

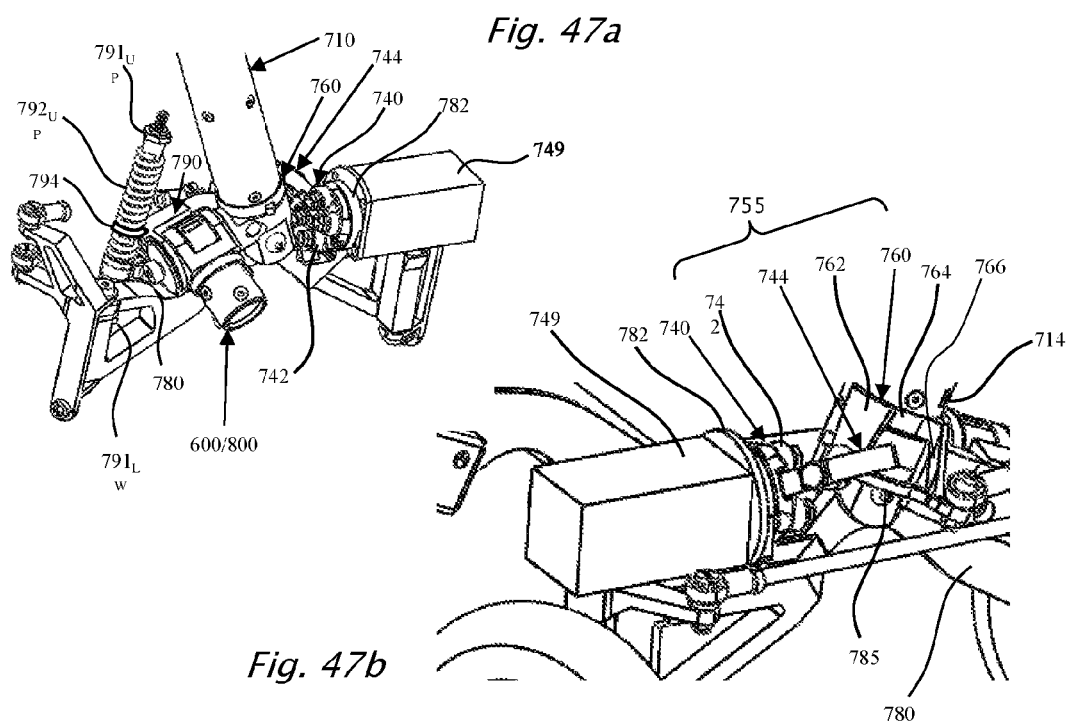

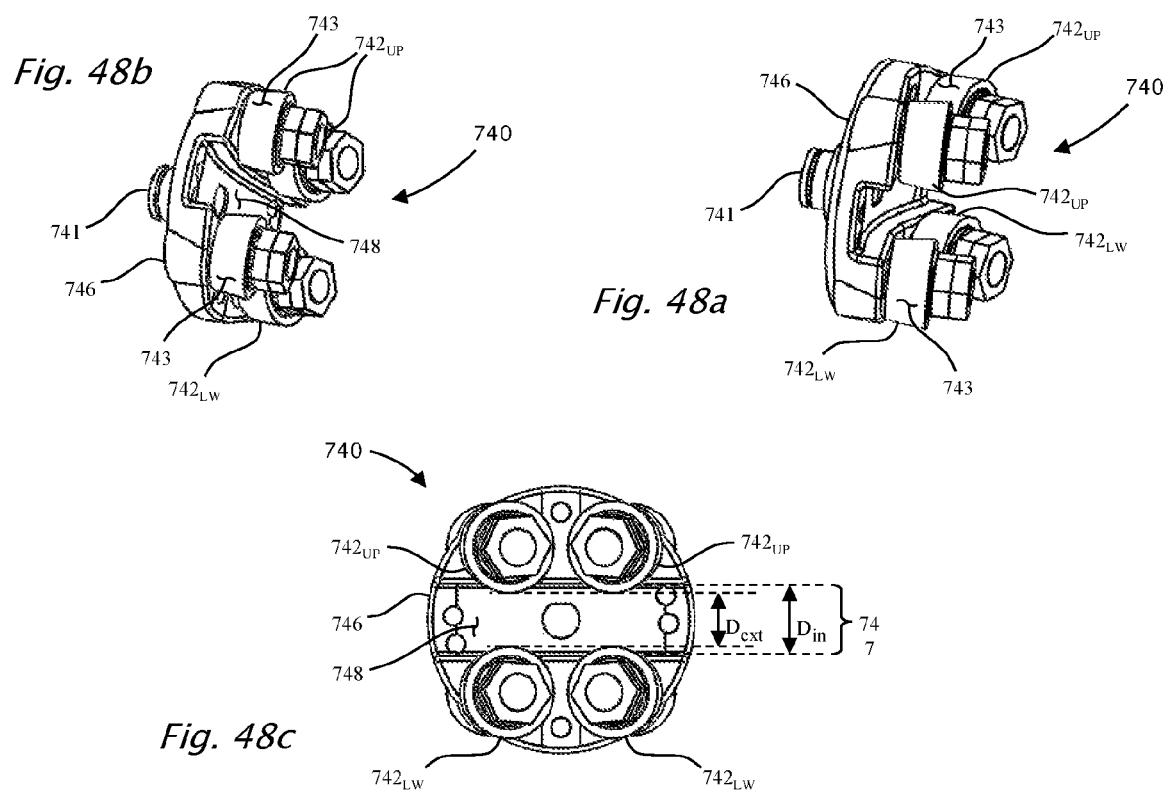

partial, lateral
cross section, top
view rear, vertical
cross section view

Top view vertical cross
section view

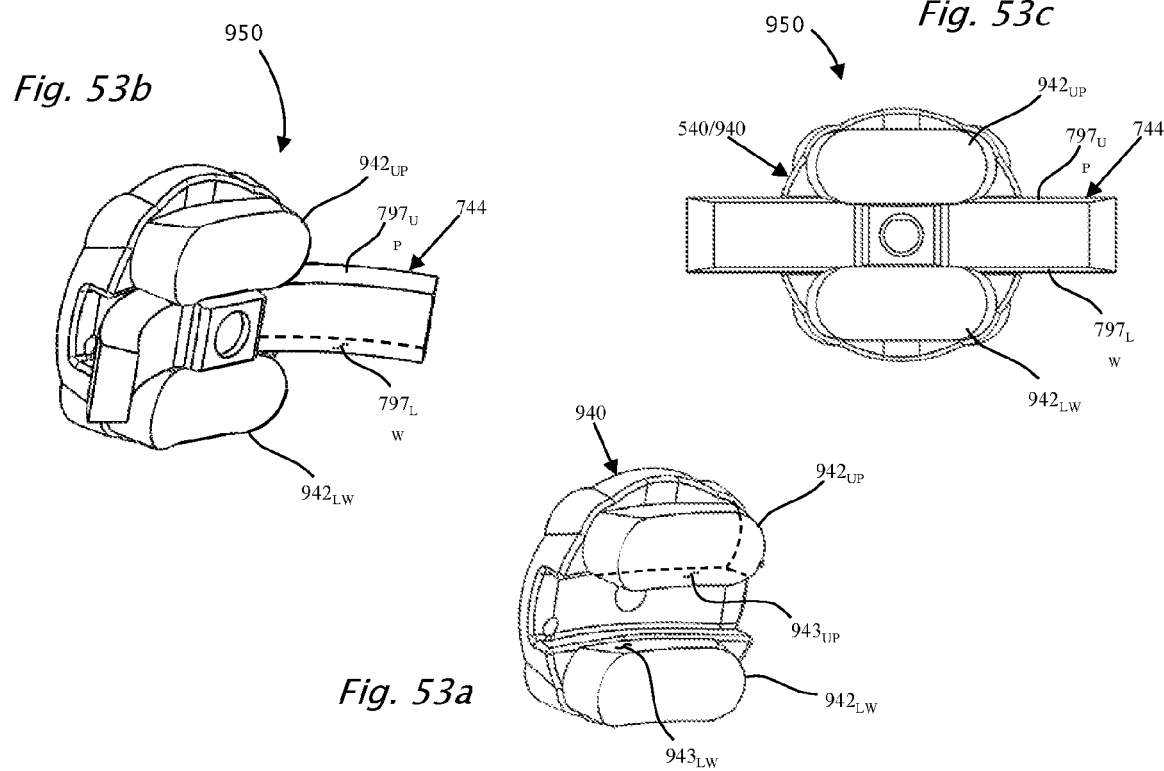

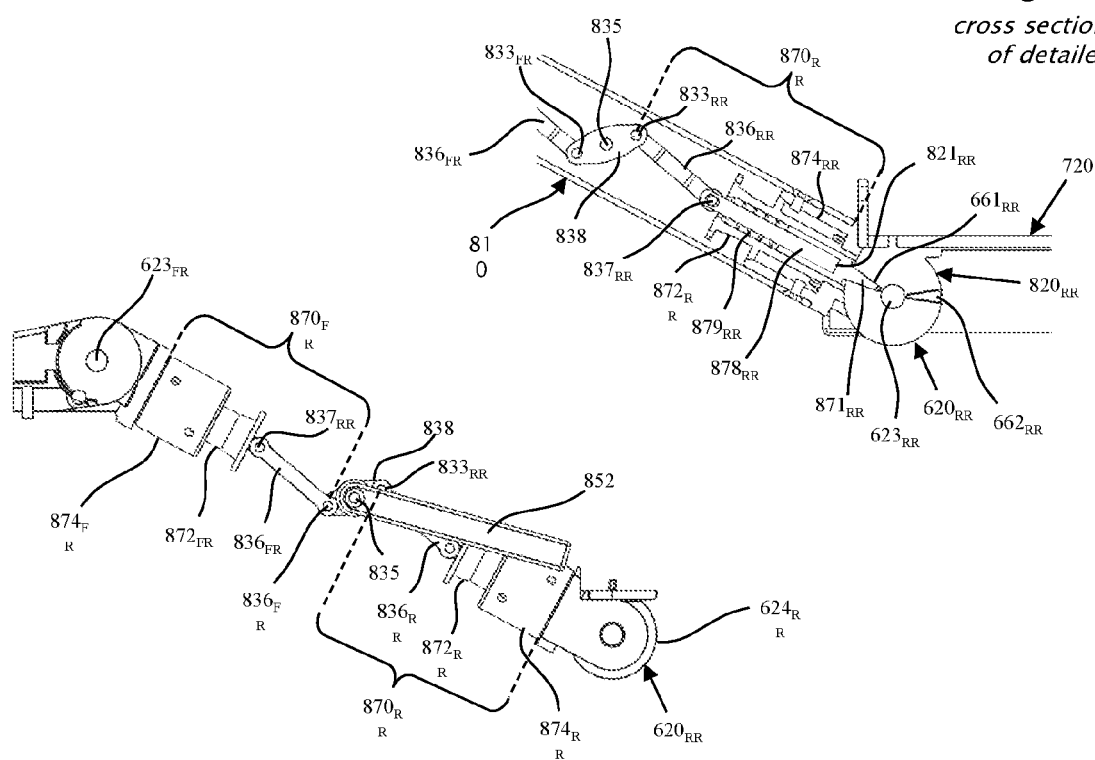

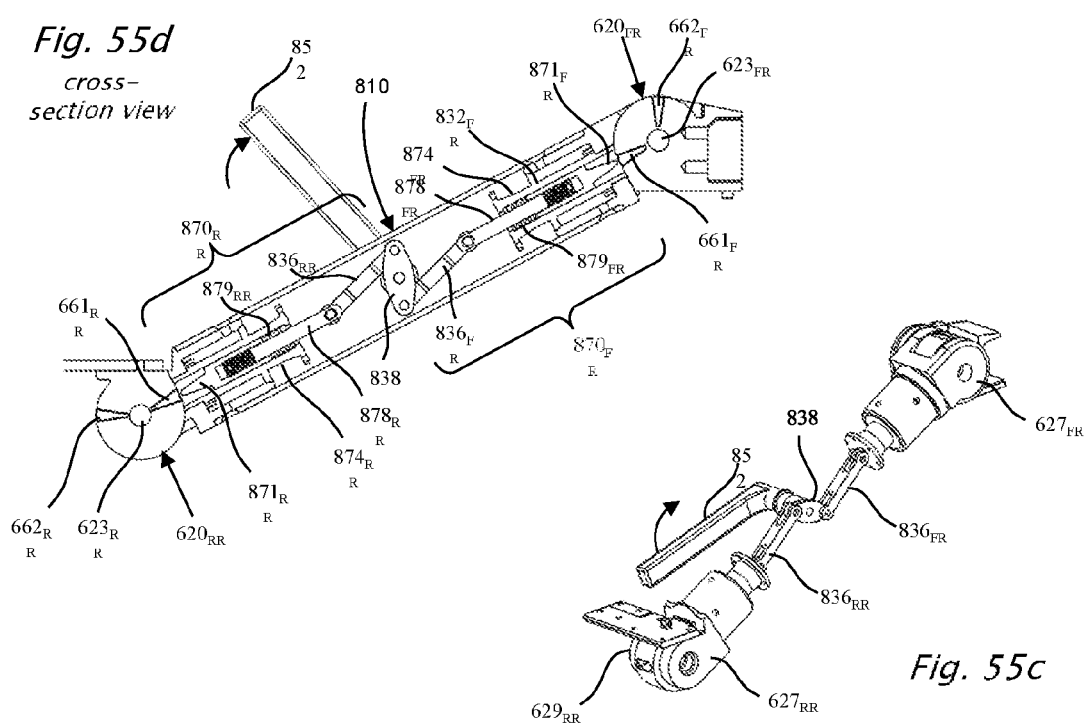

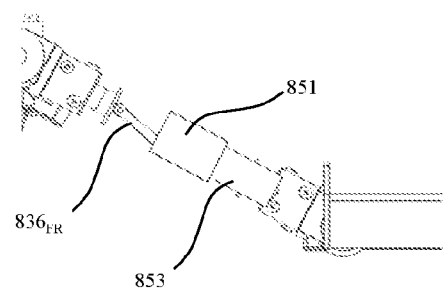
*Fig. 55e*
*Fig. 55f*
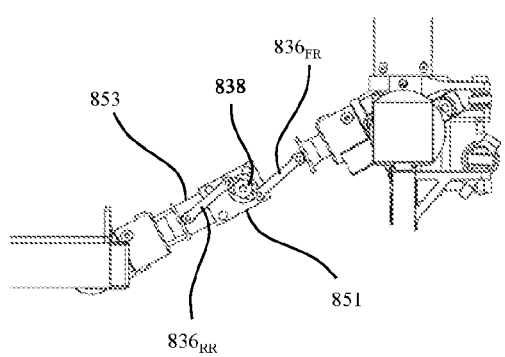

SCOOTER WITH AUTOMATIC TILT OF THE STEERING POST

CROSS REFERENCE TO RELATED APPLICATIONS

This application is a U.S. National Stage Entry under 35 U.S.C. § 371 of International Application No. PCT/IL2021/051276 filed Oct. 27, 2021 entitled "SCOOTER WITH AUTOMATIC TILT OF THE STEERING POST," which claims priority to and the benefit of Israeli Patent Application No. 278369 filed on Oct. 28, 2020. The contents of each application are incorporated herein by reference in their entireties.

FIELD OF THE INVENTION

The disclosure relates to a scooter having two front wheels more specifically, to scooters having two front and wheels controlled by a steering post that is coupled with a steering mechanism such that, when the steering post is pivoted, the steering mechanism synchronizes the tilt of the steering post to incline towards the inside periphery of the turning curve. The scooter may further be a foldable scooter.

BACKGROUND

Scooters are means of transport that are typically of small dimensions, allowing the rider to carry it by hand, when not in use, and in some cases, also capable of collapsing from running position into carry-on/storage position or vice versa (herein after also referred to as "folding").

U.S. Pat. No. 9,272,739 by Amir Zaid et al, discloses a scooter including a deck portion mounted on a pair of front wheels; at least one tail portion foldably coupled to the deck portion and being narrower than the deck portion and mounted on at least one rear wheel thereby providing the deck portion with stability. The scooter further includes a steering post coupled to the front wheels and being foldable with respect to the deck portion.

U.S. Ser. No. 10/322,767 by Costel Dragomir, discloses an improved pedal driven scooter may have a mainframe, a joint-frame, a front balance and steering mechanism, one or two front steering wheel (s), a rear drive wheel, and a drive mechanism. The pedals are pushed rearward and move independent of each other within an adjustable angle range. The drive mechanism translates the alternative movement of the pedals into unidirectional rotation, which is further multiplied, and drives the real wheel. A leaning control mechanism allows a rider to stay mounted when the vehicle is stopped. The scooter can be folded with the joint frame pivoting at both ends, such that the rear-wheel docks between or near the front wheel (s) and the scooter can be carried as if it were a carry-on luggage. The scooter may be further folded for storage with the help of a folding hinge which connects a lower part and an upper part of the front steering mechanism. The term 'scooter' as used herein in the specification and claims is used to denote any of a variety of vehicles, scooters, motorized scooters, mopeds, etc. or any transportation device, having a steering post and at least two front wheels, for carrying one or more riders.

One of the drawbacks of prior art scooters is the small dimensions of such vehicle that may render it unsafe to ride. Some prior art scooters, when turning, the steering post remain in an upright orientation. Therefore, often, when riding a vehicle having two front wheels and doing a turn, due to centrifugal forces, the wheel disposed at the inside periphery of the turning curve, tend to lose grip of the road including being lifted in the air. Furthermore, the front wheels incline towards the inside periphery of the turning curve, to further lose grip of the road.

Hence, there is a need, and it would be advantageous to have a mechanism that when the driver pivots the steering post to make a turn, the mechanism automatically and synchronously, tilts the steering post towards the inside periphery of the turning curve, while keeping the two front wheels upright orientation, when riding in reasonable speed.

It would be further advantageous for the scooter to be foldable and be stored away, or into a trolley that can be carried as if it were a carry-on luggage.

SUMMARY

Unless otherwise defined, all technical and scientific terms used herein have the same meaning as commonly understood by one of ordinary skill in the art to which this disclosure belongs. The materials, methods, and examples provided herein are illustrative only and not intended to be limiting. The present disclosure can be implemented in the testing or practice with methods and materials equivalent or similar to those described herein.

As used herein, a phrase referring to "at least one of a list of items refers to any combination of those items, including single members. As an example, at least one of: a, b, or c" is intended to cover: a, b, c, a-b, a-c, b-c, and a-b-c.

An embodiment is an example or implementation of the present disclosures. The various appearances of "one embodiment," "an embodiment" or "some embodiments" do not necessarily all refer to the same embodiment. Although various aspects of the present disclosure may be described in the context of a single embodiment, the aspects may also be provided separately or in any suitable combination. Conversely, although the disclosure may be described herein in the context of separate embodiments for clarity, the present disclosure may also be implemented in a single embodiment.

Reference in the specification to "one embodiment", "an embodiment", "some embodiments" or "other embodiments" means that a particular feature, structure, characteristic, or other aspects described in connection with the embodiments is included in at least one embodiment, but not necessarily all embodiments, of the present disclosure. It is understood that the phraseology and terminology employed herein are not to be construed as limiting and are for descriptive purpose only.

It should be noted that orientation related descriptions such as "bottom", "up", "upper", "down", "lower", "top", "front", "rear", "right", "left" and the like, assumes that the scooter is being operationally deployed on a surface and is oriented to move forward, wherein the steering post of the scooter is in a straight, upright position, with respect to the surface the scooter is positioned on. For example, a front view means: as viewed from the front end of the scooter; and the left side is the left side of a rider standing on the standing board of the scooter.

According to the teachings of the present disclosure there is provided a scooter apparatus including:
  a) a steering assembly including:
    i) a pivotable steering post having a pivotal axis;
    ii) a handle-bar securely attached to the steering post;
    iii) a pair of front wheels;
    iv) a steering mechanism configured to steer the front wheels;

v) a wheels-pivoting-mechanism configured to pivot the pair of pair of front wheels; and vi) a steering-tilt assembly configured to synchronously tilt the steering post towards the inside periphery of the turning curve, when pivoting the steering post, wherein the rate of the tilt of the steering post, towards the inside periphery of the turning curve, is proportional/directly related to the pivoting rate of the steering post;

b) a deck assembly including:
   i) a standing board configured for supporting feet of a rider standing thereon; and
   ii) a rear wheel assembly including at least one rear wheel; and c) an interface assembly interconnecting the deck assembly with the steering assembly.

Optionally, the steering post includes an upper-post and a lower-post. Preferably, the upper-post and the lower-post are telescopically interconnected.

Preferably, the steering-tilt assembly includes:
a) a tilt-synchronization assembly configured to synchronously tilt the pivotable steering post, when pivoting the steering post about the pivotal axis of the steering post;
b) a pivotal-frame element; and
c) a non-pivotal-frame element, wherein the pivotal-frame element is configured to pivot about the non-pivotal-frame element, to thereby by allow tilt motion of the steering post.

Optionally, the tilt-synchronization assembly includes:
a) a tilt-synchronizing unit, at least a pair of truncated rotating-cones having a sloped periphery and a cones-rotational axis;
b) a post interface section having a rotational axis that coincides the pivotal axis of the steering post;
c) a pivoting receiving linkage component; and
d) a synchronizing body having a pair of arched walls,
wherein the steering post is securely attached to the post interface section of the tilt-synchronizing unit;
wherein the pair of arched walls of the synchronizing body are arched piped walls having a thickness W1 and an axis that coincides with the pivotal axis of the steering post; wherein of the arched piped walls of the synchronizing body are diagonally truncated at their bottom, at an angle $\alpha$, forming a pair of flat faces, wherein each of the flat faces are also sloped laterally, with respect to the pivotal axis of the steering post, going downwardly at an angle $\beta$, as extending from the periphery of the arched piped walls inwardly, towards the pivotal axis of the steering post;
wherein the pair of truncated rotating-cones are configured to freely rotate about respective stationary shafts that are securely attached to the non-pivotal-frame element;
wherein the sloped flat faces are configured to roll over the sloped periphery of the truncated rotating-cones; and
wherein upon the steering post is pivoted by applying a pivotal-force thereon:
a) the tilt-synchronizing unit, being secured to the steering post, pivots too;
b) because of the angle $\alpha$ of the sloped flat faces, one arched wall moves upwards as the respective flat face rolls over the respective truncated rotating-cone, and the other arched wall moves downwards as the respective flat face rolling over the other truncated rotating-cone, wherein while the steering post pivots one arched wall moves upwards and the other arched wall moves downwards, the steering post tilts towards the side of the arched wall that moves downwards.

Optionally, a calibration mechanism is configured to calibrate the friction between each of the sloped flat faces and the respective sloped periphery of the truncated rotating-cones. Angle $\alpha$ may vary along the sloped flat faces.

Preferably, the steering-tilt assembly further includes a pair of balancing-actuators, each having a lower end and an upper end. The lower ends of the balancing-actuators are securely connected to the non-pivotal-frame element at respective locations, and the upper ends of the balancing-actuators are securely connected to the pivotal-frame element at respective locations. The balancing-actuators are configured to actuate the relative rotational power forces between the non-pivotal-frame element and the pivotal-frame element, and asserting a steering-post-return-force counter to the pivotal-force applied to the steering post.

Optionally, the pair of similar balancing-actuators are mounted on a mutual horizontal carrying rod, having a first end stopper and a second end stopper, the horizontal carrying rod is mutual with an internal rod of a damper unit situated between the first end and the second end of the horizontal carrying rod,
wherein the damper serves as a stopper, being securely attached to the non-pivotal-frame element; and
wherein the end stoppers serve as force-receiving ends being attached to moving elements of the steering mechanism, wherein the moving elements of the steering mechanism are directly related to the pivotal motion of the steering post about the pivotal axis.

Optionally, when the steering post is pivoted, the wheels-pivoting-mechanism pivots the front wheels, wherein the pivoted wheels remain in an upright orientation, and wherein each of the pivoted wheels pivots about a respective independent shaft.

Optionally, when the steering post is pivoted, the wheels-pivoting-mechanism pivots the front wheels, wherein both wheels remain firmly on the road, when riding in reasonable speed.

Preferably, the at least one rear wheel is motorized, wherein the power motor may drive the scooter apparatus either forward or backwards.

The standing board is attached to the pivotal-frame element, such that when the pivotal-frame element is tilted, the standing board inclines sideways towards the inside periphery of the turning curve.

Optionally, the power motor and the pair of front-wheels facilitates the scooter apparatus to stand still, without any support, and to drive autonomously, wherein the scooter may further include an autonomous driving mechanism, including:
   a. an autonomous motor;
   b. a rotation-transmission-rod; and
   c. a rotation-receiving-rod,
   wherein the autonomous motor is disposed inside the upper-post of the steering post;
   wherein the rotation-receiving-rod is secured to lower-post of the steering post;
   wherein the rotation-transmission-rod and the rotation-receiving-rod are operationally disengaged, when not driving autonomously;
   wherein the rotation-transmission-rod and the rotation-receiving-rod are operationally engaged by moving the upper-post downwards over (or inside) the lower-post, until the rotation-transmission-rod engages with the rotation-receiving-rod; and wherein by activating the autonomous motor the scooter can be driven forward or backward.

The autonomous driving mechanism may further include additional added-devices selected from the group of devices including a camera, GPS, a controller and means for remote communication.

Preferably, the interface assembly interconnects with the deck assembly by at least one pivotal connection, and with the steering assembly by pivotal connections, and wherein the pivotal connections facilitate to fold the scooter from a deployed position to a folded state, and from a folded state to a deployed position.

Preferably, the scooter apparatus further includes a deployed-position-locking mechanism configured to lock the pivotal connections when in deployed position.

Preferably, the scooter apparatus further includes folded-state-locking mechanism configured to lock the pivotal connections when in folded position.

The deployed-position-locking mechanism may include:
a) at least one deck-locking-pin configured to lock pivotal motion between the interfacing assembly and the deck assembly;
b) at least one post-locking-pin configured to lock pivotal motion between the interfacing assembly and the steering assembly;
c) a folding handle; and
d) a cable subsystem securely attached to the folding handle, wherein the cable subsystem configured to unlock the at least one deck-locking-pin and the at least one post-locking-pin, when the folding handle is activated.

Preferably, each the deck-locking-pins and post-locking-pin includes a locking-pin unit having a locking-end, and a biasing element, wherein when folding from folded state to deployed position, locking-pin unit moves back against the biasing element, until locking-end is free to enter a receiving opening, to thereby pushed into the receiving opening and lock locking-pin unit therein, to thereby prevent pivotal motion between the interfacing assembly and the deck assembly and between the interfacing assembly and the steering assembly.

Optionally, the deck assembly includes a deck-frame having board-profiles, wherein one or more first-magnets are attached to at least board-profile and a folding handle. The interface assembly may include interfacing-profile-arms, wherein one or more complimentary-magnets are attached to at least one interfacing-profile-arm, wherein the scooter is in a folded state, the one or more first-magnets and the respective one or more complimentary-magnets are preconfigured to be located adjacently to thereby form a mutual magnetic force, and hold the scooter in the folded state by the formed mutual magnetic force.

Optionally, the folding handle has an extended tail-end, wherein when the scooter in locked folded state and the folding handle is activated, the extended tail-end presses against the external surface of the steering post to thereby overcome the formed magnetic force and bring apart the adjacent first-magnet and the respective complimentary-magnet into an unlocked folded state.

The scooter apparatus may further include a detachable utility case, wherein the scooter is preferably configured to fold from a deployed position to a folded state, including when detachable utility case is attached onto the scooter.

According to further teachings of the present disclosure, there is provided a steering-tilt assembly that includes:
a. a tilt-synchronization assembly including:
  i. a tilt-synchronizing unit;
  ii. a truncated rotating-cone having a sloped periphery; and
  iii. a cone-rotational axis and a pivotal-interface unit including a stationary shaft, wherein the truncated rotating-cone is rotatably mounted thereon the stationary shaft;
b. a tilt-conveyor unit; and
c. a non-pivotal-frame element,
wherein the tilt-conveyor unit is configured to pivot about the non-pivotal-frame element, to thereby by allow tilt motion of the steering post;
wherein the pivotal-interface unit includes:
a. a post interface section having a rotational axis that coincides with the pivotal axis of the steering post;
b. a pivoting receiving linkage arm that is securely attached to the tilt-conveyor unit;
c. a rotating-cone linkage arm; and
d. a rotating-cone linkage assembly including a stationary shaft, wherein the truncated rotating-cone is rotatably mounted on the stationary shaft,
wherein the tilt-synchronizing unit includes:
a. a pair of parallel elongated arched-ribs, having an initial inclination angle when steering post is in upright position, including: a top arched-rib and a bottom arched-rib, wherein each of the arched-ribs has a respective inner flat face that is laterally slopped inwardly, away from the steering post, forming a gap between the top arched-rib and the bottom arched-rib, wherein the internal-arched-gap $D_{in}$ is distal from the steering post and the external-arched-gap $D_{ext}$ is proximal to the steering post, and wherein the internal-arched-gap $D_{in}$ is wider than the external-arched-gap $D_{ext}$,
wherein the tilt-synchronizing unit is securely attached to the non-pivotal-frame element;
wherein the steering post is securely attached to the post interface section of the pivotal-interface unit;
wherein the pair of arched-ribs are arched and have a depth of W2 and a transverse axis that operatively coincides with the pivotal axis of the steering post;
wherein the slopes of the truncated rotating-cone and the slopes of the inner flat faces are operatively of the same angle, γ;
wherein the tilt-synchronizing unit and the pivotal-interface unit are operatively interfaced such that the truncated rotating-cone is disposed there between the top arched-rib and the bottom arched-rib, allowing the truncated rotating-cone to freely and fittingly, roll there inside the internal space formed between the inner flat faces of the top arched-rib and the bottom arched-rib;
wherein when the steering post is pivoted by applying a pivotal-force thereon, then:
a. the tilt-synchronizing unit, being securely attached to the non-pivotal-frame element, does not pivot with the steering post;
b. the pivotal-interface unit, being securely attached to the steering post and to the pivotal-frame element, pivots with the steering post;
c. since the truncated rotating-cone can freely and fittingly roll there inside the internal space formed between the inner flat faces of the top arched rib and the bottom arched rib, the truncated rotating-cone rolls there inside the internal space formed between the inner flat faces of the top arched-rib and the bottom arched-rib; and d. since the pivoting receiving linkage arm is securely attached to the tilt-conveyor unit, and since the tilt-conveyor unit is configured to pivot about non-pivotal-frame element, to thereby by allow tilt motion of the steering post, when the steering post pivots; and wherein while the steering post pivots, the pivoting receiving linkage arm pivots too, causing the tilt-conveyor unit to pivot about non-pivotal-frame element, and thereby tilting the steering post into the side to which the steering post pivots.

Optionally, a calibration mechanism is configured to calibrate the friction between each of the inner flat faces and the sloped periphery of the truncated rotating-cone.

Optionally, the pair of similar balancing-actuators, each having a lower end and an upper end, are mounted on a mutual vertical carrying rod, the vertical carrying rod having a lower rod end and an upper rod end being the stopper ends, and wherein a pair end-stoppers limit the motion of the balancing-actuators disposed therebetween the end-stoppers on the vertical carrying rod;

wherein the balancing-actuators are separated by a force conveying ring disposed there between, the force conveying ring being the force-receiving end for both balancing-actuators, wherein the force conveying ring is securely attached to the tilt-conveyor unit, being the pivotal-frame element, and wherein the force conveying ring receives a forceful motion vector along the vertical carrying rod and towards either of the balancing-actuators the from tilt-conveyor unit; and wherein the lower rod end of the vertical carrying rod is securely connected to the non-pivotal-frame element.

Optionally, the standing board is attached to the tilt-conveyor unit, and wherein when the tilt-conveyor unit is tilted, the standing board inclines sideways towards the inside periphery of the turning curve.

Optionally, when the steering post is pivoted, the wheels-pivoting-mechanism pivots the front wheels, wherein the pivoted wheels remain in an upright orientation. Typically, each of the pivoted wheels pivots about a respective independent shaft.

Optionally, when the steering post is pivoted, the wheels-pivoting-mechanism pivots the front wheels, wherein both wheels remain firmly on the road.

Optionally, a speed-biasing motor is configured to pivot tilt-synchronizing unit to thereby bias the tilt angle of steering post.

According to further teachings of the present disclosure, there is provided a scooter apparatus, wherein the steering-tilt assembly includes:
a. a tilt-synchronization assembly including:
  i. a tilt-synchronizing unit;
  ii. a mountable-arched-rib; and
  iii. a pivotal-interface unit including a stationary shaft, wherein the mountable-arched-rib is stationary mounted thereon the stationary shaft;
b. a tilt-conveyor unit; and
c. a non-pivotal-frame element,
wherein the tilt-conveyor unit is configured to pivot about the non-pivotal-frame element, to thereby by allow tilt motion of the steering post;
wherein the pivotal-interface unit includes:
a. a post interface section having a rotational axis that coincides with the pivotal axis of the steering post;
b. a pivoting receiving linkage arm that is securely attached to the tilt-conveyor unit;
c. an arched-rib linkage arm; and
d. an arched-rib linkage assembly configured to mount the mountable-arched-rib there-on,
wherein the tilt-synchronizing unit includes:
a. at least one upper truncated rotating-cone having a sloped periphery, and at least one lower truncated rotating-cone having a sloped periphery that are laterally slopped inwardly, away from the steering post, wherein the internal-coned-gap $D_{in}$, formed between the at least one upper truncated rotating-cone and at least one lower truncated rotating-cone, is distal from the steering post and the external-arched-gap $D_{ext}$ is proximal to the steering post, and wherein the internal-arched-gap $D_{in}$ is wider than the external-arched-gap $D_{ext}$;

wherein the tilt-synchronizing unit is securely attached to the non-pivotal-frame element;

wherein the steering post is securely attached to the post interface section of the pivotal-interface unit;

wherein the mountable-arched-rib is arched and has a depth of W3 and a transverse axis that operatively coincides with the pivotal axis of the steering post;

wherein the periphery slopes of the truncated rotating-cones and the both the inclined upper flat face and the inclined lower flat face of mountable-arched-rib are inclined by the same angle, $\gamma$;

wherein the tilt-synchronizing unit and the pivotal-interface unit are operatively interfaced such that the mountable-arched-rib is disposed between the at least one upper truncated rotating-cone and at least one lower truncated rotating-cone, allowing the mountable-arched-rib to move laterally inside the internal space formed between the at least one upper truncated rotating-cone and at least one lower truncated rotating-cone;

wherein when the steering post is pivoted by applying a pivotal-force thereon, then:
a. the tilt-synchronizing unit, being securely attached to the non-pivotal-frame element, does not pivot with the steering post;
b. the pivotal-interface unit, being securely attached to the steering post and to the pivotal-frame element, pivots with the steering post;
c. since the truncated rotating-cone can freely and fittingly roll there inside the internal space formed between the inner flat faces of the top arched rib and the bottom arched rib, the mountable-arched-rib slides there between the at least one upper truncated rotating-cone and at least one lower truncated rotating-cone; and
d. since the pivoting receiving linkage arm is securely attached to the tilt-conveyor unit, and since the tilt-conveyor unit is configured to pivot about non-pivotal-frame element, to thereby by allow tilt motion of the steering post, when the steering post pivots; and wherein while the steering post pivots, the pivoting receiving linkage arm pivots too, causing the tilt-conveyor unit to pivot about non-pivotal-frame element, and thereby tilting the steering post into the side to which the steering post pivots.

Optionally, a calibration mechanism is configured to calibrate the friction between each of the inner flat faces and the sloped periphery of the truncated rotating-cone.

Optionally, the pair of similar balancing-actuators, each having a lower end and an upper end, are mounted on a mutual vertical carrying rod, the vertical carrying rod having a lower rod end and an upper rod end being the stopper ends, and wherein a pair end-stoppers limit the motion of the balancing-actuators disposed therebetween the end-stoppers on the vertical carrying rod;

wherein the balancing-actuators are separated by a force conveying ring disposed there between, the force conveying ring being the force-receiving end for both balancing-actuators, wherein the force conveying ring is securely attached to the tilt-conveyor unit, being the pivotal-frame element, and wherein the force conveying ring receives a forceful motion vector along the vertical carrying rod and towards either of the balancing-actuators the from tilt-conveyor unit; and wherein the lower rod end of the vertical carrying rod is securely connected to the non-pivotal-frame element.

Optionally, the standing board is attached to the tilt-conveyor unit, and wherein when the tilt-conveyor unit is tilted, the standing board inclines sideways towards the inside periphery of the turning curve.

Optionally, when the steering post is pivoted, the wheels-pivoting-mechanism pivots the front wheels, wherein the pivoted wheels remain in an upright orientation, and wherein each of the pivoted wheels pivots about a respective independent shaft.

Optionally, when the steering post is pivoted, the wheels-pivoting-mechanism pivots the front wheels, wherein both wheels remain firmly on the road.

Optionally, a speed-biasing motor is configured to pivot tilt-synchronizing unit to thereby bias the tilt angle of steering post.

According to further teachings of the present disclosure, there is provided a scooter apparatus, wherein the pair of similar balancing-actuators are mounted on a mutual horizontal carrying rod, having a first end stopper and a second end stopper, the horizontal carrying rod is mutual with an internal rod of a damper unit situated between the first end and the second end of the horizontal carrying rod, wherein the damper serves as a stopper, being securely attached to the non-pivotal-frame element; and also as the force-receiving ends for both balancing-actuators; wherein the first end of the horizontal carrying rod serves as a stopper, being secured to the non-pivotal-frame element; and wherein the end stoppers serve as force-receiving ends being attached to moving elements of the steering mechanism, wherein the moving elements of the steering mechanism are directly related to the pivotal motion of the steering post about the pivotal axis.

According to further teachings of the present disclosure, the scooter apparatus may further include a scooter-folding-interface assembly configured to lock the pivotal connections when in either deployed position or in folded state, wherein the scooter-folding-interface assembly includes:

a. an interfacing-profile-arm including a rear joint interface element having a rear profile end and a front joint interface element having a front profile end;

b. a rear-pivotal-joint pivotally mounted over a rear hinge-shaft;

c. a front-pivotal-joint pivotally mounted over a front hinge-shaft; and d. a cable subsystem, wherein the rear profile end of the interfacing-profile-arm is pivotally attached to the rear-pivotal-joint and the rear-pivotal-joint is securely attached to the deck assembly, facilitating pivotal motion between the interfacing-profile-arm and the deck assembly; and wherein the front profile end of the interfacing-profile-arm is pivotally attached to the front-pivotal-joint and the front-pivotal-joint is securely attached to the tilt-conveyor unit, facilitating pivotal motion between the interfacing-profile-arm and the steering mechanism.

Optionally, the cable subsystem includes tension-cables selected from the group including a drive belt, a timing belt and a chain coupled with a pair of cog-wheels.

Optionally, the cable subsystem includes: a non-elastic tension-cable;

a. a stationary front cable-wheel; and b. a pivotal rear cable-wheel, wherein the tension-cable is wrapped over the stationary front cable-wheel and the pivotal rear cable-wheel;

wherein the tension-cable is anchored to the stationary front cable-wheel and the pivotal rear cable-wheel;

wherein the rear-pivotal-joint includes a rear shaft-holding-hinge-device and rear ring element, and wherein the rear shaft-holding-hinge-device is securely attached to the rear profile end, facilitating pivotal motion of the interfacing-profile-arm with respect to the rear shaft-holding-hinge-device; and wherein the front-pivotal-joint includes a front shaft-holding-hinge-device and front ring element, and wherein the front shaft-holding-hinge-device is securely attached to the front profile end, facilitating pivotal motion of the interfacing-profile-arm with respect to the front shaft-holding-hinge-device.

Optionally, the scooter-folding-interface assembly further includes a folding motor for automatic folding or unfolding of the scooter-folding-interface assembly, wherein the folding motor is operatively engaged with the tension-cable.

Optionally, the rear cable-wheel is of smaller diameter than the diameter of the front cable-wheel by a preconfigured ratio, the thereby bring the motion path of the scooter-folding-interface assembly and the deck assembly to a preconfigured simultaneous rest state being the folded state.

Optionally, the pivotal rear-pivotal-joint and the pivotal front-pivotal-joint, each includes a deployed receiving cavity and a folded receiving cavity, each configured to receive a respective locking-end of a respective latch-bolt; wherein each of the deployed receiving cavities is configured to receive a respective locking-end of the respective latch-bolt, when the scooter apparatus is in the deployed position, and wherein each of the folded receiving cavities is configured to receive a respective locking-end of the respective latch-bolt, when the scooter apparatus is in the folded state.

Optionally, the interfacing-profile-arm includes:

a. a rear, lower locking mechanism; and b. a front, upper locking mechanism, wherein the rear, lower locking mechanism includes:

a. a rear, lower latch-bolt configured to be driven into or out of either the deployed receiving cavity or the folded receiving cavity; and b. a rear, lower-section motor, wherein the lower-section motor is configured to rotate the lower latch-bolt; and wherein, when the lower-section motor drives the lower latch-bolt in a first direction, the lower latch-bolt is driven into either the deployed receiving cavity or into the folded receiving cavity, to thereby lock the rear-pivotal-joint in the selected state; and when the lower-section motor drives the lower latch-bolt in the second direction, the lower latch-bolt is driven out of either the deployed receiving cavity or out of the folded receiving cavity, to thereby unlock the rear-pivotal-joint, wherein the front, upper locking mechanism includes:

a. a front, upper latch-bolt configured to be driven into or out of either the deployed receiving cavity or the folded receiving cavity;

b. a front, upper-section motor, wherein the upper-section motor is configured to rotate the upper latch-bolt; and wherein, when the lower-section motor drives the upper latch-bolt in a first direction, the lower latch-bolt is driven into either the deployed receiving cavity or into the folded receiving cavity, to thereby lock said front-pivotal-joint in the selected state; and when said upper-section motor drives said upper latch-bolt in the second direction, said upper latch-bolt is driven out of either said deployed receiving cavity or out of said folded receiving cavity, to thereby unlock said front-pivotal-joint.

Optionally, the pivotal rear-pivotal-joint and the pivotal front-pivotal-joint, each includes a deployed receiving cavity and a folded receiving cavity, each configured to receive a respective locking-end of a respective latch-link-device; wherein each of the deployed receiving cavities is configured to receive respective the respective locking-end of the respective latch-link-device, when the scooter apparatus is in the deployed position, and wherein each of the folded receiving cavities is configured to receive the respective locking-end of the respective latch-link-device, when the scooter apparatus is in the folded state.

Optionally, the interfacing-profile-arm includes:

a. a rear, lower link-locking mechanism;
b. a front, upper link-locking mechanism;
c. a wobbling-axes-link having a pivotal axis; and
d. a folding-links-pivotal handle or a folding-links-pivotal motor, wherein the rear, lower locking-link mechanism includes:

a. a rear, lower latch-link-device configured to be driven into or out of either the deployed receiving cavity or the folded receiving cavity; and
b. an intermediate-arm-link pivotally connected, at a rear, lower end to the lower latch-link-device,
    wherein the lower latch-link-device includes a locking-pin housing accommodating the lower latch-link-device and a locking-biasing-device that is configured to push the lower latch-link-device towards either the deployed receiving cavity or the folded receiving cavity;
    wherein the intermediate-arm-link is configured to drive the lower latch-link-device into or out of either the deployed receiving cavity or the folded receiving cavity; and
    wherein the intermediate-arm-link is configured to receive a pivotal motion from the wobbling-axes-link, pivotally connected thereto at the upper end;

wherein the front, upper link-locking mechanism includes:

a. a front, upper latch-link-device configured to be driven into or out of either the deployed receiving cavity or the folded receiving cavity; and
b. an intermediate-arm-link pivotally connected, at a rear, upper end to the upper latch-link-device,
    wherein the intermediate-arm-link is configured to drive the upper latch-link-device into or out of either the deployed receiving cavity or the folded receiving cavity; and
    wherein the intermediate-arm-link is configured to receive a pivotal motion from the wobbling-axes-link, pivotally connected thereto at the upper end;

wherein the wobbling-axes-link is configured to pivot about the respective pivotal axis, either manually by the folding-links-pivotal handle or by the folding-links-pivotal motor;

wherein, when the wobbling-axes-link is pivoted against the locking-biasing-device, the respective locking-end is pulled out of the respective deployed receiving cavity or out of the respective folded receiving cavity, to thereby unlock the rear-pivotal-joint and the front-pivotal-joint, and when the scooter reaches the deployed position or the folded state, as desired, the locking-biasing-device drives the into the deployed receiving cavity and/or the folded receiving cavity.

Optionally, the rear wheel assembly further includes a rear-wheel cover, wherein the rear-wheel cover is configured to protect the rear wheel, to serve as a brake mechanism, and/or serve as a kickstand.

BRIEF DESCRIPTION OF THE DRAWINGS

The present disclosure is herein described, by way of non-limiting example, with reference to the accompanying drawings. With specific reference now to the drawings in detail, it is stressed that the particulars shown are by way of example and for purposes of illustrative discussion of the embodiments of the present disclosure only, and are presented in order to provide what is believed to be the most useful and readily understood description of the principles and conceptual aspects of the present disclosure. In this regard, no attempt is made to show structural details of the present disclosure in more detail than is necessary for a fundamental understanding of the present disclosure, the description taken with the drawings making apparent to those skilled in the art how the several forms of the present disclosure may be embodied in practice. In the figures:

FIG. 1 schematically illustrates a non-limiting example of a scooter, including a steering post, a deck assembly, a steering mechanism, a rear wheel assembly and an optional detachable bag, according to aspects of the present disclosure, wherein the steering post is in a straight, upright position.

FIG. 2 schematically illustrates a non-limiting example of the scooter shown in FIG. 1, wherein the steering post is a left turn instance position.

FIGS. 7a and 7b illustrate front perspective elevated views of a steering-tilt assembly to show the inter-relation between the pivotal-frame element and the non-pivotal-frame element.

FIG. 7c is a detailed view A, as denoted in FIG. 7b, showing a schematic illustration of the tilt-synchronizing unit.

FIG. 8a is a front view schematic illustration of the tilt-synchronizing unit, the scooter being in a straight, upright position.

FIG. 8b is a side elevated view of tilt-synchronizing unit shown in FIG. 8a.

FIG. 8c is a bottom perspective view of tilt-synchronizing unit shown in FIG. 8a.

FIG. 10b is a rear perspective view of tilt-synchronizing unit shown in FIG. 10a.

FIG. 12a is a front perspective view schematic illustration the folded scooter, according to embodiments of the present disclosure.

FIG. 12b is a rear perspective view of the folded scooter, wherein the folding process is facilitated after the deck assembly and a pair of interfacing-profile-arms are unlocked using the folding handle.

FIG. 13a is a front perspective view schematic illustration the folded scooter in a folded state, wherein the scooter further includes a utility case configured to be attached to the steering post, including in a folded state, according to embodiments of the present disclosure.

FIG. 13b is a side view of the folded scooter shown in FIG. 13a.

FIG. 17a is a rear elevated perspective view of the folded scooter shown in FIG. 13a.

FIG. 17b is a rear perspective view of as example utility case, configured to be integrally attached onto the scooter of the present disclosure.

FIG. 17c is a front view of a scooter, according to embodiments of the present disclosure, showing, by way of example, shoulder bolts onto which bolts respective hinges secured to utility case, are configured to lock, by slide over the respective shoulder bolts.

FIG. 21a is a side close-up view of a portion of the folded scooter as in FIG. 20, wherein adjacent first-magnet and a respective complimentary-magnet are shown contracted.

FIG. 21b is a side view of a portion of folded scooter as in FIG. 21a, wherein the folding handle is shown lifted, wherein the folding handle is lifted in order to unlock the folded scooter.

FIG. 21c is a detailed view B, as denoted in FIG. 21b, showing the extended tail-end of the folding handle pressing against the external surface of the upper-post and thereby, overcome the magnetic force bring apart the adjacent first-magnet and its respective complimentary-magnet.

FIG. 24 is a rear perspective view, schematic illustration the scooter shown in FIG. 23, wherein the steering post is pivoted to the left and thereby also tilted to the left.

FIG. 25 is a top perspective view, schematic illustration of the front section of the scooter shown in FIG. 24.

FIG. 28b is a front elevated perspective view illustration of the steering mechanism shown in FIG. 28a.

FIG. 28c. is a rear, vertical cross-section view illustration of a portion of the steering mechanism components shown in FIG. 28a.

FIG. 29a is a front, top perspective view illustration of tilt-synchronizing unit of the steering mechanism components shown in FIG. 28a.

FIG. 29b is a front, bottom perspective view of the tilt-synchronizing unit shown in FIG. 29a.

FIG. 29d illustrates a front, vertical cross-section view of the tilt-synchronizing unit shown in FIG. 29a.

FIG. 29e illustrates a front, lateral cross-section view of the tilt-synchronizing unit shown in FIG. 29a.

FIG. 30b is a bottom perspective view illustration of the tilt-synchronizing unit shown in FIG. 30a.

FIG. 33a is a front perspective view schematic illustration a folded scooter, according to embodiments of the present disclosure, the scooter being in a folded state.

FIG. 33b is a rear perspective view of the folded scooter shown in FIG. 33a, wherein a utility case is mounted thereon.

FIG. 36a is a rear perspective view illustration of the scooter-folding-interface assembly, wherein scooter is in a deployed position, and includes a folding motor.

FIG. 36b illustrates the scooter-folding-interface assembly shown in FIG. 36a, wherein the folding motor has been removed for illustration purposes only.

FIG. 38a is a side view illustration of the scooter shown in FIG. 34a.

FIG. 39a is a front, side perspective view schematic illustration of the interface of the rear cable-wheel and folding the motor, according to some non-limiting example embodiments of the present disclosure.

FIG. 39b is a rear, side, partial cross-section perspective view schematic illustration of the interface of the rear cable-wheel and folding motor, as shown in FIG. 39a.

FIG. 39c is a rear, elevated perspective view schematic illustration of the interface of the lower rear-pivotal-joint, including a folding motor, as shown in FIG. 39a.

FIG. 40b is a side view illustration of the example rear-wheel cover shown in FIG. 40a.

FIG. 41a illustrates elements of a non-limiting example embodiment of an autonomous driving mechanism that includes an autonomous motor disposed inside the upper-post of the steering post.

FIG. 41b is a rear, cross-section view of the autonomous driving mechanism shown in FIG. 41a.

FIG. 41c is a rear view illustration of autonomous driving mechanism shown in FIG. 41a, wherein a rotation-transmission-rod and a rotation-receiving-rod are operationally engaged.

FIG. 41d is a rear, cross-section view of the autonomous driving mechanism shown in FIG. 41c.

FIG. 47a is a rear elevated perspective view illustration of the steering mechanism shown in FIG. 46a, while the scooter is in a left turn instance position.

FIG. 47b is a front elevated perspective view illustration of the steering mechanism shown in FIG. 47a.

FIG. 48a is a front, top perspective view illustration of tilt-synchronizing unit of the steering mechanism components shown in FIG. 47a.

FIG. 48b is a front, bottom perspective view of the tilt-synchronizing unit shown in FIG. 48a.

FIG. 48c is a side view of the tilt-synchronizing unit shown in FIG. 48a, as viewed from the steering post.

FIG. 48d illustrates a rear, vertical, cross-section view of tilt-synchronizing unit shown in FIG. 48a.

FIG. 48e illustrates a partial, lateral cross-section, top view of tilt-synchronizing unit shown in FIG. 48a.

FIG. 49b, illustrates a top view of the mountable-arched-rib, wherein the inclined upper flat face is fully shown, and wherein the mountable-arched-rib is shown to be part of an imaginary cylindrical ring having a width W3 and a pivotal axis that operatively coincides with pivotal axis of the steering post.

FIG. 50a is a top perspective view illustration of the tilt-synchronizing unit of the scooter shown in FIG. 42a, wherein the mountable-arched-rib is disposed between the upper pair of truncated rotating-cones, when the steering post is in an upright position.

FIG. 50b is a vertical cross-section view of the assembly of tilt-synchronizing unit and mountable-arched-rib, as shown in FIG. 50a.

FIG. 50c is a rear, top perspective view illustration of the assembly of the tilt-synchronizing unit and the mountable-arched-rib, as shown in FIG. 50a, wherein the mountablearched-rib is shown pivoted, to there by facilitate biasing the tilt of the steering post according to the scooter's driving speed.

FIG. 51a is a front, elevated, perspective view schematic illustration of a pivotal-interface unit, according to the present disclosure, wherein the pivotal-interface unit includes a mountable-arched-rib linkage assembly.

FIG. 51b is a front, elevated, perspective view schematic illustration of the pivotal-interface unit showed in FIG. 51a, wherein the mountable-arched-rib is mounted onto the pivotal-interface unit.

FIG. 52a is a front perspective view schematic illustration of the tilt-synchronizing unit shown in FIG. 51b, wherein the steering post is in an upright position, and wherein the tilt-synchronizing unit is operatively paired with the mountable-arched rib.

FIG. 52b is a bottom-front perspective view schematic illustration of the tilt-synchronizing unit shown in FIG. 52a, however, the steering post is in a left turn instance, wherein the mountable-arched-rib is operatively paired with the truncated rotating-cones of the tilt-synchronizing unit.

FIG. 53a is an elevated perspective view illustration of a tilt-synchronizing unit, having an upper arched-rib and a lower arched-rib, according to variations of the present disclosure.

FIG. 53b is a rear perspective view of an assembly of the tilt-synchronizing unit, as shown in FIG. 53a, and accommodated mountable-arched-rib, wherein the mountable-arched-rib is mounted therebetween the upper arched-rib and the lower arched-rib.

FIG. 53c is a side view of the assembly of tilt-synchronizing unit and accommodate mountable-arched-rib, as shown in FIG. 53b.

FIG. 54a is a rear, elevated, perspective view schematic illustration of a lower portion of scooter, according to embodiments of the present disclosure, the scooter being in a deployed state, wherein the steering post is in an upright position, and the scooter includes a manual folding mechanism.

Figure 54A:
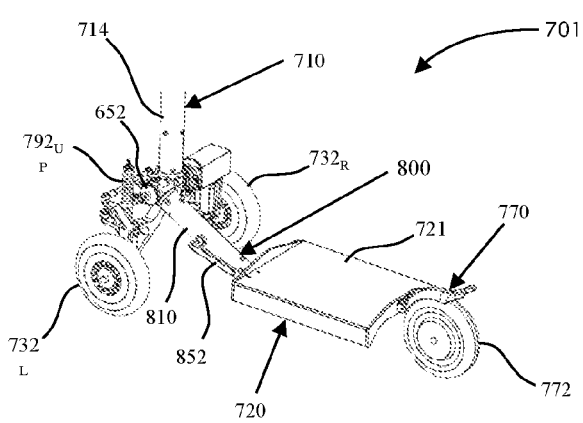
Figure 54B:
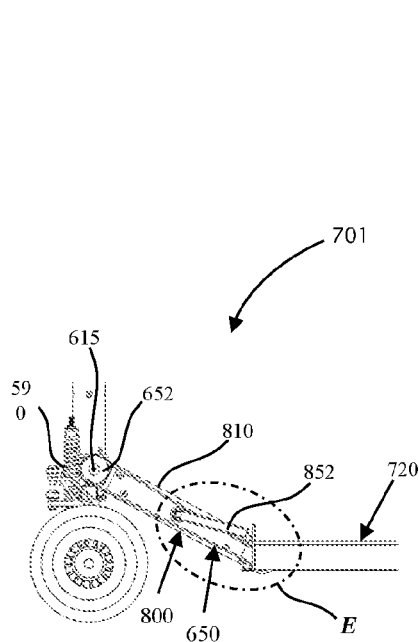

FIG. 54b is a side view schematic illustration of a frontal lower portion of the scooter shown in FIG. 54a, according to embodiments of the present disclosure, wherein the scooter is an upright, deployed balanced state.

FIG. 55a is a side, vertical, cross-section view schematic illustration of an interfacing-profile-arm, according to some non-limiting example embodiments of the present disclosure, facilitating both manual folding and power folding.

FIG. 55b is a side, schematic illustration of the internal elements of interfacing-profile-arm shown in FIG. 55a, wherein the interfacing-profile itself has been removed for illustrative purposes only.

FIG. 55c is a rear, right, elevated perspective view of the elements of interfacing-profile-arm, as shown in FIG. 55b.

FIG. 55d is a right-side cross-section view of the interfacing-profile-arm, as shown in FIG. 55a, wherein both the lower, rear link-locking mechanism and the similar upper, front link-locking mechanism are shown in an unlocked state.

FIG. 55e is a left-side view of the interfacing-profile-arm, as shown in FIG. 55a, wherein the manual folding activation handle is replaced by a motor for power folding activation.

FIG. 55f is a right-side view of the interfacing-profile-arm, as shown in FIG. 55e.

Figures 56A, 56B:
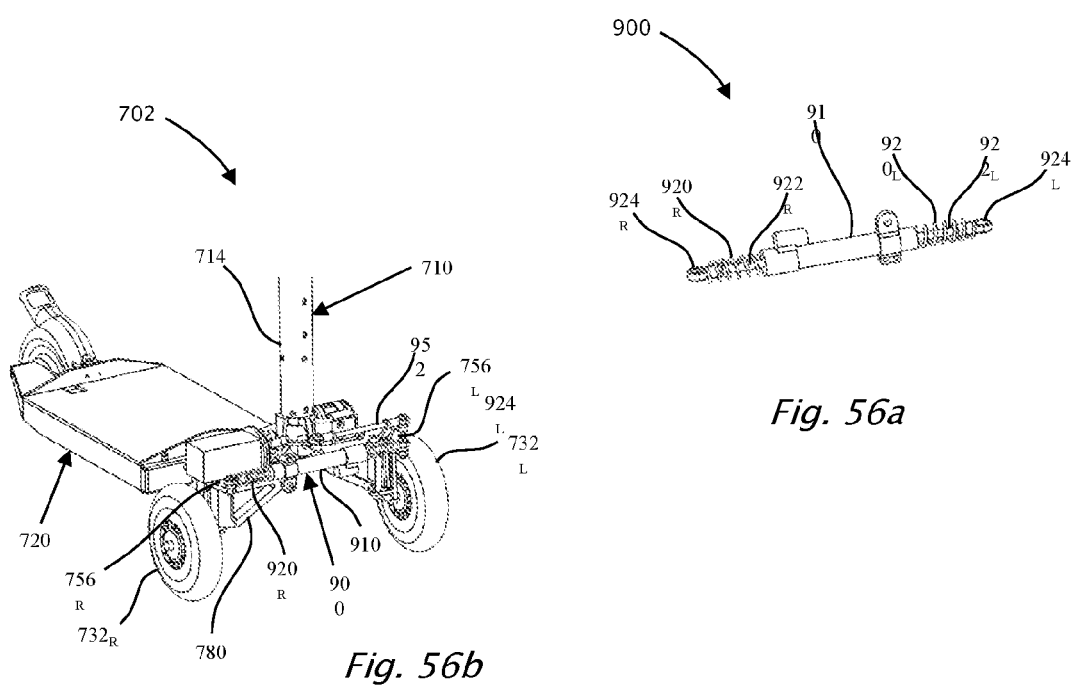

FIG. 56a illustrates an example damper device assembly, configured to provide an alternative to the pair of springs mechanisms, according to variations of the present disclosure.

FIG. 56b is a front, elevated, perspective view schematic illustration of the lower portion of a non-limiting example embodiment of a steering mechanism of a scooter, wherein the steering mechanism includes a damper device assembly as shown in FIG. 56a.

Figures 56C, 56D:
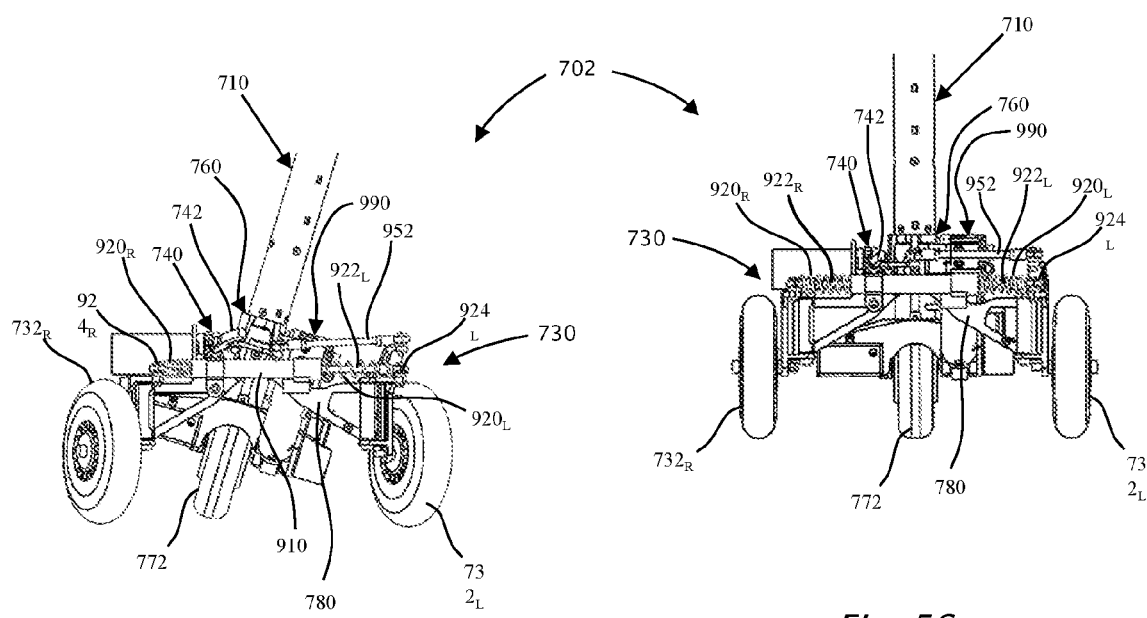

FIG. 56c is a front partial view of a scooter, such as shown in FIG. 56b, schematically illustrating a non-limiting example of steering mechanism, including damper device assembly as part of the respective steering mechanism, wherein for visibility purposes only, some parts have been removed for illustration purposes only, wherein the scooter is shown in an upright deployed state.

FIG. 56d is a front partial view of a scooter, such as shown in FIG. 56c, wherein the scooter is shown in a deployed, left turn instance position.

DETAILED DESCRIPTION

The present disclosure will now be described more fully hereinafter with reference to the accompanying drawings, in which preferred embodiments of the present disclosure are shown. This disclosure may, however, be embodied in many different forms and should not be construed as limited to the embodiments set forth herein; rather, these embodiments are provided, so that this disclosure will be thorough and complete, and will fully convey the scope of the present disclosure to those of ordinary skill in the art.

An embodiment is an example or implementation of the present disclosures. The various appearances of "one embodiment," "an embodiment" or "some embodiments" do not necessarily all refer to the same embodiment. Although various aspects of the present disclosure may be described in the context of a single embodiment, the aspects may also be provided separately or in any suitable combination. Conversely, although the disclosure may be described herein in the context of separate embodiments for clarity, the present disclosure may also be implemented in a single embodiment.

Reference in the specification to "one embodiment", "an embodiment", "some embodiments" or "other embodiments" means that a particular feature, structure, characteristic, or other aspects described in connection with the embodiments is included in at least one embodiment, but not necessarily all embodiments, of the present disclosure. It is understood that the phraseology and terminology employed herein are not to be construed as limiting and are for descriptive purpose only.

Various modifications to the implementations described in this disclosure may be readily apparent to those of ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features may be described above as acting in certain combinations and even initially claimed as such, one or more features from a claimed combination can in some cases be excised from the combination, and the claimed combination may be directed to a sub-combination or variation of a sub-combination.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "may," "could," "might," "can," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The teachings provided herein can be applied to other systems, not only the systems described herein. The elements and acts of the various embodiments described above can be combined to provide further embodiments.

According to one aspect of the present disclosure there is provided a scooter having two front wheels that are controlled by a steering post that is part of a steering mechanism that, when the steering post is rotated, the steering mechanism synchronizes the tilt of the steering post to incline sideways towards the inside periphery of the turning curve. Furthermore, the standing board of the scooter is configured to incline sideways towards the inside periphery of the turning curve. Furthermore, steering mechanism is designed to keep the two front wheels upright, including when turning.

According to another aspect of the present disclosure there is provided a foldable scooter that can fold into a trolly, including the deck assembly. The foldable scooter may further include a detachable bag, wherein the scooter can fold into a trolly, including the deck assembly and the detachable bag.

Reference is now made to the drawings. FIG. 1 schematically illustrates a first, non-limiting example embodiment of a scooter 100, including a steering post 110, a deck assembly 120 having a standing board 121 and a rear wheel assembly 170, a steering mechanism 130 and an optional detachable bag 199, according to aspects of the present disclosure, wherein the steering post 110 is in straight, upright position. Standing board 121 is configured to incline sideways towards the inside periphery of the turning curve, and configured for supporting a rider, typically standing thereon.

Steering post 110 can include a handle-bar 118 having two handle-grips 116 aiding a rider of scooter 100 to turn either to the left or to the right by pivoting steering post 110 accordingly. A main aspect of the present disclosure us to provide a mechanism that, when steering post 110 is pivoted, steering post 110 is also forced to incline sideways towards the inside periphery of the turning curve. Typically, the pivotal axis 115 of steering post 110 is operatively situated on the longitudinal axis 105 of scooter 100.

Figure 3:
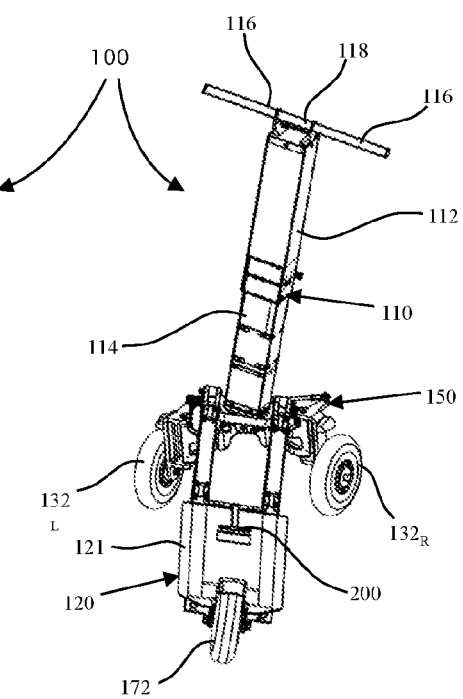
FIG. 3 is a rear perspective view, schematic illustration the scooter shown in FIG. 2, wherein the steering post is pivoted to the right and thereby also tilted to the right.

Hence, steering mechanism 130 facilitates the rider, when turning steering post 110 to turn scooter 100 either to the left or to the right, at his/her will. FIG. 2 schematically illustrates the scooter 100 in a state where the steering post 110 is pivoted to the left, in direction 117, and thereby also tilted to the left, according to aspects of the present disclosure. FIG. 3 is a rear perspective view, schematic illustration of the scooter 100, according to aspects of the present disclosure, wherein the steering post 110 is pivoted to the right and thereby also tilted to the right. The tilting measure dictates the tilting measure at a constant preconfigured rate. In one embodiment, steering post 110 is subdivided into an upper-post 112 and a lower-post 114, wherein upper-post 112 may slide over lower-post 114, telescopically.

Figure 4:
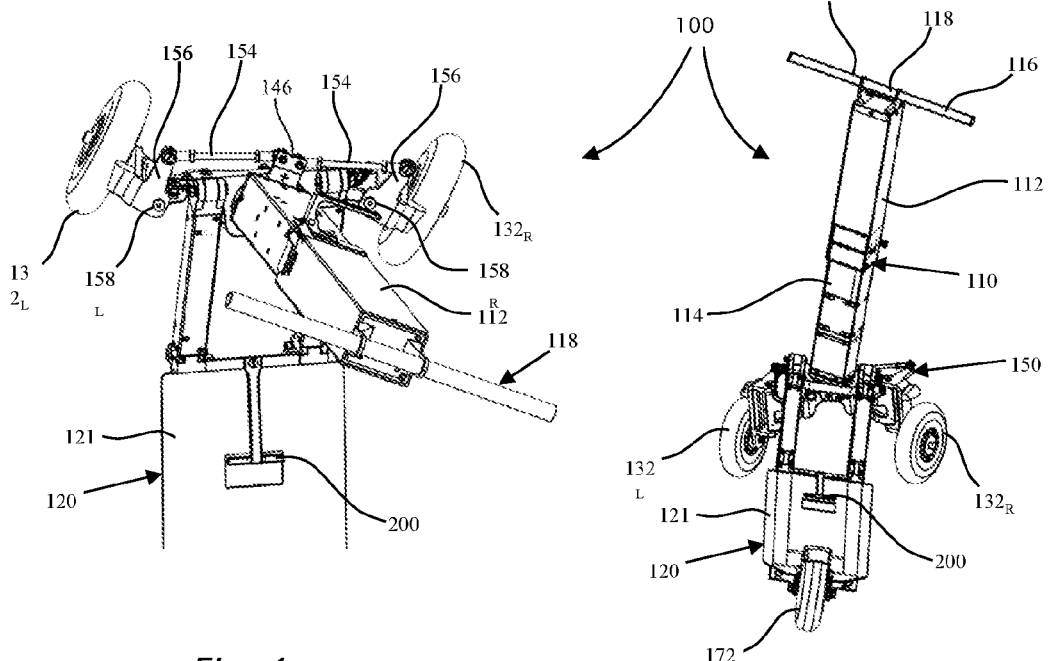
FIG. 4 is a top perspective view, schematic illustration of the front section of the scooter shown in FIG. 3.

Steering mechanism 130 further includes a pair of front wheels 132 interconnected by a steering mechanism to steering post 110, wherein when steering post 110 is pivoted, each of the front wheels ($132_L$, $132_R$) is also pivoted in the same direction by a wheels-pivoting-mechanism 150, as shown in FIG. 4. FIG. 4 is a top perspective view, schematic illustration of the front section of the scooter 100 as shown FIG. 3, according to aspects of the present disclosure, wherein the non-limiting example shown for the wheels-pivoting-mechanism 150 is based on the Ackerman Steering Principle (ASP). In such an ASP steering mechanism, the inner front wheel needs to turn at a different angle than the outer wheel because they are turning on different radii. The ASP steering mechanism is a geometric arrangement of linkage components (such as 146, 154, 156) in wheels-pivoting-mechanism 150 designed to turn the inner and outer wheels at the appropriate angles. Any other mechanism known in the art for coordinately pivot both front wheels, such as in cars, may be used (and not as, for example, in a "carriage" mechanism). The example wheels-pivoting-mechanism 150 includes pivoting receiving linkage component 146, receiving the pivotal motion from steering post 110, whereas the motion is transmitted to front wheels $132_L$ and $132_R$, respectively, by the respective rods 154, to respective linkage components 156, to which respective linkage component 156 the respective front wheel 132 is rotatably attached. It should be appreciated that while the scooter 100 is in a turn instance position, the pivoted front wheels ($132_L$, $132_R$) remain in an upright orientation, wherein both wheels remain firmly on the road, when riding in reasonable speed. Each linkage components 156 (156L, 156R) further include a respective independent shaft 158 ($158_L$, $158_R$), about which shaft 158 the respective front wheel ($132_L$, $132_R$) pivots, when making a turn.

Rear wheel assembly 170 includes a rear wheel 172 rotatable connected to a rear shaft. Rear wheel assembly 170 includes may further include a brake mechanism 174. Rear wheel assembly 170 may be operated by a motor, such as an electric motor (not shown).

Figure 5A:
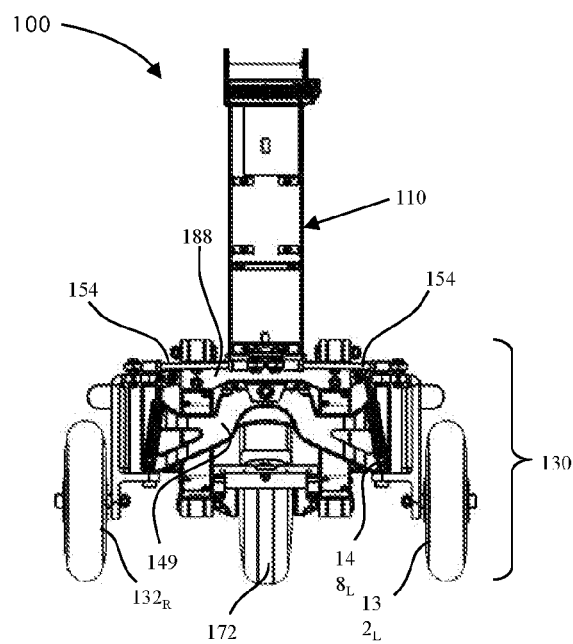
FIG. 5a is a front view of the scooter shown in FIG. 1, wherein for visibility purposes only, some parts have been removed for illustration purposes only.

FIG. 5a is a front view of scooter 100, schematically illustrating a non-limiting example of steering mechanism 130, wherein for visibility purposes only, some parts (related to steering post 110) have been removed for illustration purposes only, and wherein scooter 100, is shown in a deployed position. Similarly, FIG. 6a is a front view of the scooter 100, schematically illustrating steering mechanism 130, wherein for visibility purposes only, some occluding parts have been removed for illustration purposes only, and wherein scooter 100 is shown in a left turn instance position.

Figure 5B:
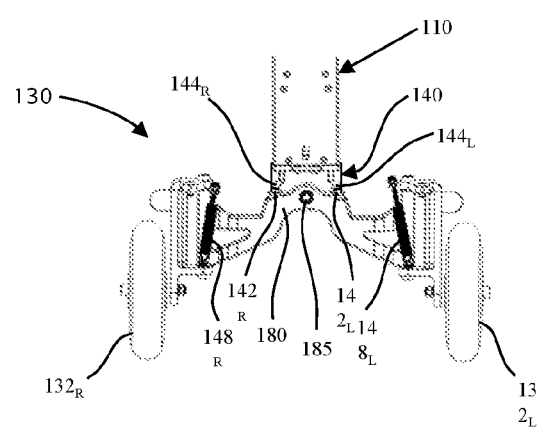
FIG. 5b is a front view, schematic illustration of a steering mechanism of the scooter shown in FIG. 5a, wherein components that take part in facilitating the scooter to turn either left or right, are shown mostly.

FIG. 5b is a front view, schematic illustration of steering mechanism 130 of the scooter 100, shown in a deployed position. FIG. 5b illustrates components that take part in facilitating scooter 100 to turn either left or right. Similarly, FIG. 6b is a front view, schematic illustration of the steering mechanism 130 of the scooter 100, shown in a left turn instance position. FIG. 6b illustrates components that take part in facilitating scooter 100 to turn (left turn in the non-limiting example shown in FIG. 6b). The steering mechanism 130 components that take part in facilitating scooter 100 to turn, with automatic tilt of the steering post 110, include steering post 110, a pair of front wheels 132, a tilt-synchronizing unit 140 and a pair of balancing-actuators 148, shown as a pair of springs, by way of example only. Balancing-actuators 148 may also be embodied, for example, as a pair of pneumatic or hydraulic mechanisms.

The steering mechanism 130 further includes two frame elements: pivotal-frame element 188 and non-pivotal-frame element 180. Pivotal-frame element 188 is configured to receive the pivotal motion from tilt-synchronizing unit 140, wherein pivotal-frame element 188 is pivotally connected to non-pivotal-frame element 180 at a bearing 185 disposed at a laterally central location of non-pivotal-frame element 180. The lower ends 149 (149$_R$, 149$_L$) of balancing-actuators 148 are securely connected to non-pivotal-frame element 180 at respective locations, and the upper ends 147 (147$_R$, 147$_L$) of balancing-actuators 148 are securely connected to non pivotal frame element 180 pivotal-frame element 188 at respective locations. Hence, balancing-actuators 148 actuate the relative rotational power forces between non-pivotal-frame element 180 and balancing-actuators 148, and asserting a steering-post-return-force counter to the pivotal force applied by the driver on the steering post 110. Once the driver weakens or releases the pivotal force (or turns back the steering post 110), the balancing-actuators 148 pivots the steering post 110 towards a straight, upright position of steering post 110. It should be appreciated that a balancing-actuators 148 may store a biasing force by either compressing compressible balancing-actuators 148, or by pulling balancing-actuators 148. The present disclosure is described as if balancing-actuators 148 pulled, and biasing force tries to return to its idle, non-stretched state.

Figure 6A:
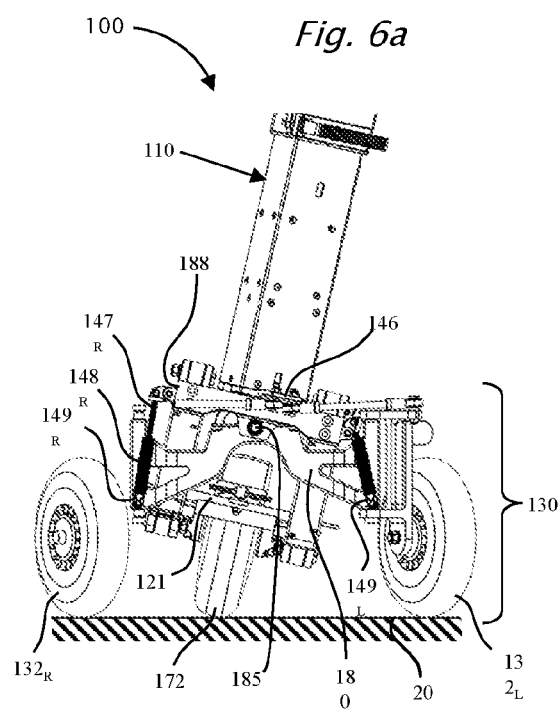
FIG. 6a is a front view of the steering mechanism of the scooter shown in FIG. 1, wherein for visibility purposes only, some occluding parts have been removed for illustration purposes only, and wherein the scooter is shown in a left turn instance position.
Figure 6B:
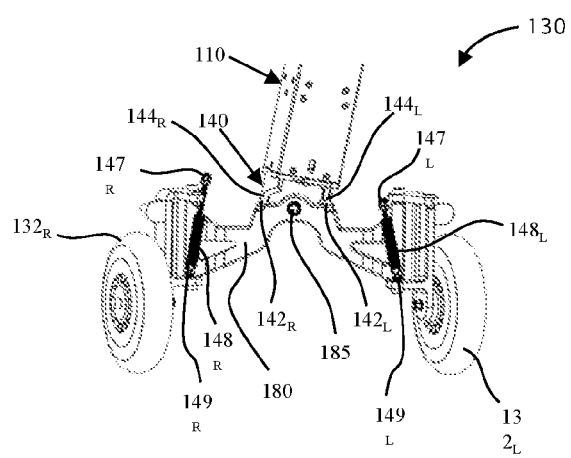
FIG. 6b is a front view, schematic illustration of a steering mechanism of the of the scooter shown in FIG. 6a, wherein mostly components that take part in facilitating the scooter to turn either left or right, are shown.

It should be further appreciated that standing board 121, being attached to pivotal-frame element 188, is configured to incline sideways towards the inside periphery of the turning curve, together with pivotal-frame element 188 (for example, see FIG. 6a).

To further clarify the steering mechanism 130 and the inter-relation between pivotal-frame element 188 and non-pivotal-frame element 180, a steering-tilt assembly 131a and 131b is introduced, with reference to FIGS. 7a and 7b, respectively. While FIG. 7a shows also pivotal-frame element 188, in FIG. 7b pivotal-frame element 188 has been removed for illustrative purposes only, to unveil a tilt-synchronizing unit 140 and a pair of truncated rotating-cones 142, that together, facilitate automatic tilt of the steering post 110, when pivoting steering post 110. FIG. 7c shows a detailed A view of a tilt-synchronization assembly 155 including tilt-synchronizing unit 140 and non-pivotal-frame element 180 that are pivotally interconnected via a shaft 185. FIG. 8a is a front view schematic illustration of tilt-synchronizing unit 140 of an example steering mechanism 130, the scooter 100 being in a deployed position. Tilt-synchronizing unit 140 includes a post interface section 141 having a rotational axis the coincides with pivotal axis 115 of steering post 110, a pivoting receiving linkage component 146, and a synchronizing body 143. FIG. 8b is a side elevated view of an exemplary tilt-synchronizing unit 140 of steering mechanism 130, the scooter 100 shown in a deployed position, being in a straight, upright position. FIG. 8c is a bottom perspective view, schematic illustration of tilt-synchronizing unit 140 of steering mechanism 130, the scooter 100 shown in a deployed position.

Synchronizing body 143 includes two arched walls 145, wherein arched walls 145 are shown to be part of an imaginary cylindrical thick wall 139 having a thickness W1 and an axis that operatively coincides with pivotal axis 115 of steering post 110. The arched walls 145 are diagonally truncated at their bottom, at an angle α (see FIG. 8b), with respect to an imaginary plane that is perpendicular to pivotal axis 115, forming flat faces 144, including right face 144$_R$ and left face 144$_L$. It should be noted that angle α may vary along flat faces 144. Flat faces 144 are also sloped laterally (with respect to pivotal axis 115), going downwardly at an angle β (see FIG. 8a), as extending from the periphery of arched walls 145 inwardly towards pivotal axis 115.

Figure 9B:
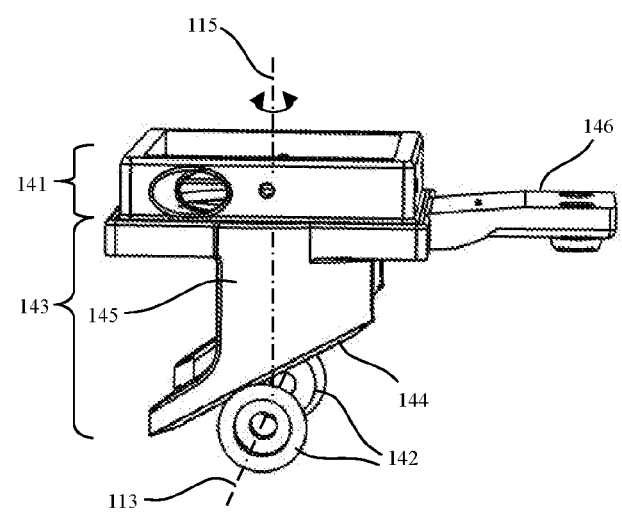
FIG. 9b is a side elevated view schematic illustration of tilt-synchronizing unit shown in FIG. 8b, wherein the tilt-synchronizing unit is operatively paired, respectively, with a pair of truncated rotating-cones.
Figure 9A:
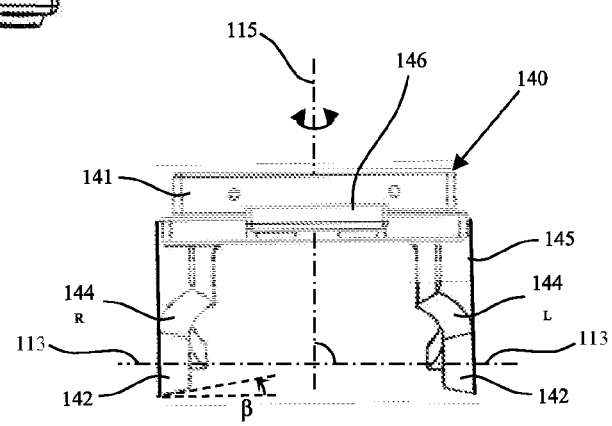
FIG. 9a is a front view schematic illustration of tilt-synchronizing unit shown in FIG. 8a, wherein the tilt-synchronizing unit is operatively paired, respectively, with a pair of truncated rotating-cones.

FIG. 9a is a front view schematic illustration of tilt-synchronizing unit 140 of steering mechanism 130, the scooter 100 being in a deployed position, wherein tilt-synchronizing unit 140 is operatively paired, respectively, with a pair of truncated rotating-cones 142. FIG. 9b is a side elevated view schematic illustration of tilt-synchronizing unit 140 of scooter 100, the scooter 100 being in a deployed position. A truncated rotating-cone 142 has a slope β with respect to its central axis 113, such that when the sloped periphery of truncated rotating-cone 142 is operatively placed against the respective inclined flat face 144, axis 113 is substantially perpendicular pivotal axis 115.

Figure 10A:
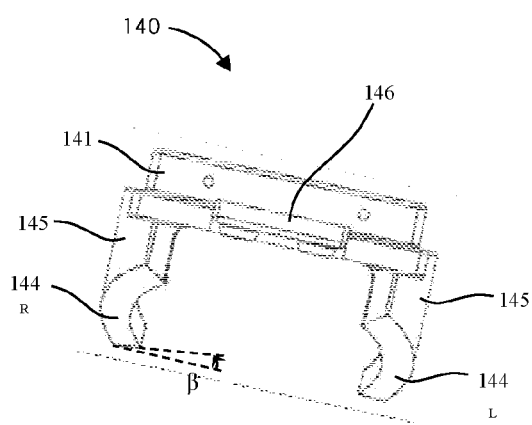
FIG. 10a is a front view schematic illustration of the tilt-synchronizing unit, the scooter shown, by way of example, in a left turn instance position.
Figure 10B:
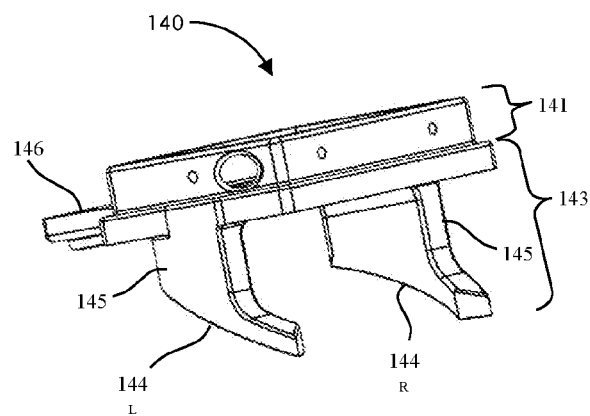

FIG. 10a is a front perspective view schematic illustration of tilt-synchronizing unit 140 of steering mechanism 130, the scooter 100 shown, by way of example, in a left turn instance position, as described with reference to FIG. 8a, tilt-synchronizing unit 140 includes a post interface section 141 having a rotational axis the coincides with pivotal axis 115 of steering post 110, a pivoting receiving linkage component 146, and a synchronizing body 143. FIG. 10b is a rear perspective view of tilt-synchronizing unit 140 of steering mechanism 130, the scooter 100 shown, by way of example, in a left turn instance position.

Synchronizing body 143 includes, for example, two arched walls 145, wherein arched walls 145 are part of an imaginary cylindrical thick wall 139 having a thickness W1 and an axis that operatively coincides with pivotal axis 115 of steering post 110. The arched walls 145 are diagonally truncated at their bottom, at an angle α (see FIG. 8b), with respect to an imaginary plane that is perpendicular to pivotal axis 115, forming flat faces 144, including right face 144$_R$ and left face 144$_L$. Flat faces 144 are also sloped laterally (with respect to pivotal axis 115), going downwardly at an angle β (see FIG. 10a), as extending from the periphery of arched walls 145 inwardly towards pivotal axis 115.

Figure 11A:
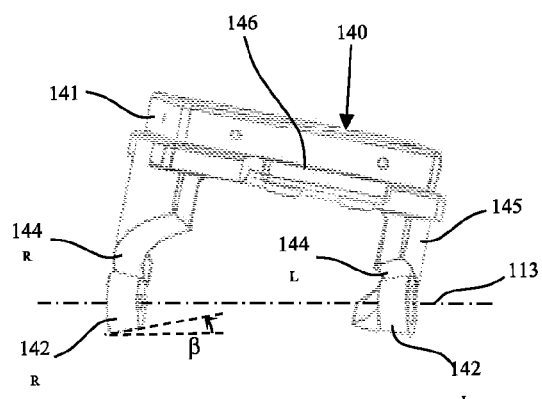
FIG. 11a is a front view schematic illustration of tilt-synchronizing unit shown in FIG. 10a, wherein the tilt-synchronizing unit is operatively paired, respectively, with a pair of truncated rotating-cones.
Figure 11B:
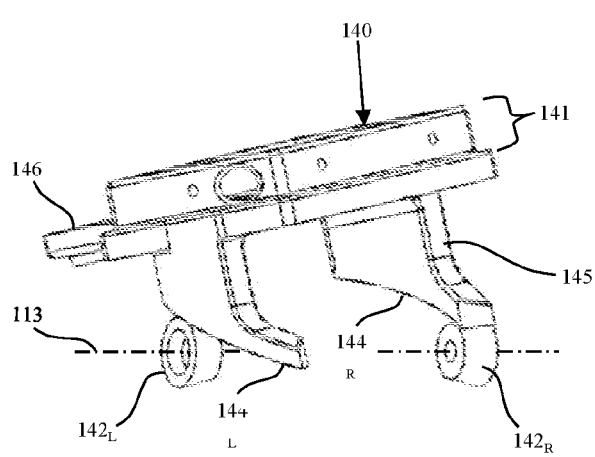
FIG. 11b is a rear perspective view of tilt-synchronizing unit shown in FIG. 10b, wherein the tilt-synchronizing unit is operatively paired, respectively, with a pair of truncated rotating-cones.

FIG. 11a is a front perspective view schematic illustration of tilt unit 140 of steering mechanism 130, the scooter 100 is shown, by way of example, in a left turn instance position, wherein tilt-synchronizing unit 140 is operatively paired, respectively, with a pair of truncated rotating-cones 142. FIG. 11b is a rear perspective view schematic illustration of tilt-synchronizing unit 140 of scooter 100, the scooter 100 shown, by way of example, in a left turn instance position. A truncated rotating-cone 142 has a slope β with respect to its central axis 113, such that when the sloped periphery of truncated rotating-cone 142 is operatively placed against the respective inclined flat face 144, axis 113 of the truncated rotating-cone 142 is substantially perpendicular pivotal axis 115.

It should be appreciated that when scooter 100 is in the deployed position, the scooter 100 is in an idle state, including balancing-actuators 148. Balancing-actuators 148, having an initial tension force $F_i$, balance each other such that truncated rotating-cones 142 are positioned adjacent to the respective sloped flat faces 144 at a central section of sloped flat faces 144, substantially at the same respective location of flat faces 144, as shown in a non-limiting example in FIGS. 9a and 9b.

It should be further appreciated that while the scooter 100 is in a turn position, the pivoted front wheels ($132_L$, $132_R$) remain in an upright orientation, wherein both wheels remain firmly on the road, when riding in reasonable speed. Furthermore, each of the pivoted front wheels ($132_L$, $132_R$) is configured to pivot about a respective independent shaft 158 turning radius. Referring back to FIG. 6a that illustrates a front view of the scooter 100, wherein scooter 100 is shown in a left turn instance position. It can be clearly seen that while pivotal-frame element 188 is tilted, along with steering post 110, into the side of the turn, pivotal-frame element 188 tilts about shaft 185 of non-pivotal-frame element 180, and non-pivotal-frame element 180 remains non-tilted, generally parallel to the ground surface. Thereby, pivoted front wheels ($132_L$, $132_R$) remain in an upright orientation, wherein both wheels remain firmly on the road, when riding in reasonable speed. Furthermore, each of the pivoted front wheels ($132_L$, $132_R$) is configured to pivot about a respective independent shaft 158.

In order to bring scooter 100 from the idle state to the left turn instance position desired direction, as shown by way of example in FIGS. 11a and 11b, (the left turn being a non-limiting example to any desired direction of the driver), the driver of scooter 100 pivots steering post 110 to the left about pivotal axis 115, while applying a pivotal force $F_P$, typically, by using one or both handle-grips 116. The driver's pivotal action initiates to following chain of reaction:

a. steering post 110 pivots to the left, about pivotal axis 115, against a resisting force $F_S$ of balancing-actuators 148.

b. tilt-synchronizing unit 140, being securely attached to steering post 110 pivots with steering post 110.

c. as tilt-synchronizing unit 140 pivots, sloped flat faces 144 pivots too, applying friction force $F_F$ onto the sloped periphery of truncated rotating-cone 142.

d. truncated rotating-cones 142 ($142_R$ and $142_L$), being mounted on respective stationary shafts 138 (see FIGS. 7b and 7c, $138_R$ and $138_L$) that are secured to non-pivotal-frame element 180, are free to rotate about the respective stationary shafts 138, sloped flat faces 144 pivot while rolling over the sloped periphery of the freely rotating truncated rotating-cones 142 ($142_R$ and $142_L$). It should be appreciated that the group: tilt-synchronizing unit 140, truncated rotating-cones 142 ($142_R$ and $142_L$) and the respective stationary shafts 138 ($138_R$ and $138_L$), may be referred to as tilt-synchronization assembly 155 (see FIG. 7c).

It should be further appreciated that sloped flat faces 144 roll over the respective sloped periphery of the freely rotating truncated rotating-cones 142, because of the friction force $F_F$ that exists between the two sloped surfaces. It should be further appreciated that the friction force $F_F$ may cause erosion of surfaces of flat faces 144 and/or 142, which erosion can be calibrated by a calibration mechanism (for example calibrating the attaching bolt of the respective stationary shaft 138, see FIGS. 7b and 7c) that moves the sloped periphery of the freely rotating truncated rotating-cones 142 along rotational axis 113, while sloped flat faces 144 remains stationary.

e. because of the angle α (see FIG. 8b) of sloped flat faces 144, one arched wall 145 moves upwards ($145_R$ in this example) as the respective flat face 144 (the right face $144_R$ in this example) the right arched wall $145_R$ (in this example) moves upwards, while rolling over the respective sloped periphery of truncated rotating-cones $142_R$ (in this example), and the other arched wall 145 moves downwards or remains idle ($145_L$ in this example) as the respective flat face 144 (the left face $144_L$ in this example) moves downwards, while rolling over the respective truncated rotating-cone $142_L$.

As long as the driver keeps pivoting steering post 110, pivoting steering post 110 also tilts into the selected turn side.

As steering post 110 continues to tilt, one balancing-actuator 148 (the right balancing-actuator $148_R$ in this example) increases its tension with respect to initial tension force $F_i$, while the other balancing-actuator 148 (the left balancing-actuator $148_L$ in this example) decreases its tension with respect to initial tension force $F_i$.

It should be appreciated that the balancing-actuators 148 being unbalanced, tend to balance their tension forces, that is return the idle state where their initial tension force $F_i$. therefore, once the driver weakens or releases the pivotal force, the balancing-actuators 148 pivots the steering post 110 towards a straight, upright position of steering post 110.

Figure 13B:
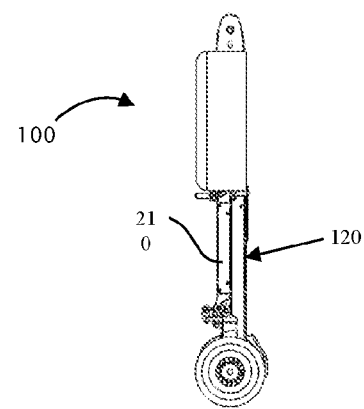

Preferably, scooter 100 includes a folding mechanism facilitating folding scooter 100 to a folded state, such that rear wheel 172 docks between or near the front wheels 132, wherein rear wheel 172 is situated higher that front wheels 132, and wherein scooter 100 can be carried as if it were a carry-on luggage or a trolley carrier. FIG. 12a is a front perspective view schematic illustration the folded scooter 100, according to embodiments of the present disclosure. Folded scooter 100 is shown in an upright position, which is the idle state of scooter 100. FIG. 12b is a rear perspective view of the folded scooter 100, wherein the folding process is facilitated after deck assembly 120 and a pair of interfacing-profile-arms 210 are unlocked using a folding handle 200. It should be appreciated that the folded components may also be locked in the folded state. FIG. 13a is a front perspective view schematic illustration the folded scooter 100 in a folded state, wherein scooter 100 may further include a utility case 199, configured to be attached to steering post 110, including in a folded state, according to embodiments of the present disclosure. FIG. 13b is a side view of the folded scooter 100, as shown in FIG. 13a.

Figure 14A:
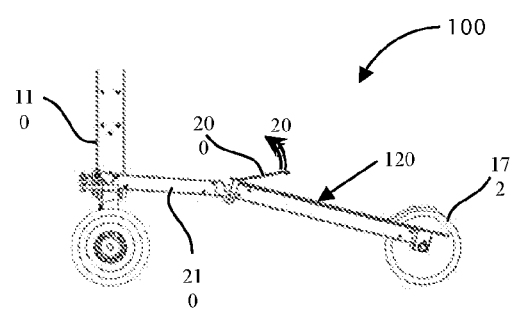
FIG. 14a is a side view schematic illustration of a lower portion of a scooter, according to embodiments of the present disclosure, wherein the scooter is an initial folding stage, and wherein the pulling up of the folding handle initiates a folding process.
Figure 14B:
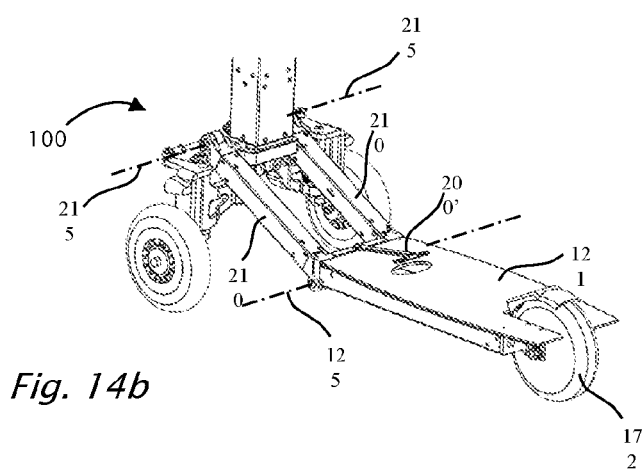
FIG. 14b is a rear, elevated, perspective view schematic illustration of a lower portion of a scooter, according to embodiments of the present disclosure, wherein the folding handle has been lifted to initiate a folding process.

FIG. 14a is a side view schematic illustration of a frontal lower portion of scooter 100, according to embodiments of the present disclosure, wherein the scooter 100 is an initial folding stage, and wherein the pulling up of folding handle 200 in direction 205 initiates a folding process. In the shown initial folding stage instance, the front end of deck assembly 120, which is, with no limitations, generally parallel to the road surface, is shown pivotally rising with respect to the pivotally connected interfacing-profile-arms 210. FIG. 14b is a rear, elevated, perspective view schematic illustration of a lower portion of scooter 100, according to embodiments of the present disclosure, wherein folding handle 200 has been lifted to initiate a folding process. During the folding process, interfacing-profile-arms 210 fold upwardly, pivoting about axis 215, while the front end of deck assembly 120 rises upwardly with respect to the pivotally connected interfacing-profile-arms 210, pivoting about axis 125. While folding, rear wheel 172 remains on the ground but when folding is complete, the rear wheel 172 is situated in the air, facilitating comfort use of front wheels 132 to carry the scooter as a trolley carrier.

Figure 15A:
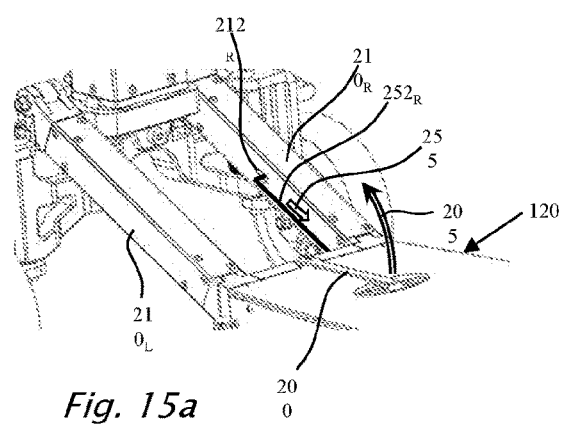
FIG. 15a is a rear, elevated, perspective view schematic illustration of a lower portion of a scooter, according to embodiments of the present disclosure, wherein the view shown is a closeup view of the locking/unlocking mechanism that facilitates to folding process of the scooter.

FIG. 15a is a rear, elevated, perspective view schematic illustration of a lower portion of scooter 100, according to embodiments of the present disclosure, wherein the view shown is a closeup view of the locking/unlocking mechanism that facilitates to folding process of scooter 100. The main folding components of scooter 100 are deck assembly 120 and interfacing-profile-arms 210, that are pivotally interconnected.

Figure 15B:
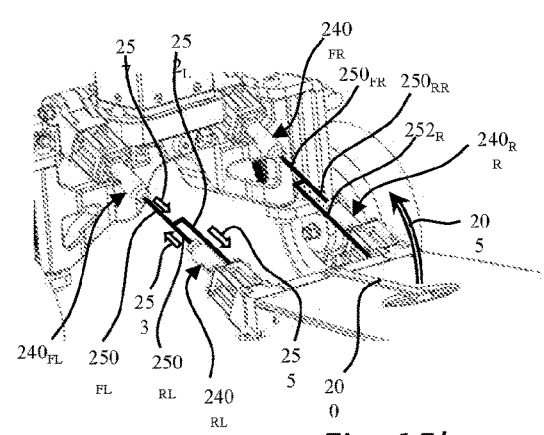
FIG. 15b illustrates the lower portion of the scooter, as shown in FIG. 15a, wherein the interfacing-profile-arms are removed for illustrative purposes only.

FIG. 15b illustrates lower portion of scooter 100, as shown in FIG. 15a, wherein interfacing-profile-arms 210 are removed for illustrative purposes only. The removal of interfacing-profile-arms 210 reveals a pulling cable system and four locking-pins assemblies 240: front-right locking-pin (being a post-locking-pin) assembly $240_{FR}$, rear-right locking-pin (being a deck-locking-pin) assembly $240_{RR}$, front-left locking-pin (being a post-locking-pin) assembly $240_{FL}$ and rear-left locking-pin (being a deck-locking-pin) assembly $240_{RL}$, according to some embodiments of the present disclosure, for locking scooter 100, at least when in use, and unlocking scooter 100 to facilitate folding scooter 100, preferably, to facilitate comfortably carrying scooter 100 as a trolley carrier.

Figure 15C:
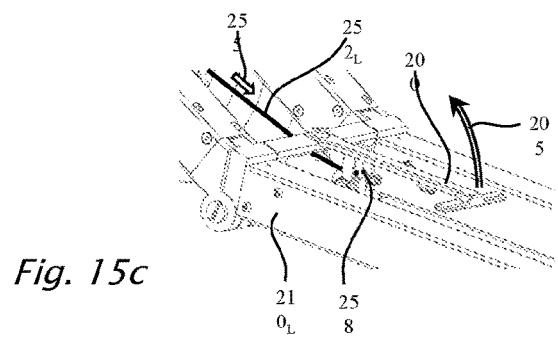
FIG. 15c illustrates the lower portion of the scooter, as shown in FIG. 15a, wherein the standing board is removed for illustrative purposes only.

When pulling up folding handle 200, and folded components may also be locked in the folded state. As described with reference to FIGS. 14a and 14b, the pulling up of folding handle 200 in direction 205 initiates a folding process. When folding handle 200 is pulled direction 205, a pulling cable 252, on each side of scooter 100, in direction 255, as pulling cable 252 is securely attached to folding handle 200. Typically, pulling cable 252 and other cable segments that are interconnected to each pulling cable 252, are operated inside a protective sleeve ($250_S$ see FIG. 16b). FIG. 15c illustrates lower portion of scooter 100, as shown in FIG. 15a, wherein standing board 121 is removed for illustrative purposes only.

Taking, for example, right pulling cable $252_R$, when folding handle 200 is pulled direction 205, pulling cable $252_R$ is pulled backwards towards folding handle 200. Pulling cable $252_R$ is securely and operatively connected to a front-right cable segment $250_{FR}$ and to a rear-right cable segment $250_{RR}$. As can be seen in FIG. 15a, pulling cable $252_R$ threaded through an aperture $212_R$ formed in the internal side of the right interfacing-profile-arms 210. Therefore, right pulling cable $252_R$ is pulled backwards towards folding handle 200, front-right cable segment $250_{FR}$ and a rear-right cable segment $250_{RR}$ are pulled towards each other: front-right cable segment $250_{FR}$ is pulled backward in direction 257 (as can be seen in FIG. 15b for the corresponding cable segments on the left side of the scooter), and a rear-right cable segment $250_{RR}$ is pulled forward in direction 253 (as can be seen in FIG. 15b for the corresponding cable segments on the left side of the scooter).

Figure 16A:
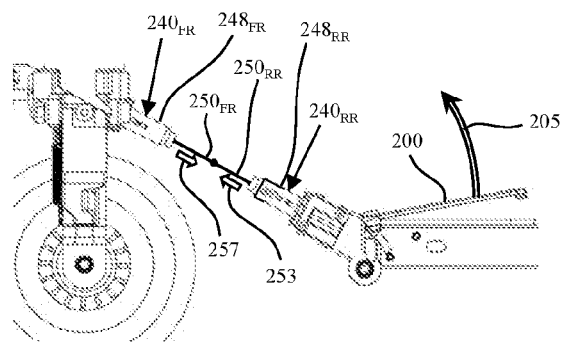
FIG. 16a is a side cross-section view, schematically illustrating a frontal portion of a scooter, according to embodiments of the present disclosure, wherein the interfacing-profile-arms are removed for illustrative purposes only.

FIG. 16a is a side cross-section view, schematically illustrating a frontal portion of scooter 100, according to embodiments of the present disclosure, wherein interfacing-profile-arms 210 are removed for illustrative purposes only. The removal of interfacing-profile-arms 210 reveals the front-right cable segment $250_{FR}$, rear-right cable segment $250_{RR}$, front-right locking-pin assembly $240_{FR}$, rear-right locking-pin assembly $240_{RR}$. When folding handle 200 is pulled direction 205, pulling right cable $252_R$, front-right cable segment $250_{FR}$ is pulled in direction 257 and rear-right cable segment $250_{RR}$ is pulled in an opposite direction 253.

Figure 16B:
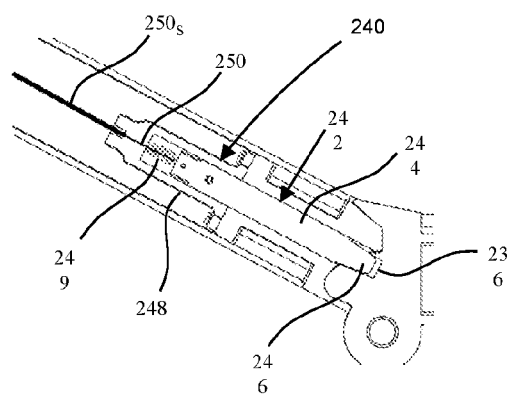
FIG. 16b is a side cross-section view, schematically illustrating a locking-pin assembly wherein some components have been removed for illustrative purposes only.
Figure 16C:
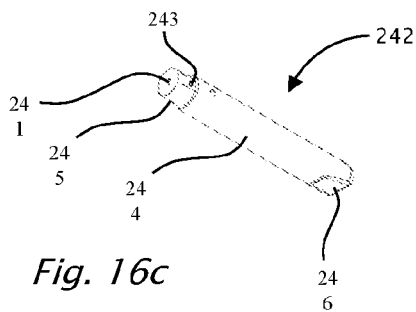
FIG. 16c is a front perspective view of locking-pin unit, according to embodiments of the present disclosure.

FIG. 16b is a side cross-section view, schematically illustrating a locking-pin assembly 240 wherein some components have been removed for illustrative purposes only. Locking-pin unit 242 is also illustrated in FIG. 16c, wherein locking-pin unit 242 includes a main elongated body 244, a locking-end 246 and a pulled-end 245. Locking-end 246 is shown situated inside an external stationary cavity 236, being locked therein. Pulled-end 245 is configured to securely receive the tip end of a respective cable segment 250. Cable segment 250 is shown covered by protective sleeve $250_S$. In a none limiting example shown in FIG. 16c, the tip end of cable segment 250 is inserted through a hole 241 formed at a central location of the tip of pulled-end 245, and a tightening screw (not shown) tightens the tip end of a cable segment 250, via respective threads 243, to locking-pin unit 242. Referring back to FIGS. 16a, 16b, 16d and 16e, locking-pins assembly 240 further includes a locking-pin housing 248 configured to receive a respective pulled end 245 of a locking-pin assembly 240. As shown in FIG. 16a, a respective cable segment 250 is threaded through an aperture formed at a central location of the tip of locking-pin housing 248 and continuous to be secured to a pulled end 245 of a respective locking-pin unit 242. Locking-pin housing 248 may further contain a biasing element, such as a spring 249 or any other type of a biasing element.

Figure 16D:
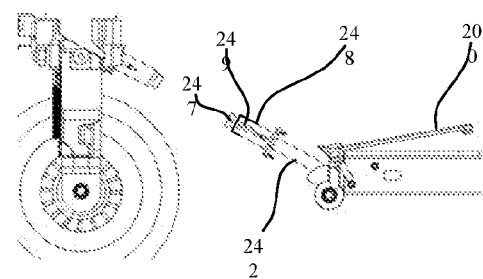
FIG. 16d is a side cross-section view, schematically illustrating the frontal portion of the scooter shown in FIG. 16a, wherein the locking-pin unit is shown in a in a locked state.
Figure 16E:
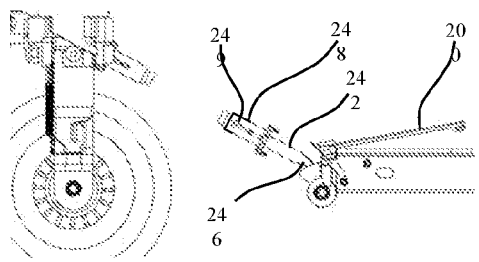
FIG. 16e is side cross-section view, schematically illustrating the frontal portion of the scooter shown in FIG. 16a, wherein the locking-pin unit is shown in a in an unlocked state.

When folding handle 200 is pulled direction 205, pulling cable 252 is pulled backwards towards folding handle 200. As pulling cable 252 is pulled, the cable segments 250 are pulled such that respective pulled ends 245 of respective locking-pin unit 242 are pulled such that the pulled ends 245 are pulled into the respective locking-pin housings 248 and against resisting respective biasing elements 249. In FIG. 16d locking-pin unit 242 is shown in a locked state, while in FIG. 16e locking-pin unit 242 is shown in a in an unlocked state, whereas the locking-end 246 of locking-pin unit 242 is visible.

Reference is now made to FIGS. 17a-17c. As shown in FIGS. 1, 2, 13a and 13b, and also in FIG. 17a, scooter 100 may further includes a utility case 199, configured to store articles in a designated storage compartment (s), according to embodiments of the present disclosure. FIG. 17b is a rear perspective view of as example utility case 199, configured to be integrally attached onto scooter 100. In one embodiment, the internal storage space of utility case 199 may be subdivided, by way of example, into 2 or more inner storage compartments 192. Typically, utility case 199 is design to embrace upper-post 112 of steering post 110, the upper-post 112 being the wider component of the telescopic steering post 110. In one embodiment, with reference to FIGS. 17b and 17c, hinges 194 (first upper hinges $194_{u1}$, second upper hinges $194_{u2}$ and lower hinge $194_D$) are configured to lockingly slide over respective shoulder bolts 191 (first upper hinges $191_{u1}$, second upper hinges $191_{u2}$ and lower hinge $191_D$).

Reference is now made to FIGS. 18-21c, illustrating one embodiment for locking/unlocking scooter 100 when in a folded state. In this embodiment folding handle 200 is used also to unlock scooter 100 when in a locked, folded state.

Figures 18, 19, 20:
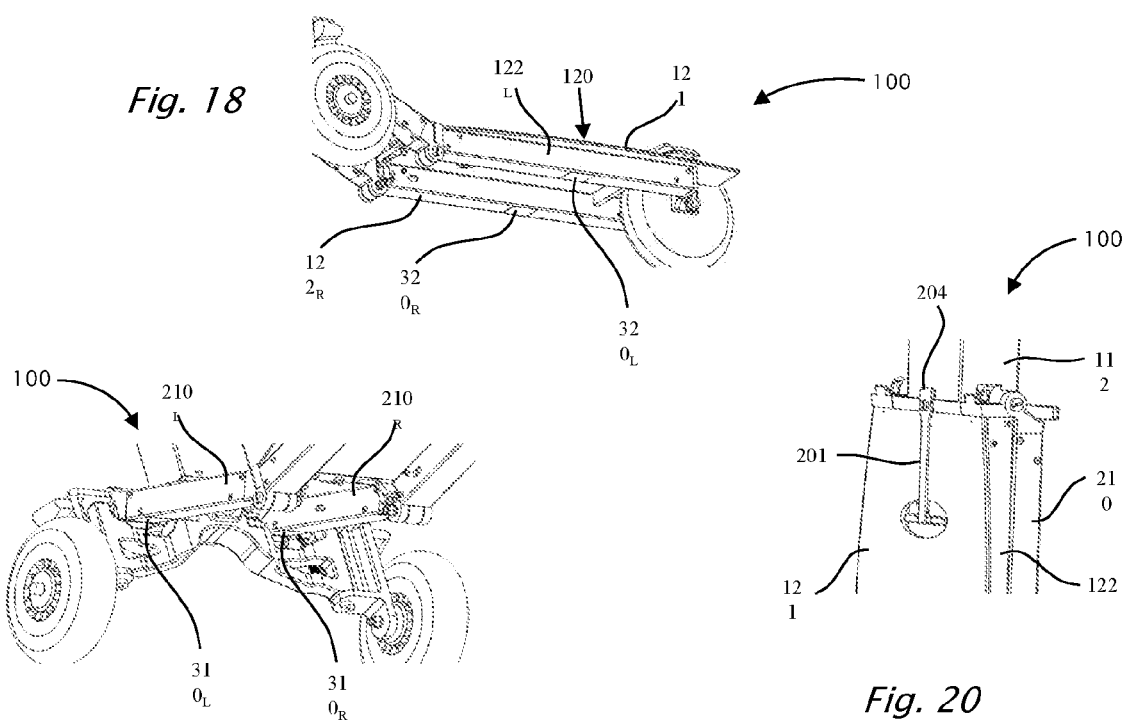
FIG. 18 is a side, bottom perspective view, schematically illustrating a rear portion of a scooter, according to some embodiments of the present disclosure, wherein the scooter further includes a right and left board-profiles, and wherein first-magnets are attached to each of the right and left board-profiles, at preconfigured locations.
FIG. 19 is a rear, bottom perspective view, schematically illustrating a frontal portion of the scooter as in FIG. 18, wherein one or more complimentary-magnets are attached to each of the right and left interfacing-profile-arms, at pre-configured locations.
FIG. 20 is a rear perspective view, schematically illustrating a central portion of the scooter as in FIG. 18, being in a folded state, wherein the folding handle has an extended tail-end, which extends proximal to the upper-post of the scooter.

FIG. 18 is a side, bottom perspective view, schematically illustrating a rear portion of scooter 100, according to some embodiments of the present disclosure, scooter 100 further includes a right and left board-profiles $122_L$ and $122_R$, respectively, being part of the frame that supports standing board 121. According to variations of the present disclosure, one or more first-magnets 320 are attached to one or both right and left board-profiles 122$_L$ and 122$_R$, at preconfigured locations. FIG. 19 is a rear, bottom perspective view, schematically illustrating a frontal portion of scooter 100, according to some embodiments of the present disclosure, wherein one or more complimentary-magnets 310 are attached to one or both right and left interfacing-profile-arms 210$_L$ and 210$_R$, at preconfigured locations.

FIG. 20 is a rear perspective view, schematically illustrating a central portion of a folded scooter 100, wherein folding handle 201 has an extended tail-end 204, which extends proximal to upper-post 112. When scooter 100 is in a folded state, the one or more first-magnets 320 and the respective one or more complimentary-magnets 310 are preconfigured to be located adjacently to each other and thereby, folded scooter 100 is held in the folded state by the formed mutual magnetic force. FIG. 21a is a side close-up view of a portion of folded scooter 100, wherein adjacent first-magnet 320 and a respective complimentary-magnet 310 are shown. FIG. 21b is a side view of a portion of folded scooter 100, wherein folding handle 201 is shown lifted, wherein folding handle 201 is lifted in order to unlock the folded scooter 100. FIG. 21c is a detailed view B, as denoted in FIG. 21b, showing the extended tail-end 204 of folding handle 201 pressing against the external surface of upper-post 112 and thereby overcome the magnetic force bring apart adjacent first-magnet 320 and its respective complimentary-magnet 310 into an unlocked folded state. FIG. 21a is a side close-up view of a portion of the folded scooter 100 as in FIG. 20, wherein adjacent first-magnet 320 and a respective complimentary-magnet 310 are shown departed.

Figure 22:
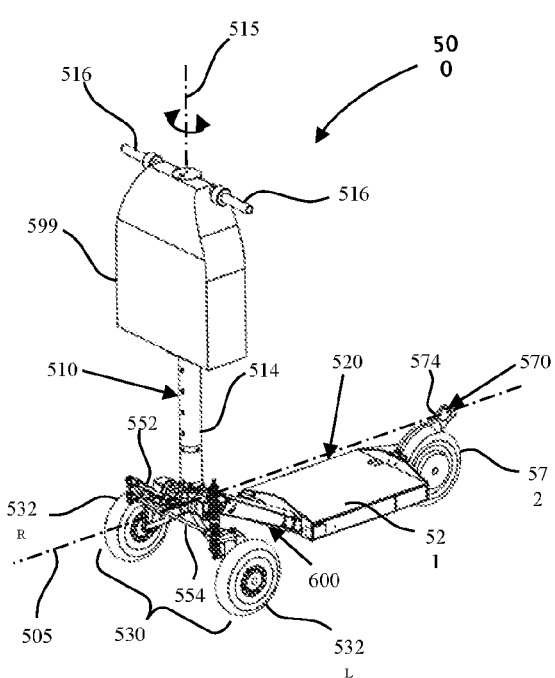
FIG. 22 schematically illustrates a non-limiting example embodiment of another scooter, including a steering post, a deck assembly, a steering mechanism, a rear wheel assembly and an optional detachable bag, according to aspects of the present disclosure, wherein the steering post is in a straight, upright position.

FIG. 22 schematically illustrates a second, non-limiting example embodiment of a scooter 500, including a steering post 510, a deck assembly 520 having a standing board 521 and a rear wheel assembly 570, a steering mechanism 530 and an optional detachable bag 599, according to aspects of the present disclosure, wherein the steering post 510 is in straight, upright position. Standing board 521 is configured to incline sideways towards the inside periphery of the turning curve, and configured for supporting a rider, typically standing thereon.

Steering post 510 can include a handle-bar 518 having two handle-grips 516 aiding a rider of scooter 500 to turn either to the left or to the right by pivoting steering post 510 accordingly. A main aspect of the present disclosure is to provide a mechanism that, when steering post 510 is pivoted, steering post 510 is also forced to incline sideways towards the inside periphery of the turning curve. Typically, the pivotal axis 515 of steering post 510 is operatively situated on the longitudinal axis 505 of scooter 500.

Figure 23:
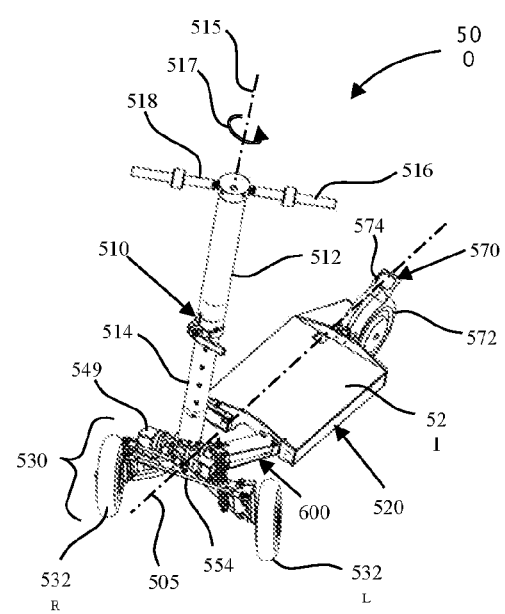
FIG. 23 schematically illustrates a non-limiting example of the scooter shown in FIG. 22, wherein the steering post is a left turn instance position.

Hence, steering mechanism 530 facilitates the rider, when turning steering post 510 to turn scooter 500 either to the left or to the right, at his will. FIG. 23 schematically illustrates the scooter 500 in a state where the steering post 510 is pivoted to the left, in direction 517, and thereby also tilted to the left, according to aspects of the present disclosure. FIG. 24 is a rear perspective view, schematic illustration of the scooter 500, according to aspects of the present disclosure, wherein the steering post 510 is pivoted to the left and thereby also tilted to the left. The tilting measure dictates the tilting measure at a constant preconfigured rate. In one embodiment, steering post 510 is subdivided into an upper-post 512 and a lower-post 514, wherein upper-post 512 may slide over lower-post 514, telescopically.

Steering mechanism 530 further includes a pair of front wheels 532 interconnected by a steering mechanism to steering post 510, wherein when steering post 510 is pivoted, each of the front wheels (532$_L$, 532$_R$) is also pivoted in the same direction by a wheels-pivoting-mechanism 550, as shown in FIG. 25. FIG. 25 is a top perspective view, schematic illustration of the front section of the scooter 500, according to aspects of the present disclosure, wherein the non-limiting example shown for the wheels-pivoting-mechanism 550 is based on the Ackerman Steering Principle (ASP). In such an ASP steering mechanism, the inner front wheel needs to turn at a different angle than the outer wheel because they are turning on different radii. The ASP steering mechanism is a geometric arrangement of linkage components (such as 567, 552, 554, 556) in wheels-pivoting-mechanism 550 designed to turn the inner and outer wheels at the appropriate angles. Any other mechanism known in the art for coordinately pivot both front wheels, such as in cars, may be used (and not as, for example, in a "carriage" mechanism). The example wheels-pivoting-mechanism 550 includes pivoting receiving linkage components 556, receiving the pivotal motion from steering post 510, whereas the motion is transmitted to front wheels 532$_L$ and 532$_R$, by a pair of axially moving rods, 552 and 554, to respective linkage components 556, to which respective linkage component 556 the respective front wheel 532 is rotatably attached. It should be appreciated that while the scooter 500 is in a turn instance position, the pivoted front wheels (532$_L$, 532$_R$) remain in an upright orientation, wherein both wheels remain firmly on the road, when riding in reasonable speed. Each linkage components 556 (556$_L$, 556$_R$) further include a respective independent shaft 558 (558$_L$, 558$_R$), about which shaft 558 the respective front wheel (532$_L$, 532$_R$) pivots, when making a turn.

Rear wheel assembly 570 (see for example FIGS. 22, 23 and 25) includes a rear wheel 572 rotatable connected to a rear shaft. Rear wheel assembly 570 may further include a rear-wheel cover 574. Rear wheel assembly 570 may be operated by a rear wheel motor, such as, with no limitations, an electric motor (not shown) powered for example by a battery 999 (see, for example FIGS. 26b, 36c). Rear-wheel cover 574 may also serve as a brake mechanism or a part thereof. It should be appreciated that the wheel motor may be configured to drive the scooter apparatus either forward or backwards or both forward and backwards.

Figure 26A:
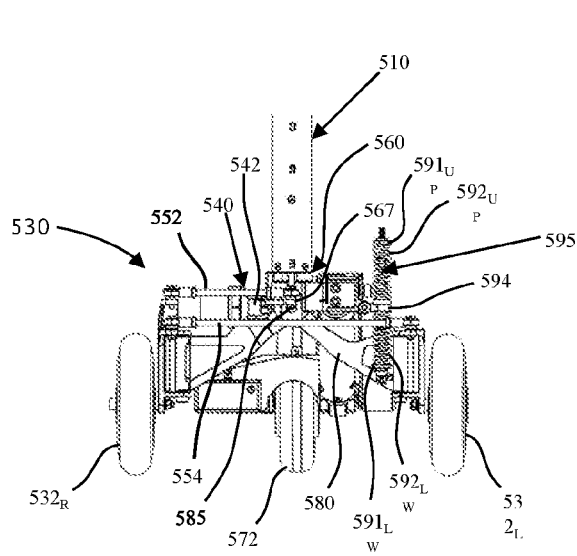
FIG. 26a is a front view of the scooter shown in FIG. 22, wherein for visibility purposes only, some parts have been removed for illustration purposes only.
Figure 27A:
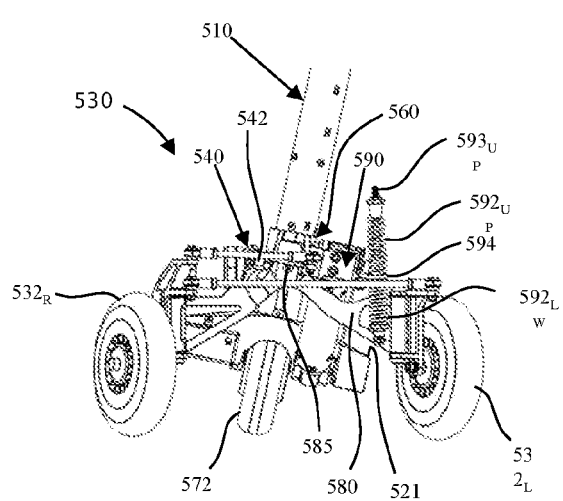
FIG. 27a is a front view of the steering mechanism of the scooter shown in FIG. 22, wherein for visibility purposes only, some occluding parts have been removed for illustration purposes only, and wherein the scooter is shown in a left turn instance position.

FIG. 26a is a front partial view of scooter 500, schematically illustrating a non-limiting example of steering mechanism 530, wherein for visibility purposes only, some parts (related to steering post 510) have been removed for illustration purposes only, and wherein scooter 500, is shown in a deployed position (state). Similarly, FIG. 27a is a front view of the scooter 500, schematically illustrating steering mechanism 530, wherein for visibility purposes only, some occluding parts have been removed for illustration purposes only, and wherein scooter 500 is shown in a left turn instance position.

Figure 26B:
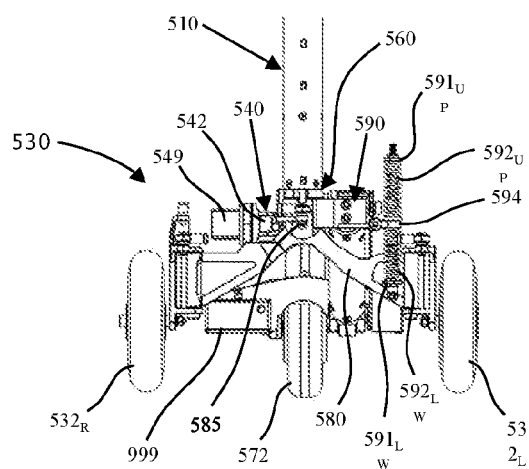
FIG. 26b is a front view, schematic illustration of a steering mechanism of the scooter shown in FIG. 26a, wherein components that take part in facilitating the scooter to turn either left or right, are shown mostly.
Figure 27B:
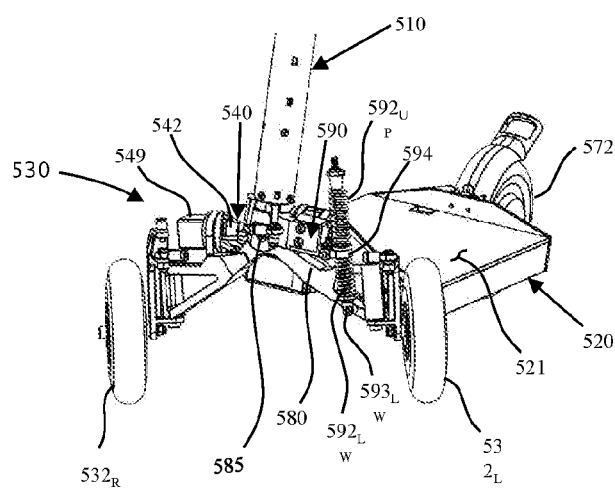
FIG. 27b is a front view, schematic illustration of a steering mechanism of the of the scooter shown in FIG. 27a, wherein mostly components that take part in facilitating the scooter to turn either left or right, are shown.

FIG. 26b is a front view, schematic illustration of steering mechanism 530 of the scooter 500, shown in a deployed position. FIG. 26b illustrates components that take part in facilitating scooter 500 to turn either left or right. Similarly, FIG. 27b is a front view, schematic illustration of the steering mechanism 530 of the scooter 500, shown in a left turn instance position. FIG. 27b illustrates components that take part in facilitating scooter 500 to turn (left turn in the non-limiting example shown in FIG. 27b).

The steering mechanism 530 components that take part in facilitating scooter 500 to turn, with automatic tilt of the steering post 510, include steering post 510, a pair of front wheels 532, a tilt-synchronizing unit 540 and a pair of balancing-actuators 592 ($592_{UP}$, $592_{LW}$), shown as a pair of springs, by way of example only. Balancing-actuators 592 may also be embodied, for example, as a pair of pneumatic or hydraulic mechanisms. The steering mechanism 530 further includes the following interfacing components: a pivotal-interface unit 560 a tilt-conveyor unit 590, and a non-pivotal-frame element 580.

It should be appreciated that while the rider pivots steering post 510, pivotal-interface unit 560, being securely attached to steering post 510, pivots along with steering post 510, while tilt-conveyor unit 590, being pivotally connected to non-pivotal-frame element 580 at bearing 585, tilts sideways in sync with the pivotal motion of steering post 510.

The pair of similar balancing-actuators 592 ($592_{UP}$, $592_{LW}$) are mounted on a mutual vertical carrying rod 595 (see for example FIG. 26a), and wherein a pair end-stoppers (upper end-stopper $591_{UP}$, and lower end-stopper $591_{LW}$) limit the motion of balancing-actuators ($592_{UP}$, $592_{LW}$) disposed there between the end-stoppers ($591_{UP}$, $591_{LW}$) on vertical carrying rod 595, having an upper open end and a lower open end (see for example FIGS. 27a and 27b). When a balancing-actuator ($592_{UP}$, $592_{LW}$) is pressed (or extended) by an external force balancing-actuator ($592_{UP}$, $592_{LW}$) the external force is stored there inside, wherein the balancing-actuator ($592_{UP}$, $592_{LW}$) uses stored force to try and return to its idle state. The balancing-actuators $592_{UP}$ and $592_{LW}$ are separated by a force conveying ring 594 disposed therebetween, and wherein the force conveying ring 594 receives a forceful motion vector along vertical carrying rod 595 and towards either balancing-actuators $592_{UP}$ or $592_{LW}$, from tilt-conveyor unit 590 that is securely attached to the steering post 510 and is configured to pivot about a bearing 585 disposed at a laterally central location of non-pivotal-frame element 580. When no tilt is asserted onto steering post 510, force conveying ring 594 applies equal pressing force onto both balancing-actuators 592 ($592_{UP}$, $592_{LW}$).

It should be appreciated that the respective position of upper end-stopper $591_{UP}$ and lower end-stopper $591_{LW}$, may be adjusted, for example by a respective nut $593_{UP}$ or $593_{LW}$ (see for example FIGS. 27a and 27b).

The force conveying ring 594 is securely and operatively connected to the tilt-conveyor unit 590. Hence, force conveying ring 594 actuates the relative rotational power forces between non-pivotal-frame element 580 and the respective balancing-actuator 592 ($592_{UP}$ and/or $592_{LW}$), and asserting a steering-post-return-force counter to the pivotal force applied by the driver on the steering post 510. Once the driver weakens or releases the pivotal force (or turns back the steering post 510), the balancing-actuators 592 assert a counter force onto force conveying ring 594 that cause the steering post 510 to pivot towards a straight, upright position of steering post 510. It should be appreciated that balancing-actuators 592 may store a biasing force by either compressing a compressible balancing-actuators 592, or by pulling a balancing-actuators 592. The present disclosure is described as if a respective balancing-actuator 592 is compressed, and the stored biasing force within the respective balancing-actuator 592 tries to return to its idle, non-compressed state (or a balance compression state between both balancing-actuators $592_{UP}$ and $592_{LW}$).

It should be further appreciated that standing board 521, also being attached to tilt-conveyor unit 590, is configured to incline sideways towards the inside periphery of the turning curve, together with tilt-conveyor unit 590 (for example, see FIGS. 27a and 27b as well as a scooter-folding-interface assembly 600 shown, for example, in FIG. 28a below).

Figure 28A:
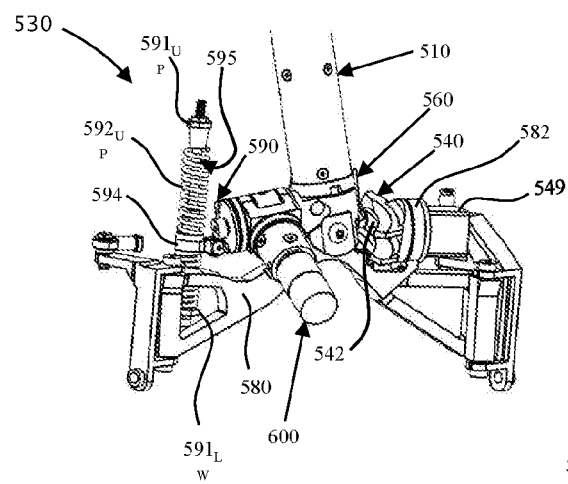
FIG. 28a is a rear elevated perspective view illustration of the steering mechanism shown in FIG. 27a, while the scooter is in a left turn instance position.
Figure 28B:
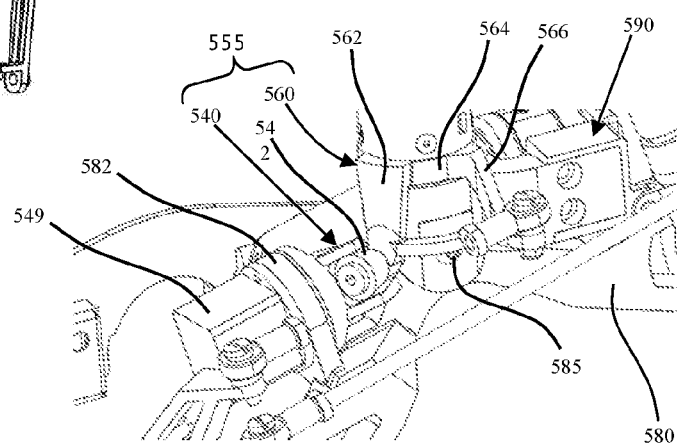

FIGS. 28a and 28b are provided to further clarify the steering mechanism 530 and the inter-relation between pivotal-interface unit 560, tilt-synchronizing unit 540, tilt-conveyor unit 590 and non-pivotal-frame element 580. FIG. 28a is a rear elevated perspective view illustration of the steering mechanism 530 components while scooter 500 is in a left turn instance position, and FIG. 28b is a front elevated perspective view illustration of the same. Together, the tilt-synchronizing unit 540 and a truncated rotating-cone 542, facilitate automatic tilt of the steering post 510, when pivoting steering post 510 (to the left, in the shown non-limiting example).

Figure 28C:
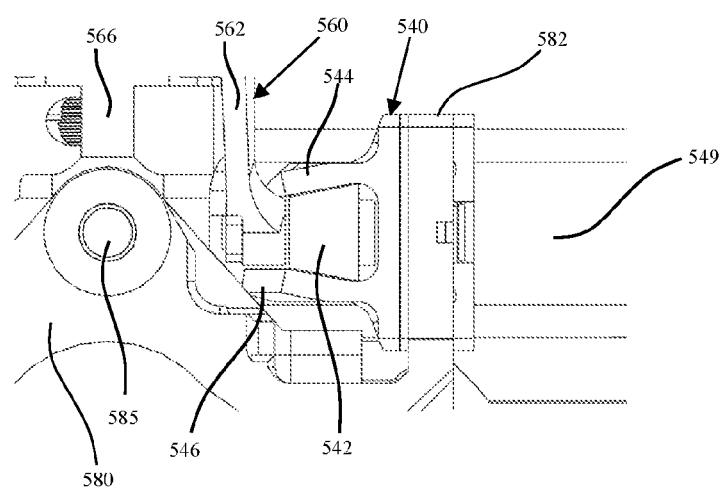

The non-pivotal-frame element 580 includes a tilt-synchronizing-unit-holding-ring 582 that is configured to affix the tilt-synchronizing unit 540 to non-pivotal-frame element 580. The pivotal-interface unit 560, on the other hand, is affixed to steering post 510, and thereby pivots with the steering post 510, when steering post 510 is pivoted by the rider or otherwise. FIG. 28c is a rear, vertical cross-section view illustration of a portion of the steering mechanism 530 components, wherein steering post 510 is in an upright position.

Figure 29B:
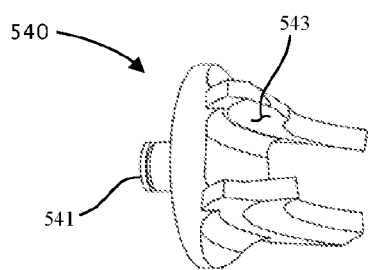
Figure 29A:
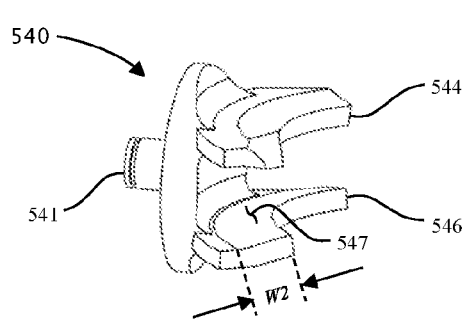
Figure 29C:
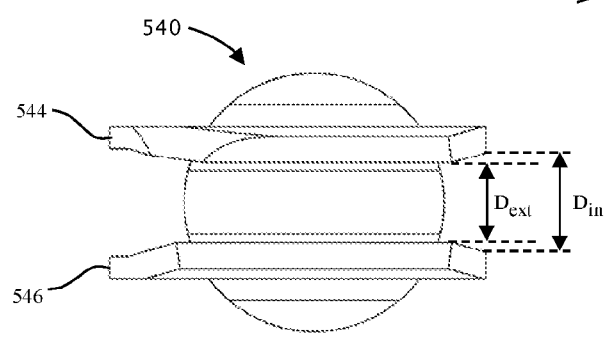
FIG. 29c is a side view of the tilt-synchronizing unit shown in FIG. 29a, facing the top and bottom arched-ribs.

Reference is also made to FIG. 29a that illustrates a front, top perspective view of tilt-synchronizing unit 540, and to FIG. 29b that illustrates a front, bottom perspective view of tilt-synchronizing unit 540. Tilt-synchronizing unit 540 includes two parallel arched shaped deep ribs: top arched-rib 544 and bottom arched-rib 546. Reference is also made to FIG. 29c that illustrates a side view of tilt-synchronizing unit 540, facing top arched-rib 544 and bottom arched-rib 546. Each arched-rib (544 and 546) has a respective inner flat face (543 and 547) that is laterally slopped inwardly, wherein the internal-arched-gap $D_{in}$ is wider than the external-arched-gap $D_{ext}$, remaining operatively even along the full operative length of both arched-ribs (544 and 546).

It should be appreciated that when steering post 510 is in an upright position, the pair of arched-rib (544 and 546) has an initial inclination angle with respect to the horizon.

Figure 29D:
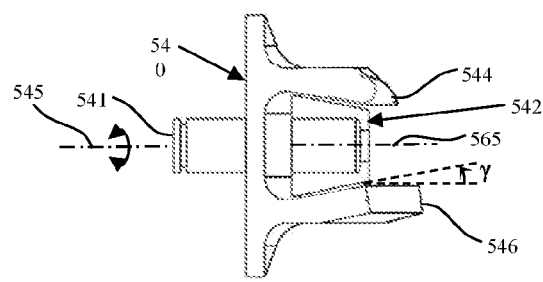

Reference is also made to FIG. 29d that illustrates a front, vertical cross-section view of tilt-synchronizing unit 540, wherein a truncated rotating-cone 542 is disposed there between top arched-rib 544 and bottom arched-rib 546. The sloped periphery 548 of truncated rotating-cone 542 and those of the inner flat faces (543 and 547) are operatively of the same angle γ, allowing truncated rotating-cone 542 to freely and fittingly, roll there inside the internal space formed between the inner flat faces (543 and 547), from one end of one inner flat face (543 or 547) of the respective arched-rib (544 and 546) to the other end of the inner flat face (543 or 547) of the respective arched-rib (544 and 546).

Figure 29F:
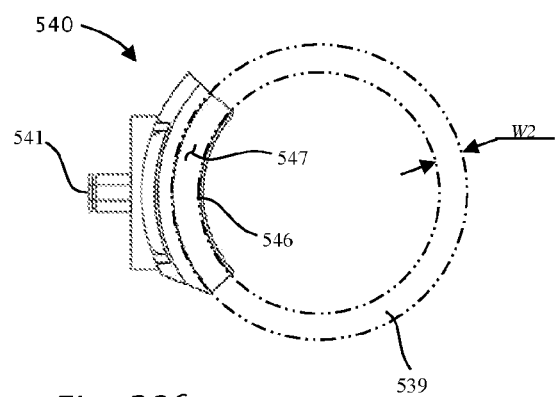
FIG. 29f, illustrates a top view, of the cross-section shown in FIG. 29e.
Figure 29E:
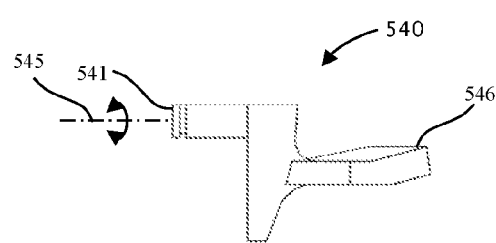

Reference is also made to FIG. 29e, illustrating a front, lateral cross-section view of tilt-synchronizing unit 540 FIG. 29f, illustrates a top view, of the cross-section shown in FIG. 29e, wherein the arched inner flat face 547 of arched-rib 546 is fully shown, and wherein arched-rib 546 (implying also to arched-rib 544) is shown to be part of an imaginary cylindrical ring 539 having a depth W2 and a transverse axis that operatively coincides with pivotal axis 515 of steering post 510.

Figure 30B:
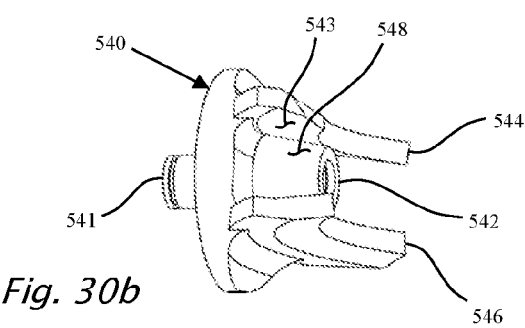
Figure 30A:
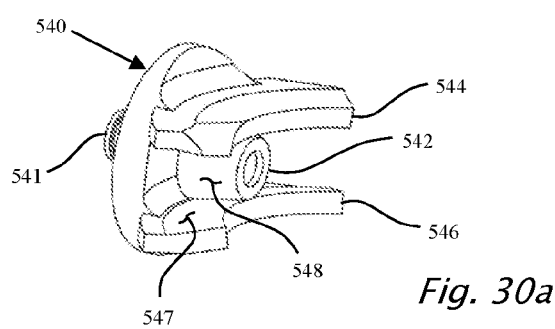
FIG. 30a is a top perspective view illustration of the tilt-synchronizing unit of the scooter shown in FIG. 22, wherein the truncated rotating-cone is disposed between the top and the bottom arched-ribs, when the steering post is in an upright position.
Figure 30D:
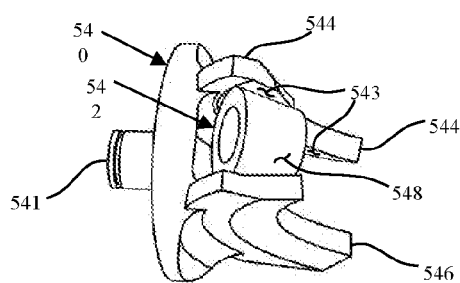
FIG. 30d is a bottom perspective view illustration of the tilt-synchronizing unit shown in FIG. 30c.
Figure 30C:
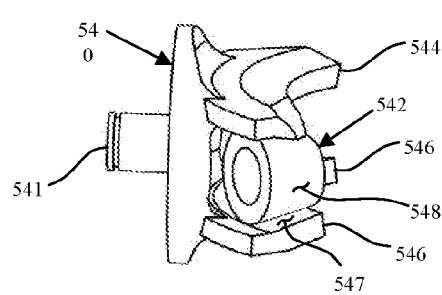
FIG. 30c is a top perspective view illustration of the tilt-synchronizing unit shown in FIG. 22, wherein the truncated rotating-cone is disposed between the top and the bottom arched-ribs proximal the front end of the inner flat faces, when the steering post is in a left turn instance position.

It should be appreciated that when the steering post 510 is in and upright position, the truncated rotating-cone 542 is disposed between the top arched-rib 544 and the bottom arched-rib 546, at (or proximal to) the center of the inner flat faces (543 and 547). FIG. 30a illustrates a top perspective view of tilt-synchronizing unit 540, wherein truncated rotating-cone 542 is disposed between the top arched-rib 544 and the bottom arched-rib 546, at (or proximal to) the center of the inner flat faces (543 and 547). FIG. 30b illustrates a bottom perspective view of tilt-synchronizing unit 540 shown in FIG. 30a. Reference is also made to FIG. 30c that illustrates a top perspective view of tilt-synchronizing unit 540, wherein truncated rotating-cone 542 is disposed between the top arched-rib 544 and the bottom arched-rib 546, proximal the front end of the inner flat faces (543 and 547), demonstrating a left turn instance position. FIG. 30d illustrates a bottom perspective view of tilt-synchronizing unit 540 shown in FIG. 30c.

Figure 31A:
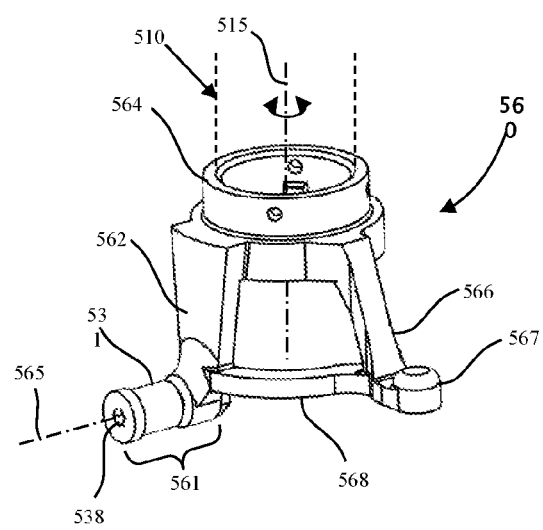
FIG. 31a is a front, elevated, perspective view schematic illustration of a pivotal-interface unit, according to the present disclosure.
Figure 31B:
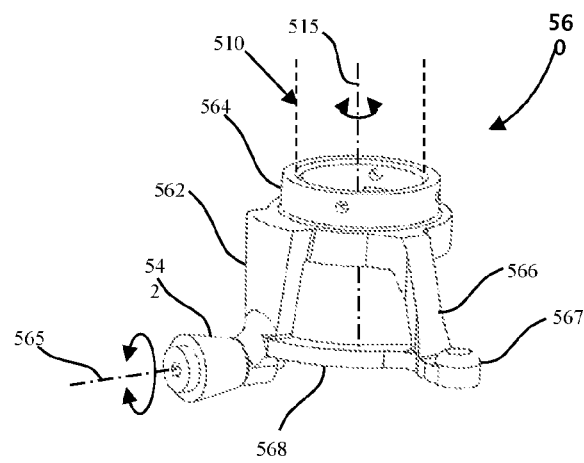
FIG. 31b is a front, elevated, perspective view schematic illustration of the pivotal-interface unit showed in FIG. 31a, wherein a truncated rotating-cone is rotatably mounted thereon a designated stationary shaft.

Reference is also made to FIG. 31a that is a front, elevated, perspective view schematic illustration of pivotal-interface unit 560, according to the present disclosure. Pivotal-interface unit 560 includes a post interface section 564 having a rotational axis that coincides with pivotal axis 515 of steering post 510, a pivoting receiving linkage arm 566, a pivoting receiving linkage component 567, a rotating-cone linkage arm 562, and a rotating-cone linkage assembly 561. The rotating-cone linkage assembly 561 includes a stationary shaft 531, wherein truncated rotating-cone 542 is rotatably mounted on the stationary shaft 531, as illustrated in FIG. 31b. Pivoting receiving linkage arm 566 is securely attached to pivotal-interface unit 560, as shown in FIG. 28b.

Figures 32A, 32B:
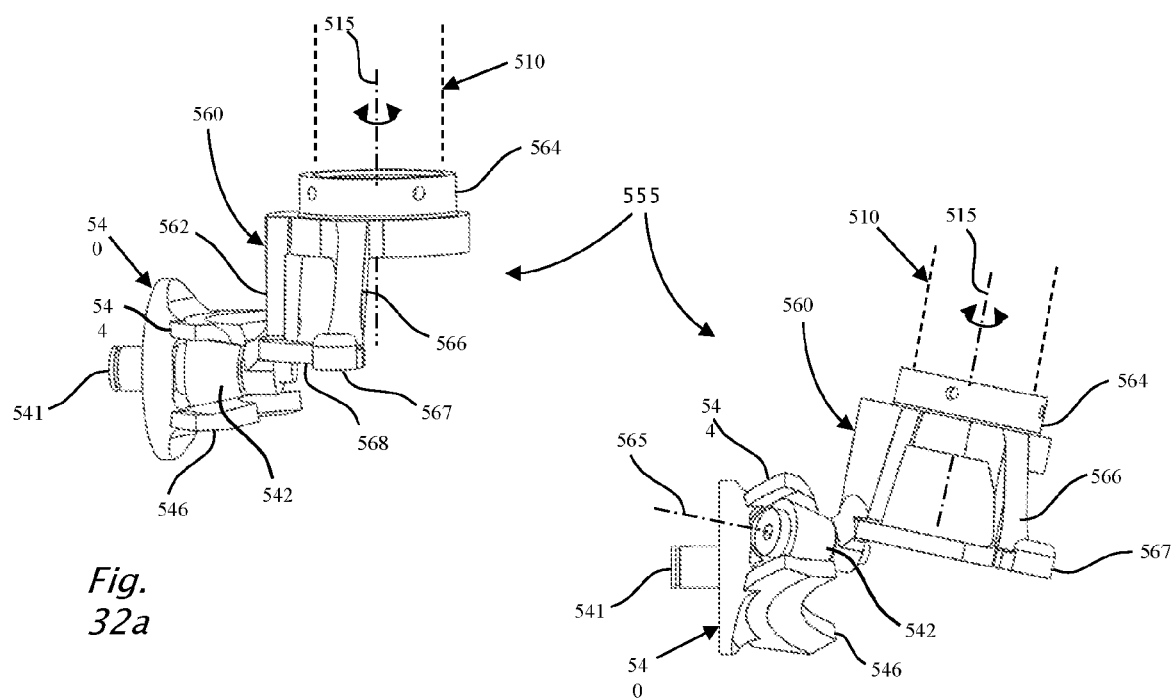
FIG. 32a is a front and slightly elevated perspective view schematic illustration of the tilt-synchronizing unit shown in FIG. 31b, wherein the steering post is in an upright position, and wherein the tilt-synchronizing unit is operatively paired with the truncated rotating-cone.
FIG. 32b is a bottom-front perspective view schematic illustration of the tilt-synchronizing unit shown in FIG. 31b, wherein the steering post is in a left turn instance, and wherein the tilt-synchronizing unit is operatively paired with the truncated rotating-cone.

FIG. 32a is a front and slightly elevated perspective view schematic illustration of tilt-synchronizing unit 540 of steering mechanism 530, the scooter 500 being in a deployed position, wherein steering post 510 is in an upright position, and wherein tilt-synchronizing unit 540 is operatively paired with the truncated rotating-cone 542 that is rotatably mounted on the stationary shaft 531 of rotating-cone linkage assembly 561, of rotating-cone linkage arm 562, of pivotal-interface unit 560. It should be appreciated that since steering post 510 is in an upright position, truncated rotating-cone 542 is disposed between the top arched-rib 544 and the bottom arched-rib 546, at (or proximal to) the center of the inner flat faces (543 and 547).

FIG. 32b is a bottom-front perspective view schematic illustration of a front perspective view schematic illustration of a tilt-synchronizing assembly 555, the assembly 555 including tilt-synchronizing unit 540 of steering mechanism 530, the scooter 500 being in a deployed position, wherein scooter 500 is shown, by way of example, in a left turn instance position. The tilt-synchronizing unit 540 is operatively paired with the truncated rotating-cone 542 that is rotatably mounted on the stationary shaft 531 of rotating-cone linkage assembly 561, of rotating-cone linkage arm 562, of pivotal-interface unit 560. It should be appreciated that since steering post 510 has been pivoted in the example to the left, truncated rotating-cone 542 is disposed between the top arched-rib 544 and the bottom arched-rib 546, proximal the front end of the inner flat faces (543 and 547), demonstrating a left turn instance position. When the rider pivots steering post 510 to the left, truncated rotating-cone 542, being disposed between the top arched-rib 544 and the bottom arched-rib 546, rolls there in between arched-ribs 544 and 546 towards the front end of the inner flat faces (543 and 547), proportionally to the pivoting angle.

It should be appreciated that when making a right turn (in this example embodiment), by pivoting steering post 510 to the right, truncated rotating-cone 542 rolls between arched-ribs 544 and 546 towards the rear end of the inner flat faces (543 and 547).

Tilt-synchronizing unit 540 of steering mechanism 530 may further include a tilt biasing mechanism of steering post 510, as a function of the driving speed of scooter 500, in addition to the degree of pivoting steering post 510. A speed-biasing motor 549 is pivotally attached to tilt-synchronizing unit 540 via a central shaft 541, whose rotational axis 545 (see FIGS. 29d and 29e, for example) coincides with the rotational axis of speed-biasing motor 549.

Typically, with no limitations, the tilt degree is preset to a balanced (with no bias) state predesigned for some average riding velocity. If the current speed is higher than that average riding velocity, then speed-biasing motor 549 may be activated to pivot tilt-synchronizing unit 540 to thereby increase the tilt angle of arched-ribs (544 and 546) and the tilt angle of steering post 510; and if the current speed is lower than that average riding velocity, then speed-biasing motor 549 may be activated to pivot tilt-synchronizing unit 540 to thereby decrease the tilt angle of arched-ribs (544 and 546) and the tilt angle of steering post 510.

It should be appreciated that when scooter 500 is in the deployed position, the scooter 500 is in an idle state, including balancing-actuators 592. Balancing-actuators 592, having an initial tension force $F_j$, balance each other such that rotating-cone 542 is positioned adjacent to the sloped inner flat faces (543 and 547), at a central section of sloped flat faces (543 and 547), as shown in a non-limiting example in FIGS. 29a, 29f, 30a and 30c.

It should be further appreciated that while the scooter 500 is in a turn position, the pivoted front wheels ($532_L$, $532_R$) remain in an upright orientation, wherein both wheels remain firmly on the road, when riding in reasonable speed. Furthermore, each of the pivoted front wheels ($532_L$, $532_R$) is configured to pivot about a respective independent shaft 558 turning radius. Referring back to FIG. 27a that illustrates a front view of the scooter 500, wherein scooter 500 is shown in a left turn instance position. It can be clearly seen that while pivotal-interface unit 560 is tilted, along with steering post 510, into the side of the turn, pivotal-interface unit 560 tilts about shaft 585 of non-pivotal-frame element 580, and non-pivotal-frame element 580 remains non-tilted, generally parallel to the ground surface. Thereby, pivoted front wheels ($532_L$, $532_R$) remain in an upright orientation, wherein both wheels remain firmly on the road, when riding in reasonable speed. Furthermore, each of the pivoted front wheels ($532_L$, $532_R$) is configured to pivot about a respective independent shaft 558 (see FIG. 25).

In order to bring scooter 500 from the idle state to the left turn instance position desired direction, as shown by way of example in FIGS. 22 and 23, (the left turn being a non-limiting example to any desired direction of the driver), the driver of scooter 500 pivots steering post 510 to the left about pivotal axis 515, while applying a pivotal force $F_P$, typically, by using one or both handle-grips 516. The driver's pivotal action initiates to following chain of reaction:

a. steering post 510 pivots to the left, about pivotal axis 515, against a resisting force $F_S$ of balancing-actuators 592.
b. tilt-synchronizing unit 540, being securely attached to steering post 510 pivots with steering post 510.
c. as tilt-synchronizing unit 540 pivots, inner flat faces (543 and 547) of the arched-ribs (544 and 546, respectively) pivots too, applying friction force $F_F$ onto the sloped periphery 548 of truncated rotating-cone 542.
d. truncated rotating-cone 542, being mounted on stationary shaft 531 (see FIGS. 31a and 31b) that is secured to rotating-cone linkage arm 562, of pivotal-interface unit 560, is free to rotate about stationary shafts 531, while the inner flat faces (543 and 547) roll over the sloped periphery of the freely rotating truncated rotating-cone 542.

It should be appreciated that the group: tilt-synchronizing unit 540, truncated rotating-cone 542 and pivotal-interface unit 560, may be referred to as tilt-synchronizing assembly 555 (see FIGS. 26b, 27b, 28b, 32a and 32b).

It should be further appreciated that sloped inner flat faces (543 and 547) roll over the sloped periphery of the freely rotating truncated rotating-cone 542, because of the friction force $F_F$ that exists between the two sloped surfaces. It should be further appreciated that the friction force $F_F$ may cause erosion of surfaces of sloped inner flat faces (543 and/or 547), which erosion can be calibrated by a calibration mechanism (for example calibrating-bolt 538, see FIG. 31b) that moves the sloped periphery of the freely rotating truncated rotating-cone 542 along rotational axis 565, while sloped inner flat faces (543 and 547) remains stationary.

e. pivotal-interface unit 560, being securely attached to steering post 510, pivots along with steering post 510 about the pivotal axis 515 of steering post 510. Pivotal-interface unit 560 is also securely attached to tilt-conveyor unit 590 that is pivotally connected to non-pivotal-frame element 580 at bearing 585. Thus, as pivotal-interface unit 560 pivots about the pivotal axis 515 of steering post 510, the pivotal motion of pivotal-interface unit 560 is also converted by tilt-conveyor unit 590 into a tilt motion (about bearing 585) of tilt-conveyor unit 590, and also of pivotal-interface unit 560 and of steering post 510.

Hence, steering post 510 tilts sideways in sync with the pivotal motion of steering post 510, and as long as the driver keeps pivoting steering post 510, the pivoting steering post 510 also tilts into the selected pivotal motion side. As steering post 510 continues to tilt, one balancing-actuator 592 (the right balancing-actuator $592_{LW}$ in this example) increases its tension with respect to initial tension force $F_j$, while the other balancing-actuator 592 (the left balancing-actuator $592_{UP}$ in this example) decreases its tension with respect to initial tension force $F_j$.

It should be appreciated that the balancing-actuators 592 being unbalanced during while the steering post 510 is tilted, seek to balance their tension forces, and return to their idle state in which state their initial tension force is $F_j$. therefore, once the driver weakens or releases the pivotal force asserted upon the steering post 510, the balancing-actuators 592 pivots the steering post 510 towards a straight, upright position of steering post 510.

Preferably, scooter 500 includes a folding mechanism facilitating folding scooter 500 to a folded state, such that rear wheel 572 docks between or near the front wheels 532, wherein rear wheel 572 is situated higher that front wheels 532, and wherein scooter 500 can be carried as if it were a carry-on luggage or a trolley carrier.

Figures 33C, 34A:
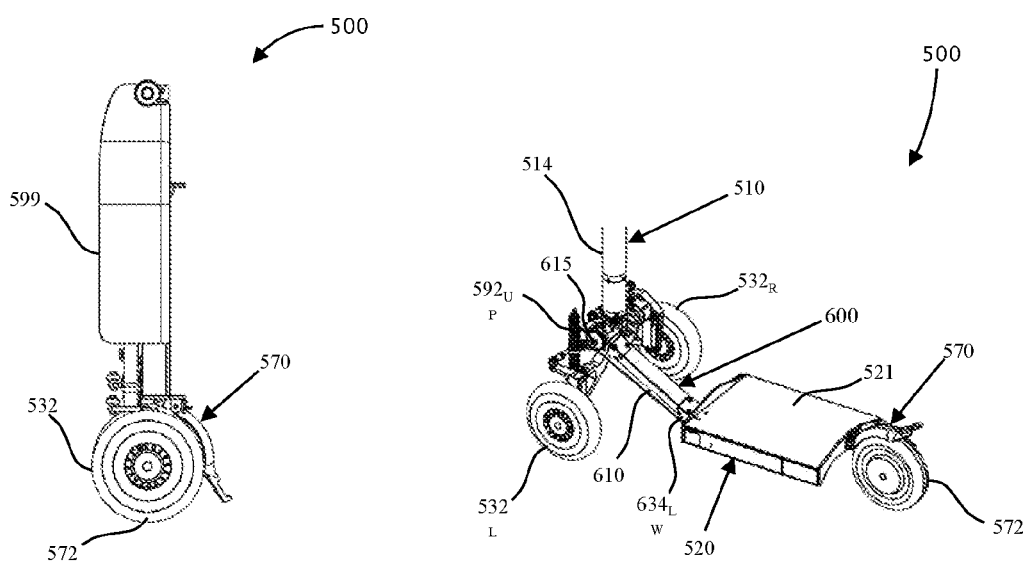
FIG. 33c is a side view of the folded scooter shown in FIG. 33b.
FIG. 34a is a rear, elevated, perspective view schematic illustration of a lower portion of scooter, according to embodiments of the present disclosure, the scooter being in a deployed state, wherein the steering post is in an upright position.

FIG. 33a is a front perspective view schematic illustration the folded scooter 500, according to embodiments of the present disclosure, the scooter being in a folded state. Folded scooter 500 is shown in an upright position, which is the idle state of scooter 500. FIG. 33b is a rear perspective view of the folded scooter 500, wherein the folding process is facilitated after locking mechanisms of an interfacing-profile-arm 610 of a scooter-folding-interface assembly 600 (shown, for example, in FIG. 34a below) are unlocked. It should be appreciated that the folded components may also be locked in the folded state. It should be appreciated that scooter 500 may further include a utility case 599, configured to be attached to steering post 510, including in a folded state, according to embodiments of the present disclosure. FIG. 33c is a side view of the folded scooter 500 shown in FIG. 33b. It should be appreciated that the folded components may also be locked in the folded state.

FIG. 34a is a rear, elevated, perspective view schematic illustration of a lower portion of scooter 500, according to embodiments of the present disclosure. During the folding process were scooter-folding-interface assembly 600 has been activated, interfacing-profile-arm 610 folds upwardly, pivoting about axis 615, while the front end of deck assembly 520 rises upwardly with respect to the pivotally connected interfacing-profile-arm 610, pivoting about axis 625 (shown, for example, in FIG. 34c below). While folding, rear wheel 572 remains on the ground, but when folding is complete, the rear wheel 572 is situated in the air, facilitating comfort use of front wheels 532 to park the scooter or to carry the scooter as a trolley carrier. The rear lower end of interfacing-profile-arm 610 is pivotally attached to a lower rear-pivotal-joint ($620_{RR}$ see below, for example, with respect to FIGS. 34c, 34d, 35a, 35b and 36a), that is securely attached to deck assembly 520, facilitate pivotal motion between interfacing-profile-arm 610 and deck assembly 520. It should be noted that the front upper end of interfacing-profile-arm 610 is pivotally attached to an upper front-revolute-joint ($620_{FR}$ see below, for example, with respect to FIGS. 34e, 35a and 36a), that is securely attached to tilt-conveyor unit 590, facilitate pivotal motion between interfacing-profile-arm 610 and steering mechanism 530.

Figure 34B:
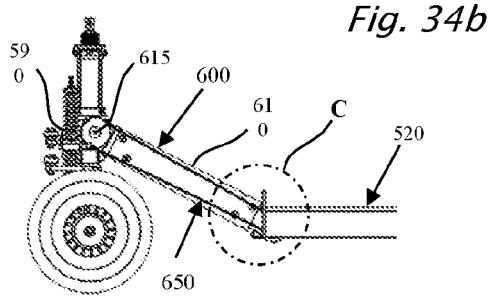
FIG. 34b is a side view schematic illustration of a frontal lower portion of the scooter shown in FIG. 34a, according to embodiments of the present disclosure, wherein the scooter is an upright, deployed balanced state.

FIG. 34b is a side view schematic illustration of a frontal lower portion of scooter 500, according to embodiments of the present disclosure, wherein the scooter 500 is an upright, deployed balanced state. In the shown state, the front end of deck assembly 520, which is, with no limitations, generally parallel to the road surface, and is interconnected to frontal tilt-conveyor unit 590 (see also FIG. 28a) by interfacing-profile-arm 610, facilitating tilt of the deck assembly 520, while scooter 500 is in a deployed position.

Figure 34C:
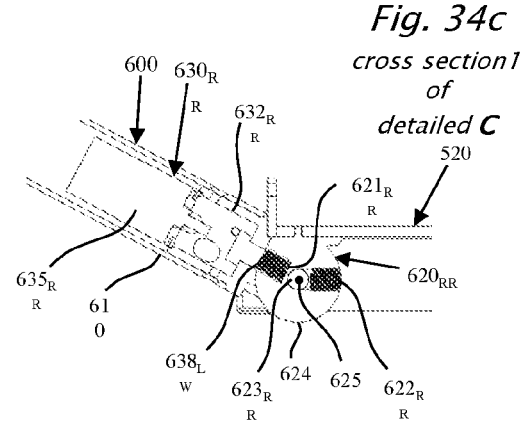
FIG. 34c is a cross-section view of detailed C shown in FIG. 34b, illustrating a non-limiting example of the lower, rear locking-pin assembly of the deck assembly, wherein the lower locking-pin assembly is shown in a locked state.
Figure 34E:
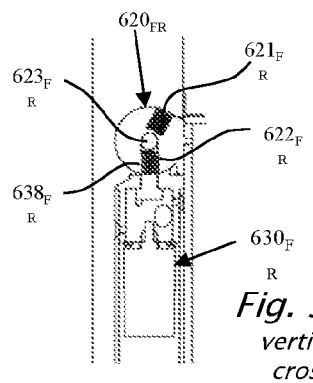
FIG. 34e is a vertical cross-section view of a non-limiting example of an upper, front locking mechanism of the front upper portion scooter-folding-interface assembly shown in FIG. 34d, in which the upper, front latch-bolt (being a post-locking-pin) is locked into folded, front receiving cavity.
Figure 34D:
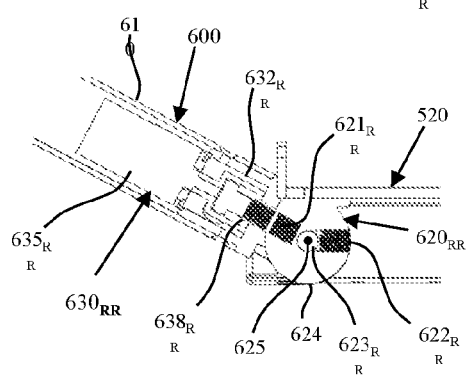
FIG. 34d is a cross-section view of detailed C shown in FIG. 34b, illustrating a non-limiting example of the lower, rear locking-pin assembly of the deck assembly, wherein the lower locking-pin assembly is shown in an unlocked state.

FIG. 34c is a cross-section view of detailed C, illustrating a non-limiting example of a lower, rear locking-pin assembly $630_{RR}$ of the deck assembly 520, wherein lower locking-pin assembly $630_{RR}$ is shown in a locked state. Similarly, FIG. 34d is a cross-section view of detailed C, illustrating a non-limiting example of lower, rear locking-pin assembly $630_{RR}$ of the deck assembly 520, wherein lower, rear locking-pin assembly $630_{RR}$ is shown in an unlocked state. In this a non-limiting example of a locking mechanism, the locking element is a lower, rear latch-threaded-bolt $638_{RR}$ (being a deck-locking-pin), that is operatively coupled with a lower section motor $635_{RR}$ configured to control the lock/unlock state of lower, rear latch-threaded-bolt $638_{RR}$ by power driving lower, rear latch-threaded-bolt $638_{RR}$ into and out of a selected receiving cavity (a deployed, rear receiving threaded cavity $621_{RR}$ or a folded, rear receiving threaded cavity $622_{RR}$), using a rotating bold driving element, for example a fitted-driving-socket $632_{RR}$ that fits the latch-threaded-bolt head. When a vacant receiving cavity faces the end of lower, rear latch-threaded-bolt $638_{RR}$, to lock the respective folding joint in position, lower section motor $635_{RR}$ rotates fitted-driving-cavity $632_{RR}$ that in turn drives lower, rear latch-threaded-bolt $638_{RR}$ into that selected receiving thread (deployed, rear receiving cavity $621_{RR}$ or folded, rear receiving cavity $622_{RR}$). FIG. 34e is a vertical cross-section view of a non-limiting example of an upper, front locking mechanism $630_{FR}$ of the front upper portion scooter-folding-interface assembly 600, in which an upper, front latch-threaded-bolt $638_{FR}$ (being a post-locking-pin) is locked into folded, front threaded receiving cavity $622_{FR}$.

When scooter 500 is in a deployed position, the lower section receiving threaded cavity $621_{RR}$ is facing the end of lower, rear latch-threaded-bolt $638_{RR}$. Thereby, to lock deployed, rear receiving threaded cavity $621_{RR}$ in the deployed position, lower section motor $635_{RR}$ rotates fitted-driving-socket $632_{RR}$ that in turn drives lower, rear latch-threaded-bolt $638_{RR}$ into the deployed, rear receiving threaded cavity $621_{RR}$; and to unlock deployed, rear receiving threaded cavity $621_{RR}$, lower section motor $635_{RR}$ rotates fitted-driving-socket $632_{RR}$ that in turn drives lower, rear latch-threaded-bolt $638_{RR}$ out of deployed, rear receiving threaded cavity $621_{RR}$. When scooter 500 is in a folded state, the lower section folded, rear receiving threaded cavity $622_{RR}$ is facing the end of lower, rear latch-threaded-bolt $638_{RR}$. Thereby, to lock folded, rear receiving threaded cavity, rear $622_{RR}$ in the folded state, lower, rear section motor $635_{RR}$ rotates fitted-driving-socket $632_{RR}$ that in turn drives lower, rear latch-threaded-bolt $638_{RR}$ into that folded, rear receiving threaded cavity $622_{RR}$; and to unlock folded, rear receiving threaded cavity $622_{RR}$, lower section motor $635_{RR}$ rotates fitted-driving-socket $632_{RR}$ that in turn drives lower, rear latch-threaded-bolt $638_{RR}$ out of folded, rear receiving threaded cavity $622_{RR}$.

Figures 35A, 35B:
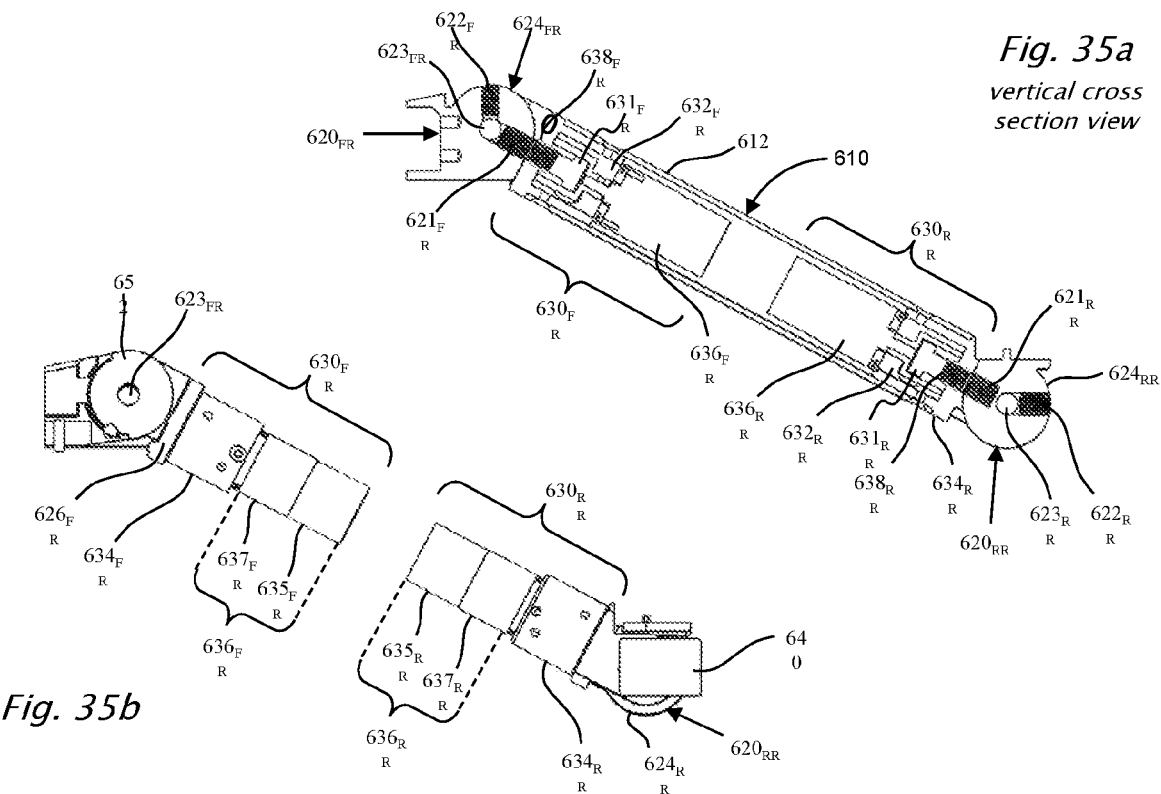
FIG. 35a is a side, vertical, cross-section view schematic illustration of an interfacing-profile-arm, according to some non-limiting example embodiments of the present disclosure.
FIG. 35b is a side, schematic illustration of the internal elements of interfacing-profile-arm shown in FIG. 35a, wherein the interfacing-profile itself has been removed for illustrative purposes only.

FIG. 35a is a side, vertical, cross-section view schematic illustration of interfacing-profile-arm 610, according to some non-limiting example embodiments of the present disclosure. Interfacing-profile-arm 610 includes the lower locking mechanism $630_{RR}$ and a similar front locking mechanism $630_{FR}$, both are shown in an unlocked state, wherein the respective latch-threaded-bolt ($638_{RR}$, $638_{FR}$) is in an unlocking position (also shown in FIG. 34d). In the example state shown in FIG. 35a, deployed receiving threaded cavities ($621_{RR}$, $621_{FR}$) are shown facing the end of the respective latch-threaded-bolt ($638_{RR}$, $638_{FR}$), while folded receiving threaded cavities ($622_{RR}$, $622_{FR}$) are shown away from the respective latch-threaded-bolt ($638_{RR}$, $638_{FR}$).

FIG. 35b is a side, schematic illustration of the internal elements of interfacing-profile-arm 610, according to some non-limiting example embodiments of the present disclosure, wherein the interfacing-profile 610 has been removed for illustrative purposes only. As revealed in FIG. 35b, both section motors $635_{RR}$ and $635_{FR}$ are part of a respective motor-gear assembly ($636_{RR}$, $636_{FR}$), which assemblies may further include a respective gear ($637_{RR}$, $637_{FR}$).

FIG. 35a further illustrates lower section motor $635_{RR}$ and front section motor $635_{FR}$, each interfaced with the respective fitted-driving-socket ($632_{RR}$, $632_{FR}$), wherein the respective bolt-head ($631_{RR}$, $631_{FR}$) is accommodated there inside the respective fitted-driving-socket ($632_{RR}$, $632_{FR}$). Hence, in example embodiment shown, the front motor-gear assembly $636_{FR}$ and a lower motor-gear assembly $636_{RR}$ are interfaced with the respective fitted-driving-socket ($632_{RR}$, $632_{FR}$). In the example unlocked state shown in FIGS. 34d and 35a, when a selected motor-gear assembly ($636_{RR}$ and/or $636_{FR}$) is activated, the respective fitted-driving-socket ($632_{RR}$, $632_{FR}$) is rotated, to thereby drive the respective latch-threaded-bolt ($638_{RR}$, $638_{FR}$) into the respective deployed receiving threaded cavity ($621_{RR}$, $621_{FR}$).

FIG. 22, for example, illustrates scooter 500 in a deployed position, wherein typically, in a deployed position, the rear, lower locking mechanism $630_{RR}$ is preferably in a locked state (see FIG. 34c), wherein lower, rear latch-threaded-bolt $638_{RR}$ is locked in deployed, rear receiving threaded cavity $621_{RR}$; and the front locking mechanism $630_{FR}$ is preferably in a locked state, wherein front, upper latch-threaded-bolt $638_{FR}$ is locked in deployed, front receiving threaded cavity $621_{FR}$.

The folding of scooter 500 is preferably, with no limitations, may be a fully automatic. Reference is also made to FIG. 36a that illustrates the scooter-folding-interface assembly 600, wherein scooter 500 is in a deployed position, including a folding motor 640. FIG. 36b illustrates the scooter-folding-interface assembly 600 shown in FIG. 36a, wherein the folding motor 640 has been removed for illustration purposes only.

The transformation of scooter 500 from a deployed position (see FIG. 22) to a folded state (see FIG. 33c) and from a folded state to a deployed position, typically includes two basic motions: 1) the motion of the scooter-folding-interface assembly 600 towards steering post 510 and back; 2) the motion of the deck assembly 520 towards the scooter-folding-interface assembly 600 and back. The paths these two elements perform simultaneously are not the same and not equal: the motion performed by the deck assembly 520 towards the scooter-folding-interface assembly 600 and back is longer than the motion performed by the scooter-folding-interface assembly 600. The methodology of transforming of scooter 500 from a deployed position to a folded state and from a folded state to a deployed position, is configured to synchronize the motions of these two elements.

The folding and unfolding mechanism described in the present disclosure, with respect to scooter 500, further includes an upper front-pivotal-joint $620_{FR}$, a lower rear-pivotal-joint $620_{RR}$, and a non-elastic tension-cable (or belt) 650 that is wrapped over a pair of cable-wheels: a (see for example FIGS. 36a and 36b) a pivotal rear cable-wheel 654. Tension-cable 650 is anchored to front cable-wheel 652 by a front-anchor element 651 and to rear cable-wheel 654 by a lower anchor element 653. Each pivotal joint 620 ($620_{FR}$, $620_{RR}$) includes a shaft-holding-hinge-device 628 ($628_{FR}$, $628_{RR}$) and a ring (or bearing) element 624 ($624_{FR}$, $624_{RR}$). It should be appreciated that tension-cable 650 can be replaced by a timing belt or a chain coupled with a pair of cog-wheels.

Figure 36C:
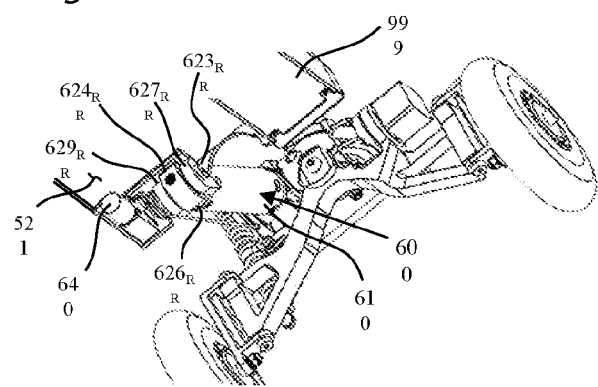
FIG. 36c is a rear, bottom perspective view illustration of the interconnectivity of scooter-folding-interface assembly, shown in FIG. 36a, and other units of the scooter, according to aspects of the present invention.
Figure 36D:
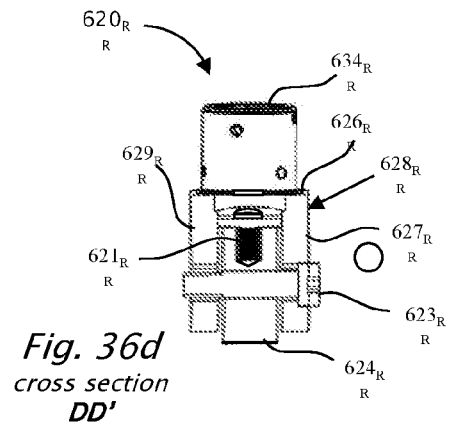
FIG. 36d is a rear cross-section DD' (see FIG. 36a) view of the lower rear-pivotal-joint, wherein the lower rear-pivotal-joint includes a rear shaft-holding-hinge-device and rear ring element.
Figure 36E:
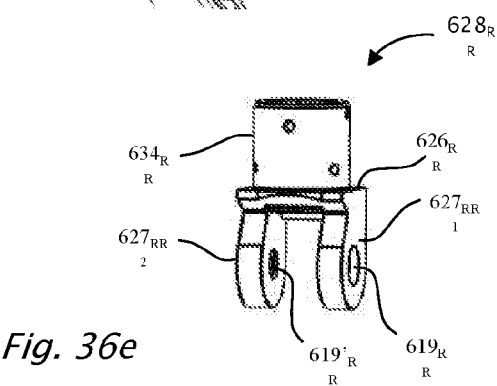
FIG. 36e is a perspective view illustration of a shaft-holding-hinge-device.

FIG. 36c is a rear, bottom perspective view illustration of the interconnectivity of scooter-folding-interface assembly 600 and other units of scooter 500, according to aspects of the present invention. FIG. 36d is a rear cross-section DD' (see FIG. 36a) view of lower rear-pivotal joint $620_{RR}$, wherein lower rear-pivotal joint $620_{RR}$ includes rear shaft-holding-hinge-device $628_{RR}$ and rear ring element $624_{RR}$. FIG. 36e is a perspective view illustration of shaft-holding-hinge-device $628_{RR}$. Shaft-holding-hinge-device $628_{RR}$ includes an attachment-body $626_{RR}$ configured to be securely attached to the rear lower end of interfacing-profile-arm 610 by a rear joint interface element $634_{RR}$. Rear joint interface element $634_{RR}$ is also configured to accommodate lower, rear latch-threaded-bolt $638_{RR}$ and fitted-driving-socket $632_{RR}$ (see for example FIGS. 36a, 36b). Shaft-holding-hinge-device $628_{RR}$ further includes a pair of rear hinge-walls ($627_{RR}$ and $629_{RR}$), wherein a rear hinge-shaft $623_{RR}$ is secure therebetween. Similarly, front shaft-holding-hinge-device $628_{FR}$ includes an attachment-body $626_{FR}$ configured to be securely attached to the front upper end of interfacing-profile-arm 610 by a front joint interface element $634_{FR}$. Front joint interface element $634_{FR}$ is also configured to accommodate upper, front latch-threaded-bolt $638_{FR}$ and fitted-driving-socket $632_{FR}$ (see for example FIGS. 36a, 36b). Shaft-holding-hinge-device $628_{FR}$ further includes a pair of front hinge-walls ($627_{FR}$ and $629_{FR}$), wherein a front hinge-shaft $623_{FR}$ is secure therebetween.

Since, while folding or unfolding, the motion path that the scooter-folding-interface assembly 600 performs simultaneously towards steering post 510, and the motion path that the deck assembly 520 performs towards the scooter-folding-interface assembly 600 are not of equal diameter, rear cable-wheel 654 is of smaller diameter than the diameter of front cable-wheel 652 by a ratio that brings motion path of the scooter-folding-interface assembly 600 and the deck assembly 520 to a preconfigured simultaneous rest state.

Tension-cable 650 is stretched between the pivotal rear cable-wheel 654 and the stationary front cable-wheel 652, building a tension r, wherein tension-cable 650 is anchored onto both cable-wheels, respectively, such that tension-cable 650 does not slip over either cable-wheel (652, 654) but rather wraps thereover, respectively. When folding or unfolding scooter 500, both moving elements (scooter-folding-interface assembly 600 towards steering post 510 or away therefrom) will start and finish their respective motion simultaneously, since the non-elastic tension-cable 650 remains stretched.

Figure 37C:
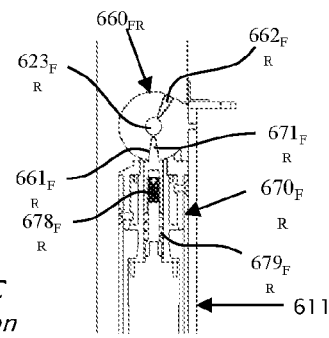
FIG. 37c is a vertical cross-section view of a non-limiting example of a front, upper locking-pin mechanism of the upper portion scooter-folding-interface assembly, in which the upper locking-end of the latch-bolt is locked into folded receiving cavity
Figures 37A, 37B:
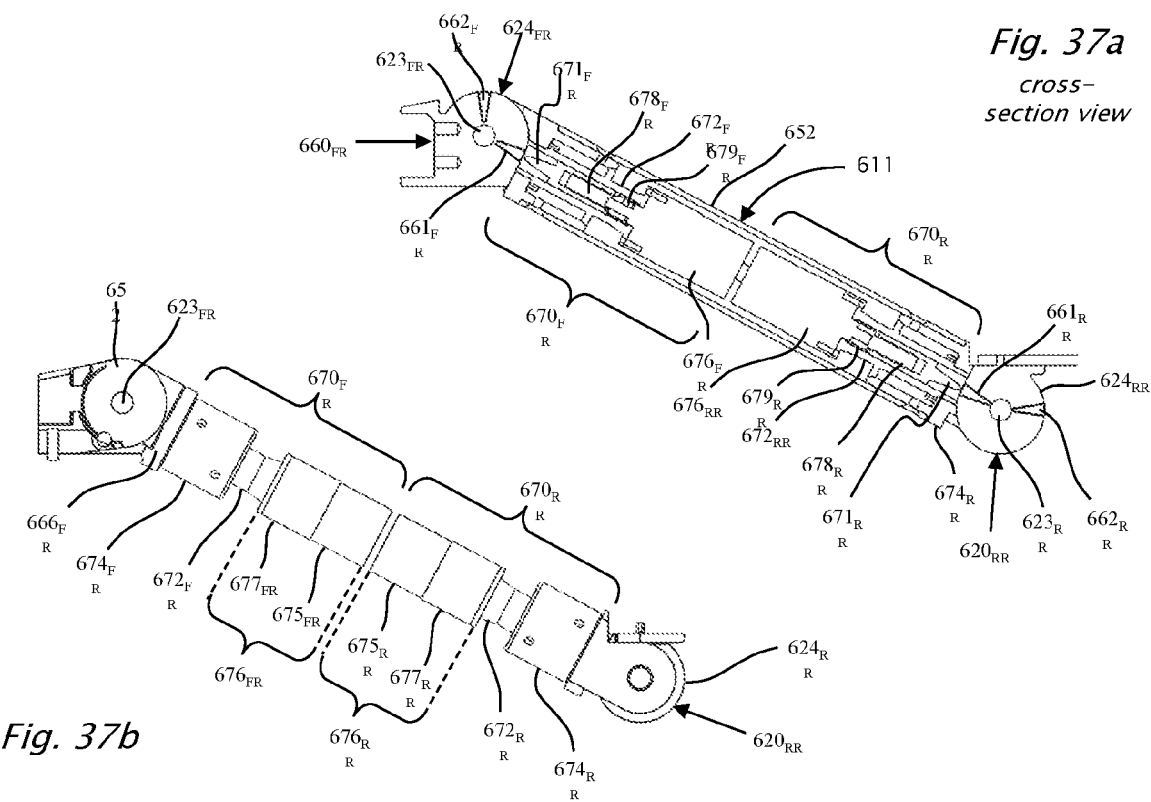
FIG. 37a is a side, vertical, cross-section view schematic illustration of another interfacing-profile-arm, according to some non-limiting example embodiments of the present disclosure.
FIG. 37b is a side, schematic illustration of the internal elements of the interfacing-profile-arm shown in FIG. 37a, wherein the interfacing-profile itself has been removed for illustrative purposes only.

According to variations of the present disclosure, the inner locking mechanism of may be implemented using various locking/unlocking mechanisms known in the art. Another locking/unlocking mechanism of interfacing-profile-arm 610. Reference in now made to FIGS. 37a-37c. FIG. 37a is a side, vertical, cross-section view schematic illustration of an interfacing-profile-arm 611, according to some non-limiting example embodiments of the present disclosure. Interfacing-profile-arm 611 includes a lower, rear locking-pin mechanism $670_{RR}$ and a similar upper, front locking-pin mechanism $670_{FR}$ of steering post 510, both are shown in an unlocked state, wherein the respective latch-bolt ($678_{RR}$ (being a deck-locking-pin), $678_{FR}$ (being a post-locking-pin)) is in an unlocking position. In the example state shown in FIG. 37a, deployed receiving-cavities ($661_{RR}$, $661_{FR}$) are shown facing the end of the respective locking-ends ($671_{RR}$, $671_{FR}$) of latch-bolts ($678_{RR}$, $678_{FR}$), while folded receiving-cavities ($662_{RR}$, $662_{FR}$) are shown away from the respective latch-bolts ($678_{RR}$, $678_{FR}$). Locking-ends ($671_{RR}$, $671_{FR}$) are fittingly housed inside the respective locking-pin-housing ($672_{RR}$, $672_{FR}$), that direct the respective locking-ends ($671_{RR}$, $671_{FR}$) into and out of the respective receiving-cavities ($662_{RR}$, $662_{FR}$).

FIG. 37b is a side, schematic illustration of the internal elements of interfacing-profile-arm 611, according to some non-limiting example embodiments of the present disclosure, wherein the interfacing-profile 611 has been removed for illustrative purposes only. As revealed in FIG. 37b, both lower section motor $675_{RR}$ and upper section motor $675_{FR}$ are part of a respective motor-gear assembly ($676_{RR}$, $676_{FR}$), which assemblies may further include a respective gear ($677_{RR}$, $677_{FR}$). Each motor-gear assembly ($676_{RR}$, $676_{FR}$) is configured the rotate the respective latch-bolt ($678_{RR}$, $678_{FR}$), to thereby either drive the respective latch-bolt ($678_{RR}$, $678_{FR}$) into the receiving-cavities ($661_{RR}/662_{RR}$, $661_{FR}/662_{FR}$), to thereby lock them, or drive the respective latch-bolt ($678_{RR}$, $678_{FR}$) out of the receiving-cavities ($661_{RR}/662_{RR}$, $661_{FR}/662_{FR}$), to thereby unlock them.

FIG. 37c is a vertical cross-section view of a non-limiting example of a front, upper locking-pin mechanism $670_{UP}$ of the upper portion scooter-folding-interface assembly 600, in which upper locking-end $671_{UP}$ of latch-bolt $678_{UP}$ is locked into folded receiving cavity $661_{UP}$.

FIGS. 37a-37b further illustrate a respective example spring ($679_{RR}$, $679_{FR}$), being a biasing force that pushes locking-ends ($671_{RR}$, $671_{FR}$) of latch-bolts ($678_{RR}$, $678_{FR}$) into the respective receiving-cavity ($661_{RR}/662_{RR}$, $661_{FR}/662_{FR}$).

Figure 38A:
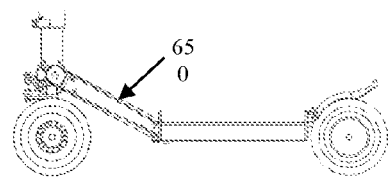
Figure 38B:
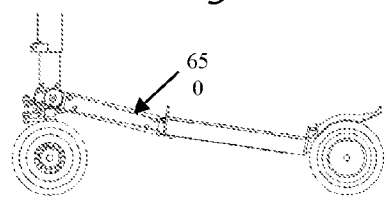
FIG. 38b is a side view illustration of the scooter shown in FIG. 34a, wherein the scooter is in an initial folding instance.
Figure 38C:
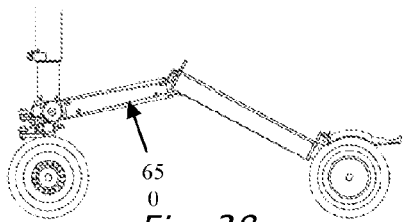
FIG. 38c is a side view illustration of the scooter shown in FIG. 34a, wherein the scooter is in an intermediate folding instance.
Figure 38D:
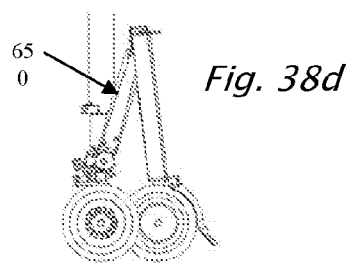
FIG. 38d is a side view illustration of the scooter shown in FIG. 34a, wherein the scooter is in another intermediate folding instance.
Figure 38E:
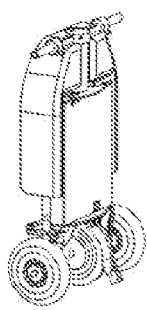
FIG. 38e is a rear perspective view illustration of the scooter shown in FIG. 34a, wherein the scooter is in a folded state.
Figure 38F:
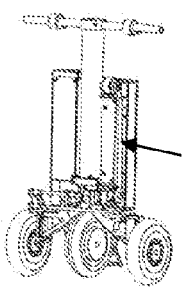
FIG. 38f is a front perspective view illustration of the scooter shown in FIG. 34a, wherein the scooter is in a folded state.

FIG. 38a is a side view illustration of scooter 500 in a deployed position; FIG. 38b is a side view illustration of scooter 500 in an initial folding instance; FIG. 38c is a side view illustration of scooter 500 in an intermediate folding; FIG. 38d is a side view illustration of scooter 500 in an intermediate folding instance; FIG. 38e is a rear perspective view illustration of scooter 500 in a folded state; and FIG. 38f is a front perspective view illustration of scooter 500 in a folded state.

The folding of scooter 500 may be a fully automatic, with no limitations. Reference is also made to FIG. 36a that illustrates the scooter-folding-interface assembly 600 wherein scooter 500 is in a deployed position, including a folding motor 640. FIG. 36b illustrates the scooter-folding-interface assembly 600 shown in FIG. 36a, wherein the folding motor 640 has been removed for illustration purposes only.

It should be appreciated that although the folding motor 640 is shown attached to deck assembly 520, folding motor 640 may be secured to other locations along tension-cable 650.

It should be further appreciated that the folding of scooter may also be fully or partially manual, as will be described further below.

FIG. 39a is a front, side perspective view schematic illustration of the interface of the rear cable-wheel 654 and folding motor 640, according to some non-limiting example embodiments of the present disclosure, wherein folding motor 640 is configured to power pivot cable-wheel 654 via a rear-wheel shaft 645, to thereby wrap or unwrap a portion of tension-cable 650 over or off rear cable-wheel 654. FIG. 39b is a rear, side, partial cross-section perspective view schematic illustration of the interface of the rear cable-wheel 654 and folding motor 640, wherein various elements have been removed for illustration purposes only. FIG. 39c is a rear, elevated perspective view schematic illustration of the interface of the lower rear-pivotal-joint $620_{RR}$, including folding motor 640.

After the scooter-folding-interface assembly 600 is unlocked by driving lower latch-threaded-bolt $638_{RR}$ out of the selected receiving threaded cavity (lower deployed receiving threaded cavity $621_{RR}$ or folded receiving threaded cavity $622_{RR}$), and driving front latch-threaded-bolt $638_{FR}$ out of the selected receiving threaded cavity (front deployed, front receiving threaded cavity $621_{FR}$ or folded, front receiving threaded cavity $622_{FR}$), an automatic folding/unfolding process can take place. For example, in a deployed position, lower, rear latch-threaded-bolt $638_{RR}$ is driven out of the lower deployed, rear receiving threaded cavity $621_{RR}$ and front latch-threaded-bolt $638_{FR}$ is driven out of the front deployed, front receiving threaded cavity $621_{FR}$. Then, the automatic folding/unfolding process may be activated by activating the folding motor 640.

As described hereabove, folding motor 640 is configured to power pivot cable-wheel 654 via rear-wheel shaft 645, rear cable-wheel 654 being secured to rear-wheel shaft 645. Since rear-pivotal-joint $620_{RR}$ and front-pivotal-joint $620_{FR}$ have been unlocked, rear ring element $624_{RR}$ is free to pivot, with respect to shaft-holding element $628_{RR}$, about axis 655. Hence, once folding motor 640 is activated, rear cable-wheel 654 is pivoted and tension-cable 650, being anchored onto rear cable-wheel 654, begins to wrap about rear cable-wheel 654 and thereby inflicts tension onto tension-cable 650. The built tension of tension-cable 650 is transferred to lower rear-pivotal-joint $620_{RR}$, and since rear ring element $624_{RR}$ is free to pivot with respect to shaft-holding element $628_{RR}$, and front ring element $624_{FR}$ is free to pivot about axis 656, with respect to shaft-holding element $628_{FR}$. Front ring element $624_{FR}$, being secured to a tilt-conveyor unit 590, remains in position, while the front end of interfacing-profile-arm 610, being secured to front hinge-walls ($627_{FR}$ and $629_{FR}$, see FIG. 36a) pivots via front hinge-shaft $623_{FR}$ inside front ring element $624_{FR}$.

Thereby, the folding process begins: the front end of standing board 521, being secured to rear ring elements $624_{RR}$, begins to incline upwards and forward towards steering post 510 (see FIGS. 36a, 36b, path-curve 618), along with the rear end of interfacing-profile-arm 610.

Figure 40B:
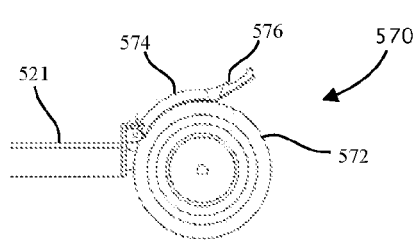
Figure 40A:
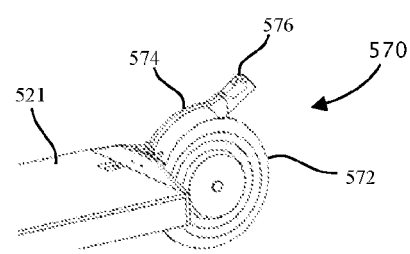
FIG. 40a illustrates an example rear-wheel cover, in a perspective, slightly elevated view.
Figure 40D:
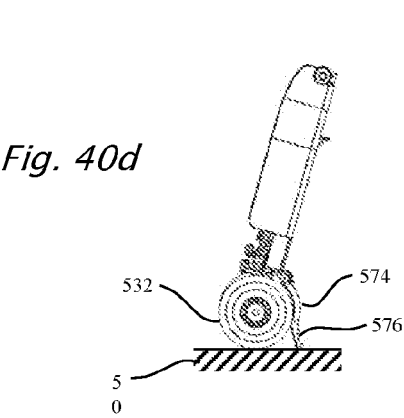
FIG. 40d illustrates the scooter shown in FIG. 40c, wherein the scooter has just reached the end of the folding process is completed, and wherein the rear wheel is in the air, above the ground level, and wherein the scooter leans back on rear-wheel cover, that now serves as a kickstand.
Figure 40C:
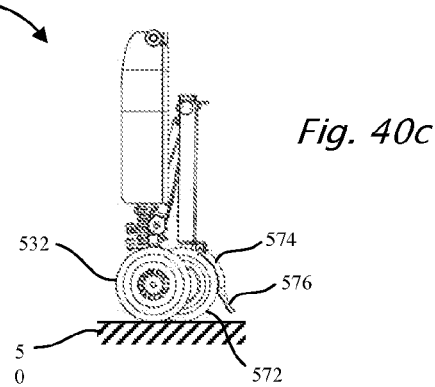
FIG. 40c is a side view illustration of a scooter, according to embodiments of the present disclosure, wherein the scooter is shown in an instance just before a folding process is completed, and wherein the rear wheel is still situated on a hard surface.

Rear-wheel cover 574 of scooter 500 may also serve as a kickstand. FIG. 40a illustrates an example rear-wheel cover 574, in a perspective, slightly elevated view. FIG. 40b is a side view illustration of the example rear-wheel cover 574. Referring is now made to FIG. 40c, scooter 500 is illustrated in a side view, wherein scooter 500 is shown in an instance just before a folding process is completed, and wherein rear wheel 572 is still situated on the surface of a road 50. Referring is also made to FIG. 40d, where the scooter 500 shown in FIG. 40c has just reached the end of the folding process is completed, and wherein rear wheel 572 is preferably in the air, above the ground level, and scooter 500 leans back on rear-wheel cover 574 that now serves as a kickstand.

It should be appreciated that since scooter 500 includes at least two front wheels 532, scooter 500 is capable of standing still without any support. Thereby, it is also possible to facilitate scooter 500 to drive autonomously. Scooter 500 may be equipped with sensors such as, with no limitation, camera, GPS, a controller, means for remote communication, etc., and thereby enable operation using remote communication.

Reference is now made to FIG. 41a, showing elements of a non-limiting example embodiment of an autonomous driving mechanism 680 that includes an autonomous motor 682 disposed inside the upper-post 512 of steering post 510, a rotation-transmission-rod 684 and a rotation-receiving-rod 686 that is secured to lower-post 514, wherein rotation-transmission-rod 684 and rotation-receiving-rod 686 are operationally disengaged. FIG. 41b is a rear, cross-section view of the autonomous driving mechanism 680 shown in FIG. 41a. FIG. 41c is a rearview illustration of autonomous driving mechanism 680, wherein rotation-transmission-rod 684 and rotation-receiving-rod 686 are operationally engaged. FIG. 41d is a rear, cross-section view of the autonomous driving mechanism 680 shown in FIG. 41c.

Hence, in this example embodiment, in order to activate driving mechanism 680, the upper-post 512 is moved downwards over (or inside) lower-post 514, until rotation-transmission-rod 684 engages with rotation-receiving-rod 686, for example, when a tip 685 at the lower end of rotation-transmission-rod 684 is secured inside a receiving opening formed at the upper end of rotation-receiving-rod 686. Then, when activating autonomous motor 682, rotation-transmission-rod 684, being rotational connected to rotation-transmission-rod 684, begins to pivot in a selected direction; rotation-receiving-rod 686, being secured to rotation-transmission-rod 684, pivots with rotation-transmission-rod 684. Since rotation-receiving-rod 686 is secured to lower-post 514, steering post 510 pivots with rotation-receiving-rod 686. To disengage the autonomous driving, the drive can simply lift the upper-post 512.

It should be appreciated that by using sensors such as, with no limitation, a camera unit and a GPS, and by remote controlling a scooter motor that is coupled with the rear wheel 572, scooter 500 can be remotely driven in any direction, deliver goods, engage with a battery charging unit, and a variety of other tasks.

Figure 42A:
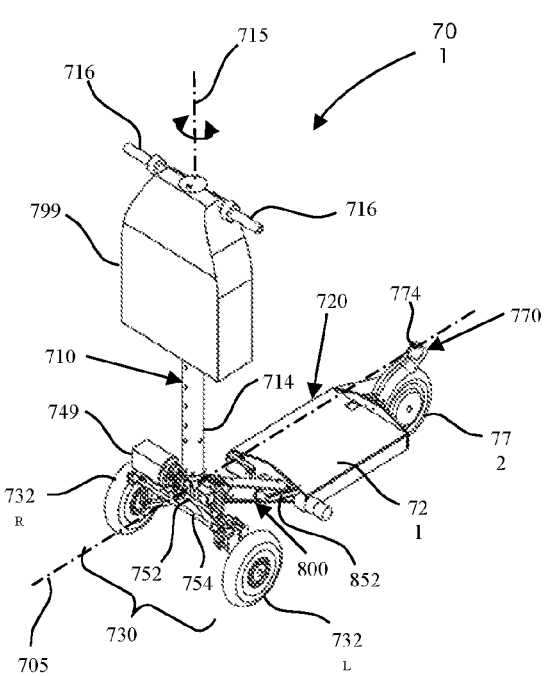
FIG. 42a schematically illustrates a non-limiting example embodiment of another scooter, including a steering post, a deck assembly, a steering mechanism, a rear wheel assembly and an optional detachable bag, according to aspects of the present disclosure, wherein the steering post is in a straight, upright position.
Figure 42B:
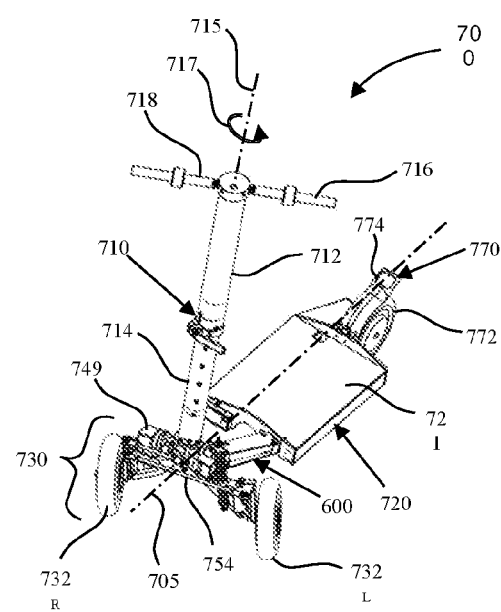
FIG. 42b schematically illustrates a non-limiting example of the scooter shown in FIG. 42a, wherein the steering post is a left turn instance position, and wherein the scooted includes an optional manual folding mechanism.

According to variations of the present disclosure, FIGS. 42a and 42b schematically illustrates a third, non-limiting example embodiment of a scooter 700 and a scooter 701, including a steering post 710, a deck assembly 720 having a standing board 721 and a rear wheel assembly 770, a steering mechanism 730 and an optional detachable bag 799, according to aspects of the present disclosure, wherein the steering post 710 is in straight, upright position. Standing board 721 is configured to incline sideways towards the inside periphery of the turning curve, and configured for supporting a rider, typically standing thereon.

It should be noted that scooter 700 differs from scooter 701 in that that the scooter 700 includes a motorized folding mechanism and scooter 701 includes a manual folding mechanism. Otherwise, scooter 700 and scooter 701 are identical. Therefore, when referring to mechanisms that do not involve the folding mechanism, the description related to scooter 700 also applies to scooter 701.

Scooter 700 (and scooter 701) is similar to scooter 500, but in particular (with no limitations), scooter 700 differs from scooter 500 in the implementation of the following mechanisms: a steering mechanism 730 compared with steering mechanism 530; a tilt-synchronizing unit 740 compared with tilt-synchronizing unit 540; a tilt-synchronizing assembly 755 compared with tilt-synchronizing assembly 555; a pivotal-interface unit 760 compared with pivotal-interface unit 560; and a tilt-conveyor unit 790 compared with tilt-conveyor unit 590.

Scooter 700 is illustrated in FIGS. 42a-54d which are respectively similar (with no limitations) to FIGS. 22-41d of scooter 500. The following describes the variations in the embodiment of scooter 700 compared, respectively, with the embodiment of scooter 500.

Figure 43:
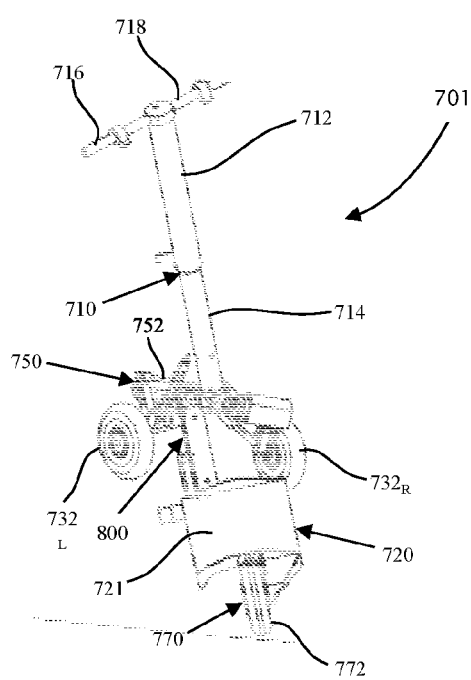
FIG. 43 is a rear perspective view, schematic illustration the scooter shown in FIG. 42b, wherein the steering post is pivoted to the left and thereby also tilted to the left.

Reference is made to FIGS. 42a-52d that relate to steering mechanism 730. Steering mechanism 730 facilitates the rider, when turning steering post 710 to turn scooter 700 either to the left or to the right, at his will. FIG. 42b schematically illustrates the scooter 700 in a state where the steering post 710 is pivoted to the left, in direction 717, and thereby also tilted to the left, according to aspects of the present disclosure. FIG. 43 is a rear perspective view, schematic illustration of the scooter 701, according to aspects of the present disclosure, wherein the steering post 710 is pivoted to the left and thereby also tilted to the left. The tilting measure dictates the tilting measure at a constant preconfigured rate. In one embodiment, steering post 710 is subdivided into an upper-post 712 and a lower-post 714, wherein upper-post 712 may slide over lower-post 714, telescopically.

Figure 44:
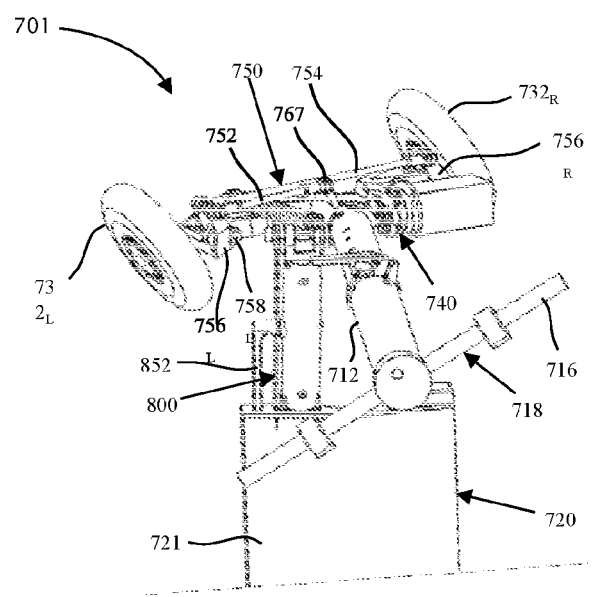
FIG. 44 is a top perspective view, schematic illustration of the front section of the scooter shown in FIG. 42b.

Steering mechanism 730 further includes a pair of front wheels 732 interconnected by a steering mechanism to steering post 710, wherein when steering post 710 is pivoted, each of the front wheels ($732_L$, $732_R$ is also pivoted in the same direction by a wheels-pivoting-mechanism 750, as shown in FIG. 44. FIG. 44 is a top perspective view, schematic illustration of the front section of the scooter 701, according to aspects of the present disclosure, wherein the non-limiting example shown for the wheels-pivotingmechanism 750 is based on the Ackerman Steering Principle (ASP). In such an ASP steering mechanism, the inner front wheel needs to turn at a different angle than the outer wheel because they are turning on different radii. The ASP steering mechanism is a geometric arrangement of linkage components (such as 767, 752, 754, 756) in wheels-pivoting-mechanism 750 designed to turn the inner and outer wheels at the appropriate angles. Any other mechanism known in the art for coordinately pivot both front wheels, such as in cars, may be used (and not as, for example, in a "carriage" mechanism). The example wheels-pivoting-mechanism 750 includes pivoting receiving linkage components 756, receiving the pivotal motion from steering post 710, whereas the motion is transmitted to front wheels $732_L$ and $732_R$, by a pair of axially moving rods, 752 and 754, to respective linkage components 756, to which respective linkage component 756 the respective front wheel 732 is rotatably attached. It should be appreciated that while the scooter 700 is in a turn instance position, the pivoted front wheels ($732_L$, $732_R$) remain in an upright orientation, wherein both wheels remain firmly on the road, when riding in reasonable speed. Each linkage components 756 ($756_L$, $756_R$) further include a respective independent shaft 758 ($758_L$, $758_R$), about which shaft 758 the respective front wheel ($732_L$, $732_R$) pivots, when making a turn.

Figure 45A:
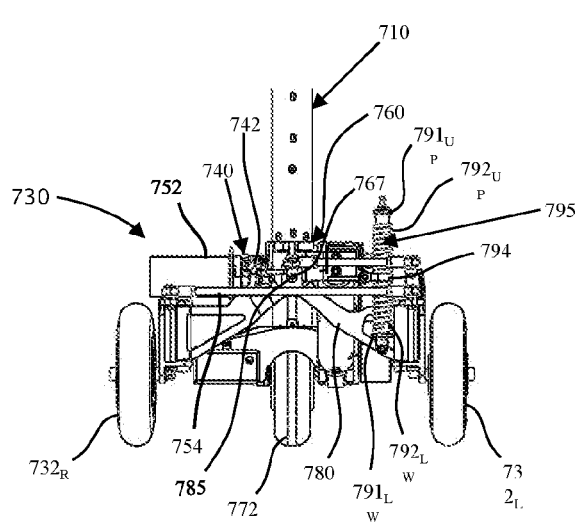
FIG. 45a is a front view of the scooter shown in FIG. 42a, wherein for visibility purposes only, some parts have been removed for illustration purposes only.
Figure 46A:
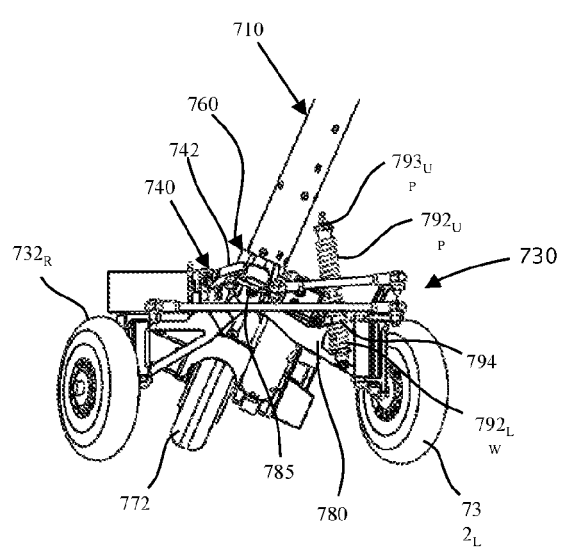
FIG. 46a is a front view of the steering mechanism of the scooter shown FIG. 42b, wherein for visibility purposes only, some occluding parts have been removed for illustration purposes only, and wherein the scooter is shown in a left turn instance position.

FIG. 45a is a front partial view of scooter 700/701, schematically illustrating a non-limiting example of steering mechanism 730, wherein for visibility purposes only, some parts (related to steering post 710) have been removed for illustration purposes only, and wherein scooter 700, is shown in a deployed position (state). Similarly, FIG. 46a is a front view of the scooter 700, schematically illustrating steering mechanism 730, wherein for visibility purposes only, some occluding parts have been removed for illustration purposes only, and wherein scooter 700 is shown in a left turn instance position.

Figure 45B:
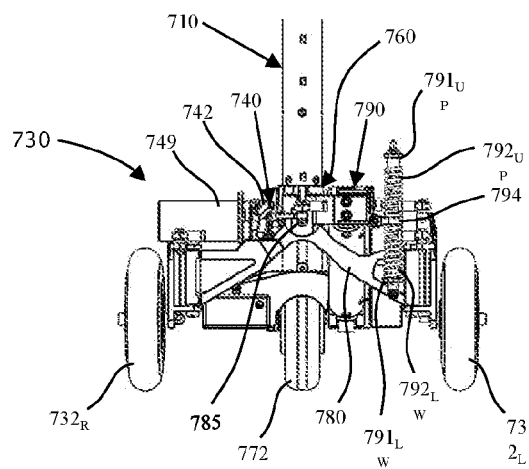
FIG. 45b is a front view, schematic illustration of a steering mechanism of the scooter shown in FIG. 42b, wherein components that take part in facilitating the scooter to turn either left or right, are shown mostly.
Figure 46B:
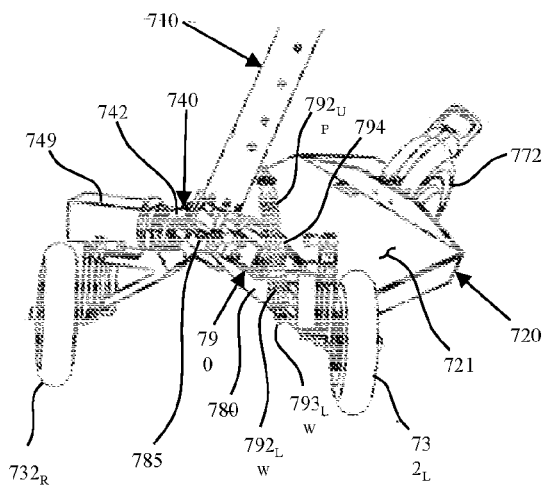
FIG. 46b is a front view, schematic illustration of a steering mechanism of the of the scooter shown in FIG. 46a, wherein mostly components that take part in facilitating the scooter to turn either left or right, are shown.

FIG. 45b is a front view, schematic illustration of steering mechanism 730 of the scooter 700/701, shown in a deployed position. FIG. 45b illustrates components that take part in facilitating scooter 700/701 to turn either left or right. Similarly, FIG. 46b is a front view, schematic illustration of the steering mechanism 730 of the scooter 700/701, shown in a left turn instance position. FIG. 46b illustrates components that take part in facilitating scooter 700/701 to turn (left turn in the non-limiting example shown in FIG. 46b).

The steering mechanism 730 components that take part in facilitating scooter 700/701 to turn, with automatic tilt of the steering post 710, include steering post 710, a pair of front wheels 732, a tilt-synchronizing unit 740 and a pair of balancing-actuators 792 ($792_{UP}$, $792_{LW}$), shown as a pair of springs, by way of example only. Balancing-actuators 792 may also be embodied, for example, as a pair of pneumatic or hydraulic mechanisms. The steering mechanism 730 further includes the following interfacing components: a pivotal-interface unit 760 a tilt-conveyor unit 790, and a non-pivotal-frame element 780.

It should be appreciated that while the rider pivots steering post 710, pivotal-interface unit 760, being securely attached to steering post 710, pivots along with steering post 710, while tilt-conveyor unit 790, being pivotally connected to non-pivotal-frame element 780 at bearing 785, tilts sideways in sync with the pivotal motion of steering post 710.

The pair of similar balancing-actuators 792 ($792_{UP}$, $792_{LW}$) are mounted on a mutual vertical carrying rod 795 (see for example FIG. 45a), and wherein a pair end-stoppers (upper end-stopper $791_{UP}$, and lower end-stopper $791_{LW}$) limit the motion of balancing-actuators ($792_{UP}$, $792_{LW}$) disposed therebetween the end-stoppers ($791_{UP}$, $791_{LW}$) on vertical carrying rod 795, having an upper open end and a lower open end (see for example FIGS. 46a and 46b). The balancing-actuators $792_{UP}$ and $792_{LW}$ are separated by a force conveying ring 794 disposed therebetween, and wherein the force conveying ring 794 receives a forceful motion vector along vertical carrying rod 595 and towards either balancing-actuators $792_{UP}$ or $792_{LW}$, from tilt-conveyor unit 790 that is securely attached to the steering post 710 and is configured to pivot about a bearing 785 disposed at a laterally central location of non-pivotal-frame element 780. When no tilt is asserted onto steering post 710, force conveying ring 794 applies equal pressing force onto both balancing-actuators 792 ($792_{UP}$, $792_{LW}$).

It should be appreciated that the respective position of upper end-stopper $791_{UP}$ and lower end-stopper $791_{LW}$, may be adjusted, for example by a respective nut $793_{UP}$ or $793_{LW}$ (see for example FIGS. 46a and 46b).

The force conveying ring 794 is securely and operatively connected to the tilt-conveyor unit 790. Hence, force conveying ring 794 actuates the relative rotational power forces between non-pivotal-frame element 780 and the respective balancing-actuator 792 ($792_{UP}$ and/or $792_{LW}$), and asserting a steering-post-return-force counter to the pivotal force applied by the driver on the steering post 710. Once the driver weakens or releases the pivotal force (or turns back the steering post 710), the balancing-actuators 792 assert a counter force onto force conveying ring 794 that cause the steering post 710 to pivot towards a straight, upright position of steering post 710. It should be appreciated that balancing-actuators 792 may store a biasing force by either compressing a compressible balancing-actuators 792, or by pulling a balancing-actuators 792. The present disclosure is described as if a respective balancing-actuator 792 is compressed, and the stored biasing force within the respective balancing-actuator 792 tries to return to its idle, non-compressed state (or a balance compression state between both balancing-actuators $792_{UP}$ and $792_{LW}$).

It should be further appreciated that standing board 721, also being attached to tilt-conveyor unit 790, is configured to incline sideways towards the inside periphery of the turning curve, together with tilt-conveyor unit 790 (for example, see FIGS. 46a and 46b as well as a scooter-folding-interface assembly 800 shown, for example, in FIG. 47a below).

FIGS. 47a and 47b are provided to further clarify the steering mechanism 730 and the inter-relation between pivotal-interface unit 760, tilt-synchronizing unit 740, tilt-conveyor unit 790 and non-pivotal-frame element 780. FIG. 47a is a rear elevated perspective view illustration of the steering mechanism 730 components while scooter 700 is in a left turn instance position, and FIG. 47b is a front elevated perspective view illustration of the same. The tilt-synchronizing unit 740 includes a set of four truncated rotating-cones 742, that together with a fitted mountable-arched-rib 744, facilitate automatic tilt of the steering post 710, when pivoting steering post 710 (to the left, in the shown non-limiting example).

Figure 47C:
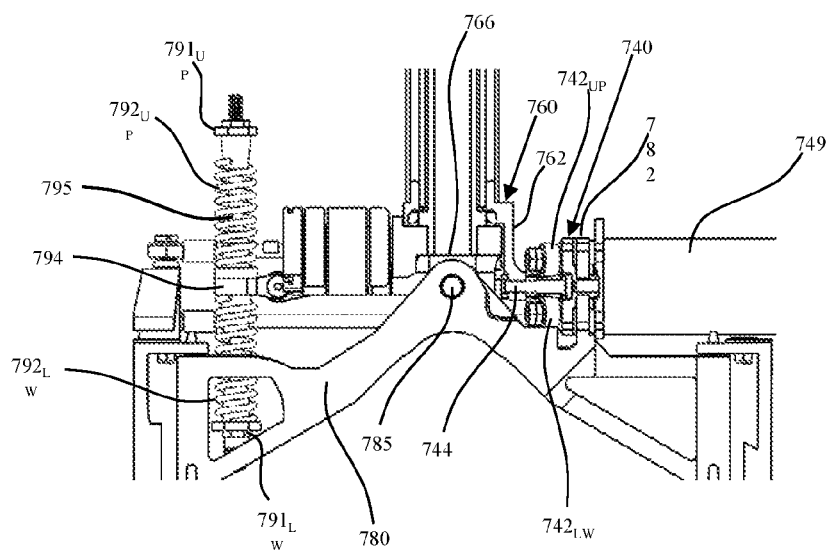
FIG. 47c. is a rear-view illustration of a portion of the steering mechanism components shown in FIG. 28a, wherein the steering post is in an upright position.

The non-pivotal-frame element 780 includes a tilt-synchronizing-unit-holding-ring 782 that is configured to affix the tilt-synchronizing unit 740 to non-pivotal-frame element 780. The pivotal-interface unit 760, on the other hand, is affixed to steering post 710, and thereby pivots with the steering post 710, when steering post 710 is pivoted by the rider or otherwise. FIG. 47c is a rear-view illustration of a portion of the components of steering mechanism 730, wherein steering post 710 is in an upright position.

Reference is also made to FIG. 48a that illustrates a front, top perspective view of tilt-synchronizing unit 740, and to FIG. 48b that illustrates a front, bottom perspective view of tilt-synchronizing unit 740. Tilt-synchronizing unit 740 includes, as an example embodiment, four truncated rotating-cones 742 is disposed such that operatively, the wide round side of the truncated rotating-cones 742 face the steering post 710. At the narrow side of the truncated rotating-cones 742 that face away from steering post 710, two truncated rotating-cones $742_{UP}$ are rotatably disposed at the upper section of tilt-synchronizing unit 740, and the other two truncated rotating-cones $742_{LW}$ are rotatably disposed at the lower section of tilt-synchronizing unit 740. All of the truncated rotating-cones 742 have the same dimensions, wherein the flat dimension of the cone surface forms an angle γ with the rotational axis of the respective truncated rotating-cone 742.

It should be appreciated that in the example embodiment shown with respect to scooter 700/701, the number of the truncated rotating-cones 742 may vary, wherein at least one upper rotating-cone $742_{UP}$ is used, and at least one lower rotating-cone $742_{LW}$ is used.

Figures 48D, 48E:
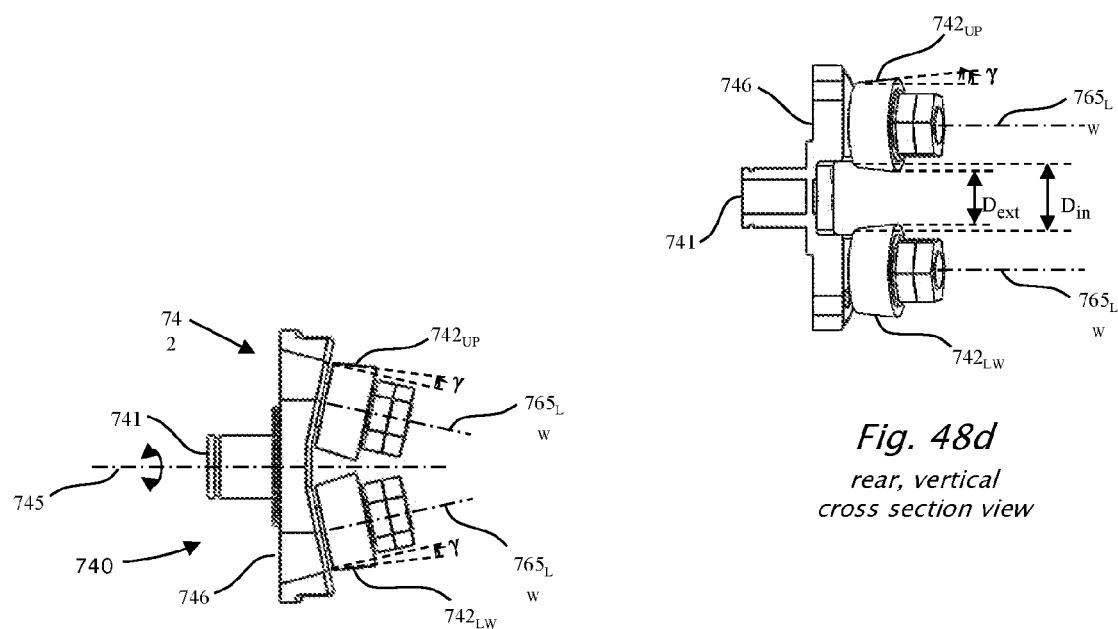

A arched shaped tunnel 747 is formed between the upper truncated rotating-cones $742_{UP}$ and the lower truncated rotating-cones $742_{LW}$. Reference is also made to FIG. 48c that illustrates a side view of tilt-synchronizing unit 740, as viewed from the steering post 710. FIG. 48d illustrates a rear, vertical, cross-section view of tilt-synchronizing unit 740. FIGS. 48c and 48d illustrates the dimensions of tunnel 747 having a narrow dimension $D_{ext}$ and a wide dimension $D_{in}$. FIG. 48e illustrates a partial, lateral cross-section, top view of tilt-synchronizing unit 740, showing the front lower truncated rotating-cones $742_{LW}$ and the rear lower truncated rotating-cones $742_{LW}$.

It should be appreciated that when steering post 710 is in an upright position, the tunnel 747 has an initial inclination angle with respect to the horizon. Tilt-synchronizing unit 740 of steering mechanism 730 may further include a speed-biasing motor 749 configured to bias the tilt degree of steering post 710 when making a turn, as a function of the scooter's 700 riding speed, in addition to the degree of pivoting steering post 710. Speed-biasing motor 749 is pivotally attached to tilt-synchronizing unit 740 via a central shaft 741, whose rotational axis 745 (see FIG. 48e, for example) coincides with the rotational axis of speed-biasing motor 749.

Figure 49A:
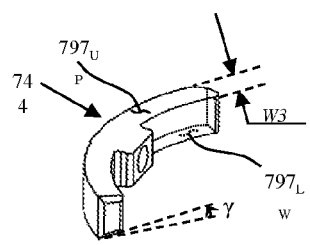
FIG. 49a illustrates a mountable-arched-rib having an inclined upper flat face and an inclined lower flat face, wherein both inclined flat faces are inclined by angle γ.
Figure 49B:
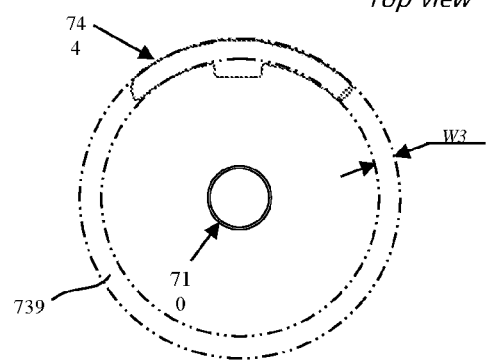

Reference is also made to FIG. 49a-49b. FIG. 49a illustrates mountable-arched-rib 744 having an inclined upper flat face $797_{UP}$ and an inclined lower flat face $797_{LW}$, wherein both the inclined upper flat face $797_{UP}$ and the inclined lower flat face $797_{LW}$ are inclined by angle γ. FIG. 49b, illustrates a top view of the mountable-arched-rib 744, wherein the inclined upper flat face $797_{UP}$ of mountable-arched-rib 744 is fully shown, and wherein mountable-arched-rib 744 is shown to be part of an imaginary cylindrical ring 739 having a width W3 and a pivotal axis that operatively coincides with pivotal axis 715 of steering post 710.

Figures 50A, 50B, 50C:
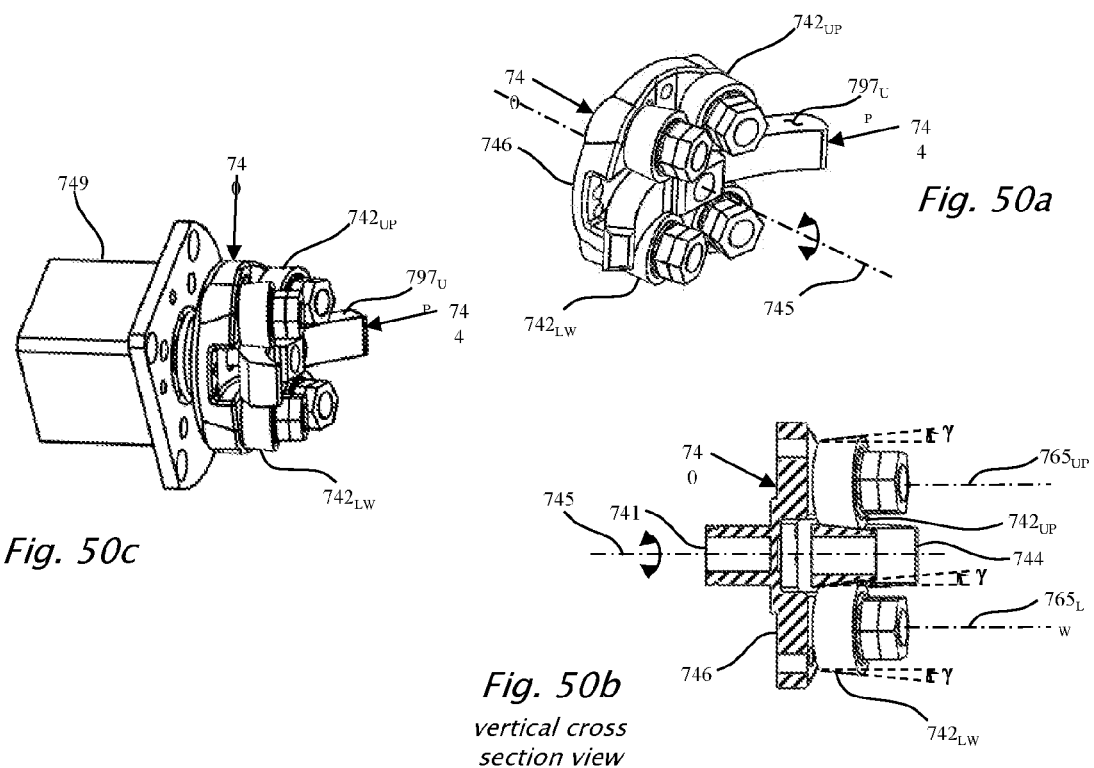

Reference is also made to FIG. 50a-50c. FIG. 50a illustrates a top perspective view of tilt-synchronizing unit 740, wherein mountable-arched-rib 744 is disposed between the upper pair of truncated rotating-cones $742_{UP}$ and the lower pair of truncated rotating-cones 742. when scooter 700/701 is in an idle state, mountable-arched-rib 744 has an initial inclination angle with respect to the horizon and situated at (or proximal to) the pivotal axis 745 of mountable-arched-rib 744. FIG. 50b illustrates a vertical cross-section view of the assembly of tilt-synchronizing unit 740 and mountable-arched-rib 744, as shown in FIG. 50a. FIG. 50c illustrates a top perspective view of the assembly of tilt-synchronizing unit 740 and mountable-arched-rib 744, as shown in FIG. 50a, wherein mountable-arched-rib 744 is shown pivoted, to there by facilitate biasing the tilt of steering post 710 according to the speed of driving. The tilt motion is typically performed by an electric speed-biasing motor 749, similar to speed-biasing motor 549 of scooter 500, wherein speed-biasing motor 749 is configured to pivot body 746, onto which truncated rotating-cones 742 are mounted.

Figure 51A:
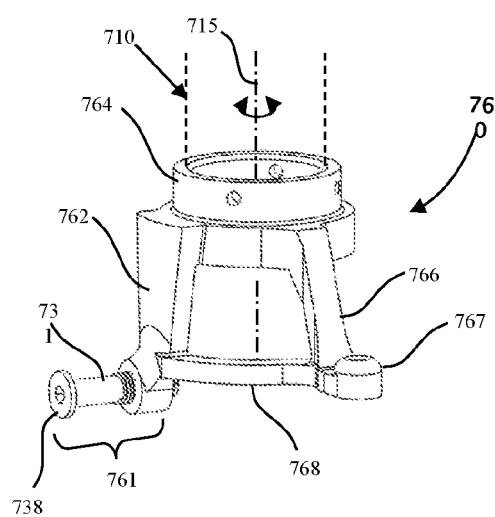
Figure 51B:
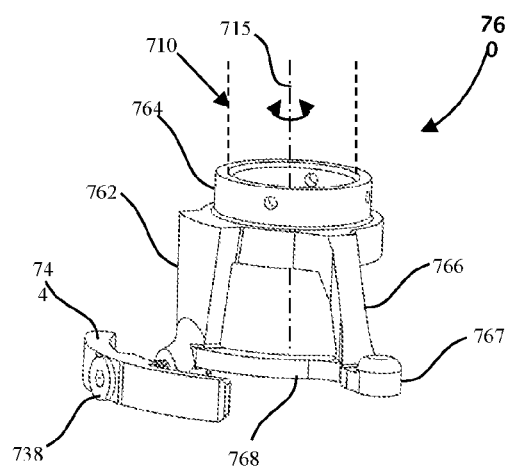

Pivotal-interface unit 760 is quite similar to pivotal-interface unit 560, except that the rotating-cone linkage assembly 561 is replaced by an arched-rib linkage assembly 761 that is configured to mount mountable-arched-rib 744, such that mountable-arched-rib 744 will pivot according the any pivotal motion of steering post 710. In one embodiment, the mountable-arched-rib 744 is mounted onto pivotal-interface unit 760 by a calibrating-bolt 738 that can be tightened as required via threads of stationary shaft 731, as shown in FIG. 51a. FIG. 51b illustrates a side perspective view of the arched-rib linkage assembly 761, wherein mountable-arched-rib 744 is mounted onto pivotal-interface unit 760.

Figures 52A, 52B:
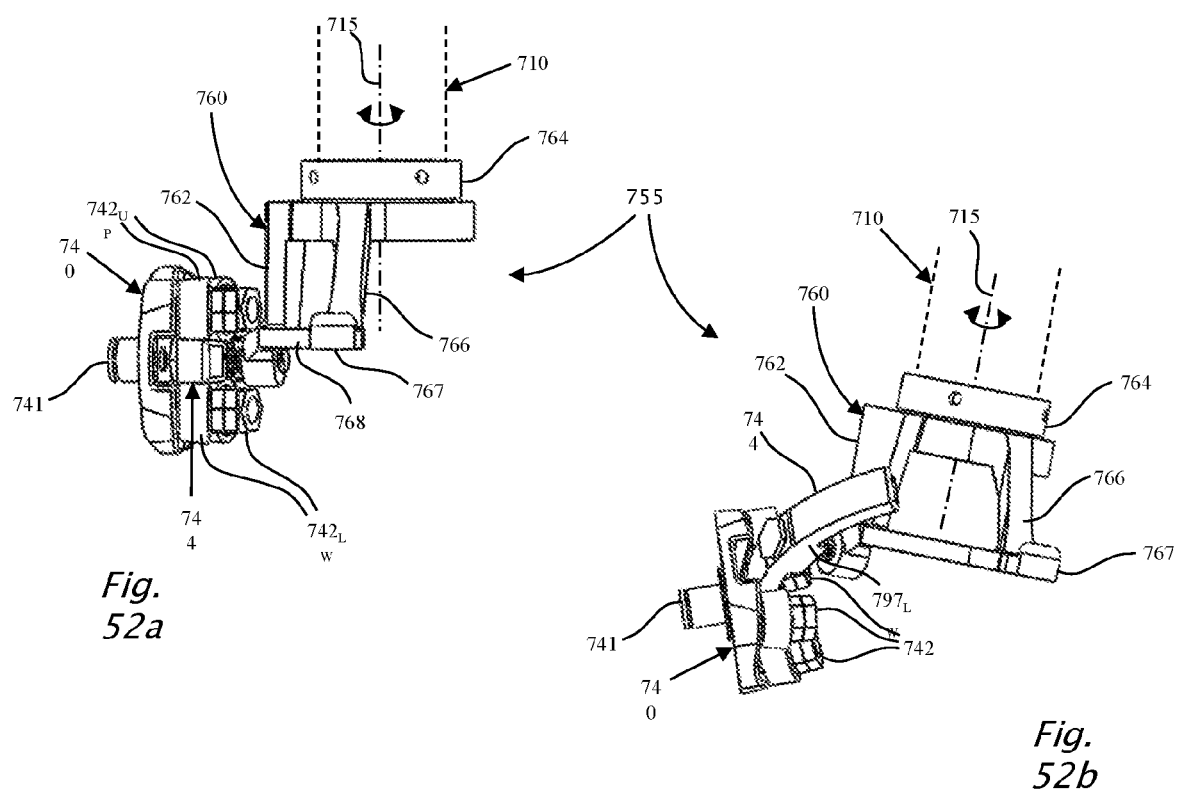

FIG. 52a is a front perspective view schematic illustration of a tilt-synchronizing assembly 755, the assembly 755 including tilt-synchronizing unit 740 and mountable-arched-rib 744, the scooter 700 being in a deployed position, wherein steering post 710 is in an upright position, and wherein the mountable-arched-rib 744 that is mounted on the stationary shaft 731 of arched-rib linkage arm 762, of pivotal-interface unit 760, is operatively paired with the truncated rotating-cones 742 of tilt-synchronizing unit 740. It should be appreciated that since steering post 710 is in an upright position, the mountable-arched-rib 744 is disposed between the upper truncated rotating-cones $742_{UP}$ and the lower mountable-truncated-rotating-cones $742_{LW}$ and calibrating-bolt 738 is situated at (or proximal to) the central location among all of the truncated rotating-cones 742.

FIG. 52b is a bottom-front perspective view schematic illustration of tilt-synchronizing unit 740 of steering mechanism 730, the scooter 700/701 being in a deployed position, wherein scooter 700 is shown, by way of example, in a left turn instance position. The mountable-arched-rib 744 that is mounted on the stationary shaft 731 of arched-rib linkage arm 762, of pivotal-interface unit 760, is operatively paired with the truncated rotating-cones 742 of tilt-synchronizing unit 740. It should be appreciated that since steering post 710 has been pivoted in the example to the left, the mountable-arched-rib 744 is disposed between the upper truncated rotating-cones $742_{UP}$ and the lower truncated rotating-cones $742_{LW}$ and calibrating-bolt 738 is situated away from the central towards the front of scooter 700. When the rider pivots steering post 710 to the left, the mountable-arched-rib 744, being disposed between the upper truncated rotating-cones $742_{UP}$ and the lower truncated rotating-cones $742_{LW}$, towards the front, proportionally to the pivoting angle.

It should be appreciated that when making a right turn (in this example embodiment), by pivoting steering post 710 to the right, calibrating-bolt 738 moves towards the rear end of scooter 700/701.

The tilt biasing mechanism of scooter 700/701 is similar to the tilt biasing mechanism of scooter 500, except that speed-biasing motor 749 is pivotally attached to tilt-synchronizing unit 740 via a central shaft 741, whose rotational axis 745 (see FIG. 48e, for example) coincides with the rotational axis of speed-biasing motor 749, and wherein tilt-synchronizing unit 740 includes a set of four truncated rotating-cones 742.

It should be appreciated that the tilt-synchronizing unit 740 may include at least two or more truncated rotating-cones 742.

It should also be appreciated that pivotal-interface unit 760 may also operatively interface with tilt-synchronizing unit 540. Referring back to FIGS. 30a-30d rotating-cone 542 may be fittingly substituted by mountable-arched-rib 744 such that when steering post 510/710 is pivoted about axis 515/715, faces $797_{UP}$ and $797_{LW}$ slide on faces 543 and 547, respectively. In such an embodiment, width W3≤depth W2 and the sloped faces have the same angle γ, where γ≥0.

FIG. 53a is an elevated perspective view illustration of a tilt-synchronizing unit 940, having an upper arched-rib $942_{UP}$ and a lower arched-rib $942_{LW}$, wherein upper arched-rib $942_{UP}$ has, at the bottom of upper arched-rib $942_{UP}$, having a facing-down-sliding-face $943_{UP}$, and wherein lower arched-rib $942_{LW}$ has, at the top of lower arched-rib $942_{LW}$, having a facing-up-sliding-face $943_{LW}$. It should be appreciated that upper arched-rib $942_{UP}$ faces lower arched-rib $942_{LW}$, wherein the gap formed therebetween facing-down-sliding-face $943_{UP}$, and the facing-up-sliding-face $943_{LW}$, is configured to slidingly accommodate mountable-arched-rib 744, as illustrated in FIGS. 53b and 53c.

FIG. 53b is a rear perspective view of an assembly 950 of the tilt-synchronizing unit 940, as shown in FIG. 53a, and accommodated mountable-arched-rib 744, wherein the mountable-arched-rib 744 is mounted therebetween the upper arched-rib $942_{UP}$ and the lower arched-rib $942_{LW}$.

FIG. 53c is a side view of the assembly 950 of tilt-synchronizing unit 940 and accommodate mountable-arched-rib 744, as shown in FIG. 53b. FIGS. 53b and 53c illustrate a similar assembly 950, which is similar to an embodiment in which top arched-rib 544 and bottom arched-rib 546 of tilt-synchronizing unit 540, accommodate mountable-arched-rib 744.

It should be noted that in such embodiments, where flat faces slide on other respective flat faces, no rotating cones are used.

Reference in now made to FIGS. 54a-54b. FIG. 54a is a rear, elevated, perspective view schematic illustration of the lower portion of a non-limiting example embodiment of a scooter 701, wherein scooter 701 includes a manual folding mechanism, according to aspects of the present disclosure, and wherein the steering post 710 is in straight, upright position.

Scooter 701 is similar to scooters 500 and 700, but in particular (with no limitations), scooter 701 differs from scooters 500 and 700 in the implementation of the scooter-folding-interface assembly 800 that is mostly manually operated while the scooter-folding-interface assembly 600 of scooter 700 is preferably automatic, typically electrically operated.

FIG. 54b is a side view schematic illustration of a frontal lower portion of scooter 701, according to embodiments of the present disclosure, wherein the scooter 701 is an upright, deployed balanced state. In the shown state, the front end of deck assembly 720, which is, with no limitations, generally parallel to the road surface, and is interconnected to frontal tilt-conveyor unit 590 (see also FIG. 28a) by interfacing-profile-arm 810, facilitating tilt of the deck assembly 720, while scooter 701 is in a deployed position.

During the folding process were scooter-folding-interface assembly 800 has been activated for example via a folding-handle 852, allowing interfacing-profile-arm 810 to fold upwardly, pivoting about axis 615 of front cable-wheel 652, while the front end of deck assembly 720 rises upwardly with respect to the pivotally connected interfacing-profile-arm 810, pivoting about axis 625 (shown, for example, in FIG. 34c). The entire folding process remain the same, but the inner locking mechanism inside interfacing-profile-arm 810 is adopted to facilitated the manual folding.

It should be appreciated that the inner locking mechanism of may be implemented using various locking/unlocking mechanisms known in the art. FIG. 55a is a side, vertical, cross-section view schematic illustration of an interfacing-profile-arm 810, according to some non-limiting example embodiments of the present disclosure. Interfacing-profile-arm 810 includes a lower, rear link-locking mechanism $870_{RR}$ and a similar upper, front link-locking mechanism $870_{FR}$ of steering post 710. Both lower, rear link-locking mechanism $870_{RR}$ and the similar upper, front link-locking mechanism $870_{FR}$, are shown in a locked state, wherein the respective latch-link-device ($878_{RR}$, being a deck-locking-pin, and $878_{FR}$, being a post-locking-pin, as shown in FIG. 55d here below) is in a locked position, whereas in FIG. 55a only the locking-pin housing ($872_{RR}$, is shown in detail. The elongated latch-link-device ($878_{RR}$, $878_{FR}$,) is operated inside the respective locking-pin housing ($872_{RR}$, $872_{FR}$), that direct the respective locking-end ($871_{RR}$, $871_{FR}$) into and out of the respective receiving-cavity ($661_{RR}$, $661_{FR}$, $662_{RR}$, $662_{FR}$). A respective locking-biasing-device ($879_{RR}$, $879_{FR}$), such as a spring is configured to push the respective locking-end ($871_{RR}$, $871_{FR}$) towards the respective receiving-cavity ($661_{RR}$, $661_{FR}$, $662_{RR}$, $662_{FR}$), in particular, in a locked state.

FIG. 55b is a side, schematic illustration of the internal elements of interfacing-profile-arm 810, according to some non-limiting example embodiments of the present disclosure, wherein the interfacing-profile-arm 810 has been removed for illustrative purposes only. The folding-handle 852 is shown in an idle locked state, wherein scooter 701 is in a deployed position. In the example state shown in FIG. 55a, a deployed receiving-cavities $661_{RR}$ is shown accommodating the respective locking-end $871_{RR}$ of the respective latch-wedge-housing $872_{RR}$. In the example folding mechanism shown in FIG. 55a, lower, rear link-locking mechanism $870_{RR}$ and upper, front link-locking mechanism $870_{FR}$ are interconnected by a wobbling-axes-link 838, which is typically symmetric. Wobbling-axes-link 838 includes three rotational axes: central-handle axis 835 configured to receive a rotational shaft of folding-handle 852, which is affixed thereto. The other two axes of wobbling-axes-link 838 are evenly spaced apart, wherein a lower, rear intermediate-arm-link $836_{RR}$ is pivotally connected to wobbling-axes-link 838 at rear-arm-link axis $833_{RR}$, and a front intermediate-arm-link $836_{FR}$ is pivotally connected to wobbling-axes-link 838 at lower-arm axis $833_{FR}$.

At one end, upper intermediate-arm-link $836_{RR}$ is pivotally connected to latch-link-device $878_{RR}$, which is configured to direct the respective locking-end $871_{RR}$ into and out of the receiving-cavity $661_{RR}$ (in a deployed state), or $662_{RR}$ (in a folded state). Similarly, at the other end, as shown in FIG. 55d here below, front intermediate-arm-link $836_{FR}$ is pivotally connected to latch-link-device $878_{FR}$, which is configured to direct the respective locking-end $871_{FR}$ into and out of the respective receiving-cavity $661_{FR}$ (in a deployed state), or $662_{FR}$ (in a folded state).

FIG. 55c is a rear, right side, elevated perspective view of the elements of interfacing-profile-arm 810, as shown in FIG. 55b. FIG. 55d is a right side view of the interfacing-profile-arm 810, as shown in FIG. 55a, wherein both lower, rear link-locking mechanism $870_{RR}$ and similar upper, front link-locking mechanism $870_{FR}$ are shown in an unlocked state.

It should be appreciated that folding handle 852 may be replaced by a folding-links-pivotal motor such as, with no limitations, an electric motor 853 that activated a motor-interface unit 851 to power pivot wobbling-axes-link 838, to thereby lock or unlock lower, rear link-locking mechanism $870_{RR}$ and upper, front link-locking mechanism $870_{FR}$, as illustrated in FIG. 55e. FIG. 55f illustrates the motorized assembly for locking or unlocking lower, rear link-locking mechanism $870_{RR}$ and upper, front link-locking mechanism $870_{FR}$.

FIG. 56a illustrates an example damper device assembly 900, configured to provide an alternative to the pair of springs mechanisms such as the pair of balancing-actuators (such as springs) 148; to the pair of balancing-actuators (such as springs) 592 and to the force conveying ring 594 disposed therebetween; and the pair of balancing-actuators (such as springs) 792 and force conveying ring 794 disposed therebetween.

Damper device assembly 900 includes a damper unit 910, a pair of similar balancing-actuators (such as springs) 920 ($920_R$, $920_L$) and a pair horizontal carrying rods 922 ($922_R$, $922_L$), linearly aligned and a pair of end-stoppers ($924_R$, $924_L$), wherein the pair of balancing-actuators 920 and are disposed onto the respective carrying rods ($922_R$, $922_L$), and respective end-stoppers ($924_R$, $924_L$) keep the respective balancing-actuators 920 between the end-stoppers 924 and the body of damper unit 910.

FIG. 56b is a front, elevated, perspective view schematic illustration of the lower portion of a non-limiting example embodiment of a scooter 702, wherein scooter 702 includes a damper device assembly 900 as part of the respective steering mechanism 730, and wherein scooter 702, is shown in an upright deployed position (state).

FIG. 56c is a front partial view of scooter 702, schematically illustrating a non-limiting example of steering mechanism 730, including damper device assembly 900 as part of the respective steering mechanism 730, wherein for visibility purposes only, some parts (related to steering post 710) have been removed for illustration purposes only, and wherein scooter 702, is shown in an upright deployed position (state). In this state, balancing-actuators 920 are in a balanced rest state.

The pair of similar balancing-actuators (922) are mounted on a mutual horizontal carrying rod (922), having a first end stopper ($924_L$) and a second end ($924_R$), wherein the horizontal carrying rod is mutual with an internal rod of the damper unit (910), and wherein the horizontal carrying rod is situated between the first end stopper ($924_L$) and a second end ($924_R$) the second end stopper ($924_L$) of the horizontal carrying rod (922).

FIG. 56d is a front view, schematic illustration of steering mechanism 730 of the scooter 702, shown in a left turn deployed position. In this state, balancing-actuators 920 are in an imbalanced state, striving to return to the balanced state. Damper unit 910 is securely attached to non-pivotal-frame element 780, whereas the end stoppers 924 are securely attached the linkage the respective linkage components 756 ($756_L$, $756_R$) of the steering mechanism 730, which linkage components 756 move as a result of the pivotal motion of steering post 710.

In the shown example of a left turn, both balancing-actuators 920 react to the motion of linkage components 756, wherein the left balancing-actuator $920_L$ expands while the right balancing-actuator $920_R$ is compressed, and wherein both balancing-actuators 920 are in an imbalanced state, striving to return to the balanced state.

While example materials and manufacturing techniques and technologies for elements have been described, the present disclosure invention is not limited by these materials, techniques and technologies.

Various modifications can be made in the design and operation of the present disclosure invention without departing from its spirit. Thus, while examples of construction of the present disclosure invention have been explained in what is now considered to represent its example embodiments, it should be understood that within the scope of the patent, the present disclosure invention may be practiced otherwise than as specifically illustrated and described.

The features disclosed in the above description and in the drawings may be significant both individually and in any desired combination in order to realize the various embodiments of the present disclosure.

Although the present disclosure invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by this patent.

While certain embodiments of the inventions have been described, wherein these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A scooter apparatus comprising:
    a steering assembly comprising:
        a pivotable steering member having a pivotal axis;
        a handle-bar securely attached to said steering member;
        a pair of front wheels;
        a steering mechanism configured to steer said front wheels upon applying pivotal motion to said steering member;
        a wheels-pivoting-mechanism configured to pivot said pair of front wheels, the wheels-pivoting-mechanism comprising one or more linkages that receive pivotal motion from a post of said pivotable steering member;
        an autonomous driving mechanism comprising an autonomous motor disposed inside the post of said pivotable steering member; and
        a steering-tilt assembly configured to tilt said steering member towards an inside periphery of a turning curve, when pivoting said steering member,
    wherein a rate of said tilt of said steering member, towards the inside periphery of the turning curve, is proportionally related to a pivoting rate of said steering member;
    a deck assembly comprising a standing board orthogonal to the pivotable steering member and configured to be parallel to and along a road surface, the standing board configured for supporting a rider standing up;

a rear wheel assembly comprising at least one rear wheel; and an interface assembly extended angled down between and connecting said deck assembly with said steering assembly.

2. The scooter apparatus of claim 1, wherein said steering member comprises an upper-post and a lower-post.

3. The scooter apparatus of claim 1, wherein said steering-tilt assembly comprises a tilt assembly configured to tilt said pivotable steering member, when pivoting said steering member about said pivotal axis of said steering member; a pivotal-frame element; and a non-pivotal-frame element, wherein said pivotal-frame element is configured to pivot about said non-pivotal-frame element, to thereby allow tilt motion of said steering member.

4. The scooter apparatus of claim 3, wherein said steering-tilt assembly further comprises a pair of similar balancing-actuators, each having a stopper end and a force-receiving end, wherein said stopper ends of said balancing-actuators are securely connected to said pivotal-frame element at respective locations, and the force-receiving ends of said balancing-actuators are securely connected to said non-pivotal-frame element at respective locations; and wherein said balancing-actuators are configured to actuate relative rotational power forces between said non-pivotal-frame element and said pivotal-frame element, and assert a steering-post-return-force counter to a pivotal-force applied to said steering member.

5. The scooter apparatus of claim 3, wherein said standing board is attached to said pivotal-frame element, and wherein when said pivotal-frame element is tilted, said standing board inclines sideways towards the inside periphery of the turning curve.

6. The scooter apparatus of claim 1, wherein when said steering member is pivoted, said wheels-pivoting-mechanism moves said front wheels.

7. The scooter apparatus of claim 6, wherein each of said pivoted wheels moves about a respective independent shaft.

8. The scooter apparatus of claim 1, wherein when said steering member is pivoted, said wheels-pivoting-mechanism moves said front wheels, wherein both wheels are on a road.

9. The scooter apparatus of claim 1, wherein said at least one rear wheel is operated by a power motor.

10. The scooter apparatus of claim 9, wherein said power motor is configured to drive the scooter apparatus either forward or backwards.

11. The scooter apparatus of claim 1, wherein said interface assembly connects with said deck assembly by at least one pivotal connection, and with said steering assembly by at least one pivotal connection, and wherein said pivotal connections facilitate to fold the scooter apparatus from a deployed position to a folded state, and from the folded state to the deployed position.

12. The scooter apparatus of claim 11, further comprises a deployed-position-locking mechanism configured to lock said pivotal connections when in deployed position.

13. The scooter apparatus of claim 12, wherein said deployed-position-locking mechanism comprises:
at least one deck-locking-pin configured to lock pivotal motion between said interface assembly and said deck assembly;
at least one post-locking-pin configured to lock pivotal motion between said interface assembly and said steering assembly;
a folding handle; and
a cable subsystem securely attached to said folding handle, wherein said cable subsystem configured to unlock said at least one deck-locking-pin and said at least one post-locking-pin, when said folding handle is activated.

14. The scooter apparatus of claim 13, wherein each of said deck-locking-pins and said post-locking pin comprises a locking-pin unit having a locking-end, and a biasing element,
wherein when folding from the folded state to the deployed position, each locking-pin unit moves back against said biasing element, until the locking-end is free to enter a receiving opening, to thereby be pushed into said receiving opening and lock the locking-pin unit therein, to thereby prevent pivotal motion between said interface assembly and said deck assembly and between said interface assembly and said steering assembly.

15. The scooter apparatus of claim 11, further comprises folded-state-locking mechanism configured to lock said pivotal connections when in said folded state.

16. The scooter apparatus of claim 1, wherein said steering-tilt assembly comprises:
a tilt assembly comprising:
a tilt unit;
a truncated rotating-cone having a sloped periphery; and
a cone-rotational axis, and a pivotal-interface unit comprising a stationary shaft, wherein said truncated rotating-cone is rotatably mounted on said stationary shaft;
a tilt-conveyor unit; and
a non-pivotal-frame element, wherein said tilt-conveyor unit is configured to pivot about said non-pivotal-frame element, to thereby allow tilt motion of said steering member; wherein said pivotal-interface unit comprises:
a post interface section having a rotational axis that coincides with said pivotal axis of said steering member;
a pivoting receiving linkage arm that is securely attached to said tilt-conveyor unit;
a rotating-cone linkage arm; and
a rotating-cone linkage assembly comprising a stationary shaft,
wherein said tilt unit comprises a pair of parallel elongated arched-ribs, having an initial inclination angle when the steering member is in an upright position, comprising: a top arched-rib and a bottom arched-rib,
wherein each of said arched-ribs has a respective inner flat face that is laterally sloped inwardly, away from said steering member, forming a gap between said top arched-rib and said bottom arched-rib, wherein an internal-arched-gap Dm is distal from said steering member and an external-arched-gap Dext is proximal to said steering member, and wherein said internal-arched-gap Dm is wider than said external-arched-gap Dext,
wherein said tilt unit is securely attached to said non-pivotal-frame element; wherein said steering member is securely attached to said post interface section of said pivotal-interface unit; wherein said pair of arched-ribs are arched and have a depth of W2 and a transverse axis that operatively coincides with said pivotal axis of said steering member;
wherein slopes of said truncated rotating-cone and slopes of said inner flat faces are operatively of the same angle, y;
wherein said tilt unit and said pivotal-interface unit are operatively interfaced such that said truncated rotating-cone is disposed between said top arched-rib and said bottom arched-rib, allowing said truncated rotating-cone to fittingly roll there inside an internal space formed between said inner flat faces of said top arched-rib and said bottom arched-rib; wherein when said steering member is pivoted by applying a pivotal-force thereon, then:

said tilt unit, being securely attached to said non-pivotal-frame element, does not pivot with said steering member;

said pivotal-interface unit, being securely attached to said steering member and to said pivotal-frame element, moves with said steering member;

said truncated rotating-cone rolls there inside the internal space formed between said inner flat faces of said top arched-rib and said bottom arched-rib; and said tilt-conveyor unit is configured to pivot about the non-pivotal-frame element, to thereby allow tilt motion of said steering member, when said steering member moves; and wherein while said steering member moves, said pivoting receiving linkage arm moves too, causing said tilt-conveyor unit to pivot about the non-pivotal-frame element, and thereby tilting said steering member into the side to which said steering member moves.

17. A scooter apparatus comprising:
a steering assembly comprising:
a pivotable steering member having a pivotal axis;
a handle-bar securely attached to said steering member;
a pair of front wheels;
a steering mechanism configured to steer said front wheels upon applying pivotal motion to said steering member;
a wheels-pivoting-mechanism configured to pivot said pair of front wheels; and
a steering-tilt assembly configured to tilt said steering member towards an inside periphery of a turning curve, when pivoting said steering member,
wherein a rate of said tilt of said steering member, towards the inside periphery of the turning curve, is proportionally related to a pivoting rate of said steering member;
a deck assembly comprising a standing board configured for supporting a rider; and a rear wheel assembly comprising at least one rear wheel; and
an interface assembly connecting said deck assembly with said steering assembly;
wherein said steering-tilt assembly comprises a tilt assembly configured to tilt said pivotable steering member, when pivoting said steering member about said pivotal axis of said steering member; a pivotal-frame element; and a non-pivotal-frame element, wherein said pivotal-frame element is configured to pivot about said non-pivotal-frame element, to thereby allow tilt motion of said steering member;
wherein said tilt assembly comprises:
a tilt unit, at least a pair of truncated rotating-members having a sloped periphery and a rotational axis;
a post interface section of said tilt unit having a rotational axis that coincides said pivotal axis of said steering member;
a pivoting receiving linkage component; and
a body having a pair of arched walls, wherein said steering member is securely attached to said post interface section of said tilt unit;
wherein said pair of arched walls of said body are arched piped walls having a thickness W1 and an axis that coincides with said pivotal axis of said steering member;
wherein said arched piped walls of said body are diagonally truncated at their bottom, at an angle a, forming a pair of flat faces, wherein each of said flat faces is also sloped laterally, with respect to said pivotal axis of said steering member, going downwardly at an angle β, as extending from a periphery of said arched piped walls inwardly, towards said pivotal axis of said steering member;
wherein said pair of truncated rotating-members are configured to rotate about respective stationary shafts that are securely attached to said non-pivotal-frame element;
wherein said sloped flat faces are configured to roll over said sloped periphery of said truncated rotating-members; and
wherein said steering member is pivoted by applying a pivotal-force thereon, where said tilt unit moves by being secured to said steering member; and one arched wall of the pair of arched walls moves upwards as the respective flat face rolls over the respective truncated rotating-member, and the other arched wall of the pair of arched walls moves downwards as the respective flat face rolling over the other truncated rotating-member, wherein while said steering member moves, one arched wall moves upwards and the other arched wall of the pair of arched walls moves downwards, said steering member tilts towards the side of said other arched wall that moves downwards.

18. The scooter apparatus of claim 17, wherein a calibration mechanism is configured to calibrate a friction between each of said sloped flat faces and the respective said sloped periphery of said truncated rotating-member.

19. The scooter apparatus of claim 17, wherein angle α may vary along said sloped flat faces.

20. A scooter apparatus comprising:
a steering assembly comprising:
a pivotable steering member having a pivotal axis;
a handle-bar securely attached to said steering member;
a pair of front wheels;
a steering mechanism configured to steer said front wheels upon applying pivotal motion to said steering member;
a wheels-pivoting-mechanism configured to pivot said pair of front wheels; and
a steering-tilt assembly configured to tilt said steering member towards an inside periphery of a turning curve, when pivoting said steering member,
wherein a rate of said tilt of said steering member, towards the inside periphery of the turning curve, is proportionally related to a pivoting rate of said steering member;
a deck assembly comprising a standing board configured for supporting a rider; and a rear wheel assembly comprising at least one rear wheel; and
an interface assembly connecting said deck assembly with said steering assembly;
wherein said at least one rear wheel is operated by a power motor,
an autonomous driving mechanism, comprising:
an autonomous motor;
a rotation-transmission-rod; and
a rotation-receiving-rod,
wherein said autonomous motor is disposed inside an upper-post of said steering member;

wherein said rotation-receiving-rod is secured to a lower-post of said steering member; wherein said rotation-transmission-rod and said rotation-receiving-rod are operationally disengaged, when not driving autonomously;

wherein said rotation-transmission-rod and said rotation-receiving-rod are operationally engaged by moving said upper-post downwards over or inside said lower-post, until said rotation transmission-rod engages with said rotation-receiving-rod; and wherein by activating said autonomous motor of the scooter apparatus can be driven forward or backward.

* * * * *